(12) United States Patent
Park et al.

(10) Patent No.: US 10,365,659 B2
(45) Date of Patent: Jul. 30, 2019

(54) ROBOT CLEANER, CONTROL APPARATUS, CONTROL SYSTEM, AND CONTROL METHOD OF ROBOT CLEANER

(71) Applicant: SAMSUNG ELECTRONICS CO., LTD., Suwon-si, Gyeonggi-do (KR)

(72) Inventors: Young Jae Park, Suwon-si (KR); Won Kuk Kim, Seoul (KR); Dong Hyun Lee, Suwon-si (KR); Min Jae Kim, Yongin-si (KR)

(73) Assignee: SASMUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 15/505,524

(22) PCT Filed: Apr. 21, 2015

(86) PCT No.: PCT/KR2015/003979
§ 371 (c)(1),
(2) Date: Feb. 21, 2017

(87) PCT Pub. No.: WO2016/027957
PCT Pub. Date: Feb. 25, 2016

(65) Prior Publication Data
US 2017/0265703 A1  Sep. 21, 2017

(30) Foreign Application Priority Data
Aug. 19, 2014  (KR) ........................ 10-2014-0107445

(51) Int. Cl.
*A47L 9/00* (2006.01)
*A47L 9/28* (2006.01)
(Continued)

(52) U.S. Cl.
CPC ............ *G05D 1/0274* (2013.01); *A47L 9/009* (2013.01); *A47L 9/28* (2013.01); *A47L 9/2826* (2013.01);
(Continued)

(58) Field of Classification Search
CPC ...... A47L 9/2857; A47L 9/009; A47L 9/2826; A47L 9/2894; A47L 9/2873;
(Continued)

(56) References Cited

U.S. PATENT DOCUMENTS

2009/0149990 A1*  6/2009  Myeong et al. ...... G05D 1/0274
  701/25
2011/0264305 A1*  10/2011  Choe et al. .......... G05D 1/0274
  701/25
(Continued)

FOREIGN PATENT DOCUMENTS

EP  2 330 471 A2  6/2011
JP  2014-59737  4/2014
(Continued)

OTHER PUBLICATIONS

International Search Report dated Jul. 14, 2015 in corresponding International Application No. PCT/KR2015/003979.
(Continued)

*Primary Examiner* — Dale W Hilgendorf
(74) *Attorney, Agent, or Firm* — Staas & Halsey LLP

(57) ABSTRACT

A control apparatus of a robot cleaner includes a user interface unit to receive a user command controlling the robot cleaner; a controller to generate a control signal to receive a map of a cleaning area, based on the user command; and a communicator to receive the map of the cleaning area from an external server or the robot cleaner, based on the control signal. An embodiment may download or generate a map of a cleaning area and allow a map editing (Continued)

to be performed by a user. An embodiment may set and edit a cleaning schedule. When setting the cleaning schedule, an embodiment may recommend a cleaning schedule based on cleaning history data. An embodiment may automatically determine whether the environment is changed or whether the cleaning is available, while the robot cleaner performs the cleaning, and it may be possible to actively deal with this.

21 Claims, 43 Drawing Sheets

(51) Int. Cl.

| | | |
|---|---|---|
| *B25J 9/00* | (2006.01) | |
| *B25J 9/16* | (2006.01) | |
| *G05D 1/00* | (2006.01) | |
| *G05D 1/02* | (2006.01) | |
| *G06F 3/0481* | (2013.01) | |
| *G06F 3/0482* | (2013.01) | |
| *G06F 3/0484* | (2013.01) | |
| *G05B 19/4155* | (2006.01) | |

(52) U.S. Cl.
CPC ............ *A47L 9/2852* (2013.01); *A47L 9/2857* (2013.01); *A47L 9/2873* (2013.01); *A47L 9/2894* (2013.01); *B25J 9/16* (2013.01); *B25J 9/1664* (2013.01); *G05B 19/4155* (2013.01); *G05D 1/0044* (2013.01); *G05D 1/0276* (2013.01); *G05D 1/0285* (2013.01); *A47L 2201/04* (2013.01); *B25J 9/0003* (2013.01); *G05B 2219/34418* (2013.01); *G05B 2219/45098* (2013.01); *G05D 2201/0203* (2013.01); *G05D 2201/0215* (2013.01); *G06F 3/0482* (2013.01); *G06F 3/04817* (2013.01); *G06F 3/04847* (2013.01); *Y10S 901/01* (2013.01)

(58) Field of Classification Search
CPC ............... A47L 9/2852; A47L 2201/04; G05B 19/4155; G05B 2219/34418; G05B 2219/45098; B25J 9/1664; B25J 9/0003; G05D 1/0285; G05D 1/0044; G05D 2201/0215; G05D 1/0274; G05D 1/0246; G05D 2201/0203; G06F 3/0482; G06F 3/04817; G06F 3/04847; Y10S 901/01

See application file for complete search history.

(56) References Cited

U.S. PATENT DOCUMENTS

| | | | | |
|---|---|---|---|---|
| 2012/0221187 | A1* | 8/2012 | Jeon | G05D 1/0274 701/25 |
| 2013/0024025 | A1* | 1/2013 | Hsu | G05D 1/0274 700/259 |
| 2013/0056032 | A1 | 3/2013 | Choe et al. | |
| 2013/0206177 | A1* | 8/2013 | Burlutskiy | A47L 9/009 134/18 |
| 2014/0087770 | A1* | 3/2014 | Cho et al. | H04W 4/02 455/457 |
| 2014/0207280 | A1* | 7/2014 | Duffley et al. | A47L 9/2857 700/257 |
| 2014/0316636 | A1* | 10/2014 | Hong et al. | G05D 1/0274 701/27 |

FOREIGN PATENT DOCUMENTS

| | | |
|---|---|---|
| KR | 10-2007-0027840 | 3/2007 |
| KR | 10-0821162 | 4/2008 |
| KR | 10-2010-0012351 | 2/2010 |
| KR | 10-2011-0119118 | 11/2011 |
| WO | WO 2012/157951 A2 | 11/2012 |
| WO | WO 2013/118974 A1 | 8/2013 |

OTHER PUBLICATIONS

Extended European Search Report dated Oct. 10, 2017, in corresponding European Patent Application No. 15834373.1.
Australian Office Action dated Oct. 19, 2017, in corresponding Australian Patent Application No. 2015304269.
Australian Office Action dated May 10, 2018, in corresponding Australian Patent Application No. 2015304269.
Australian Office Action dated Jan. 22, 2018, in corresponding Australian Patent Application No. 2015304269.
Australian Office Action dated Aug. 2, 2018, in corresponding Australian Patent Application No. 2015304269.
Chinese Office Action dated Nov. 13, 2018, in corresponding Chinese Patent Application No. 201580055335.6.

\* cited by examiner

Fig. 1
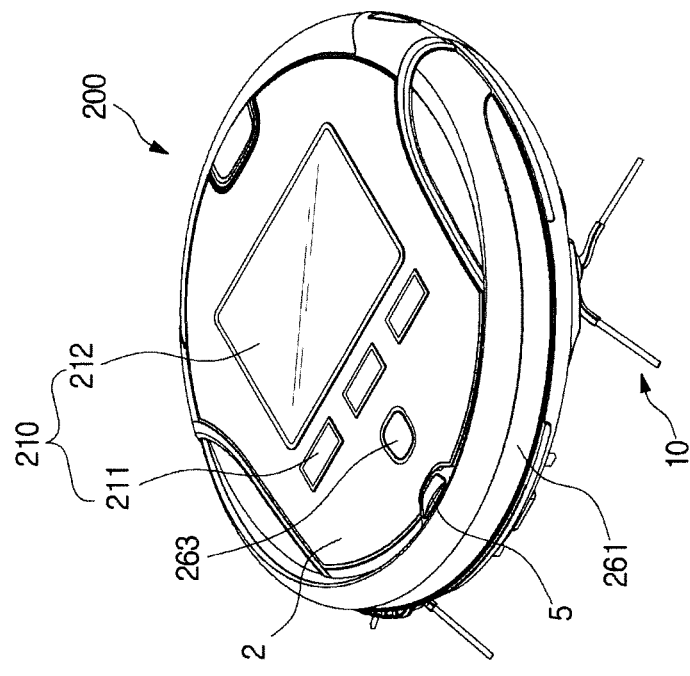
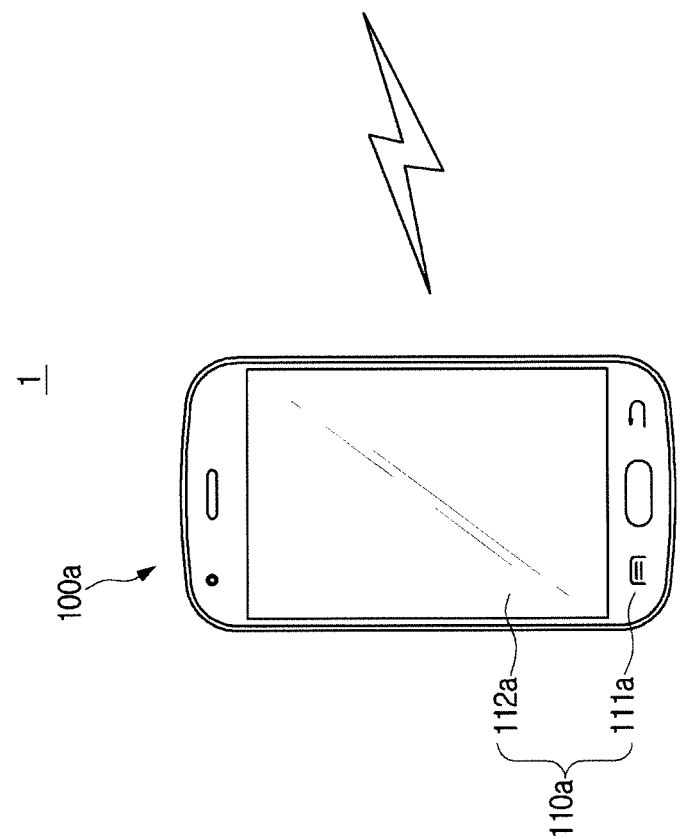

[Fig. 4]
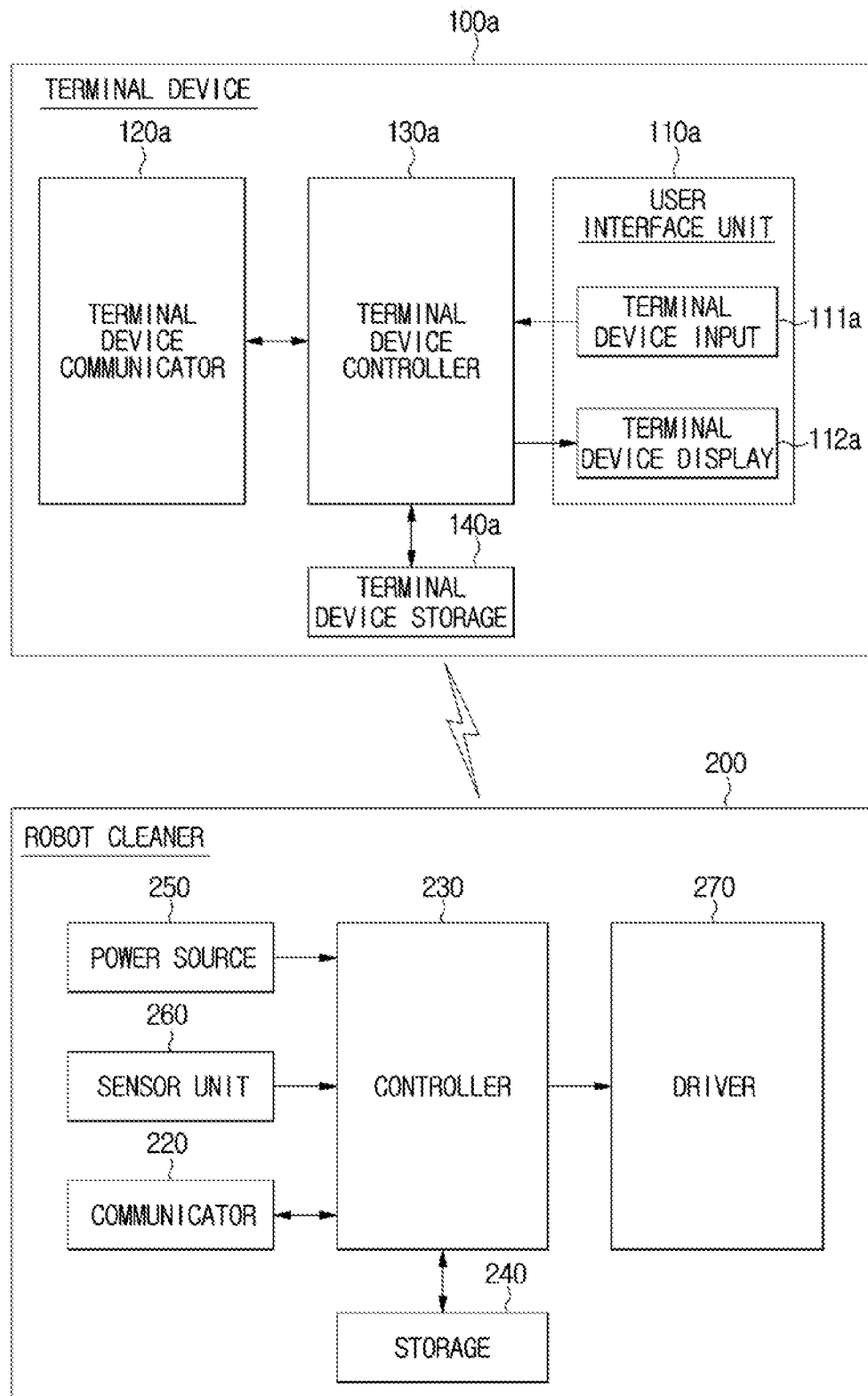

[Fig. 5a]
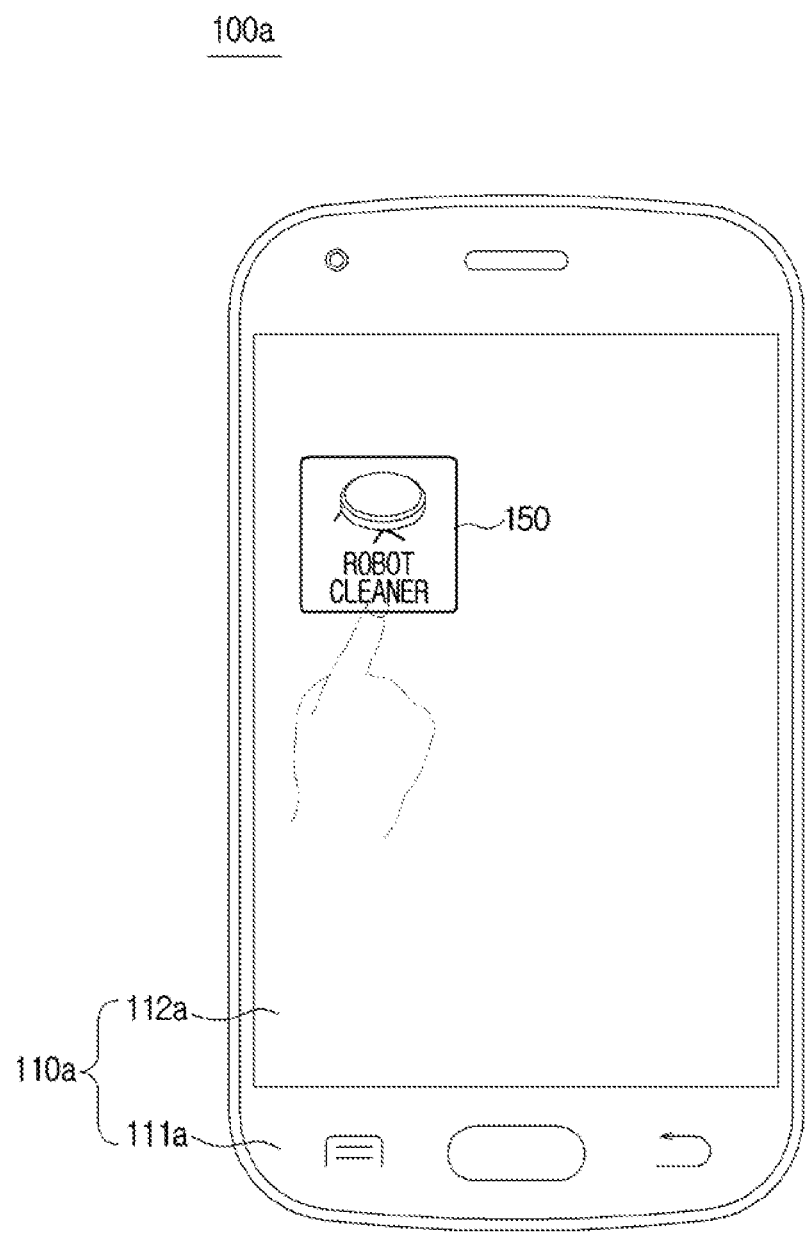

[Fig. 5b]
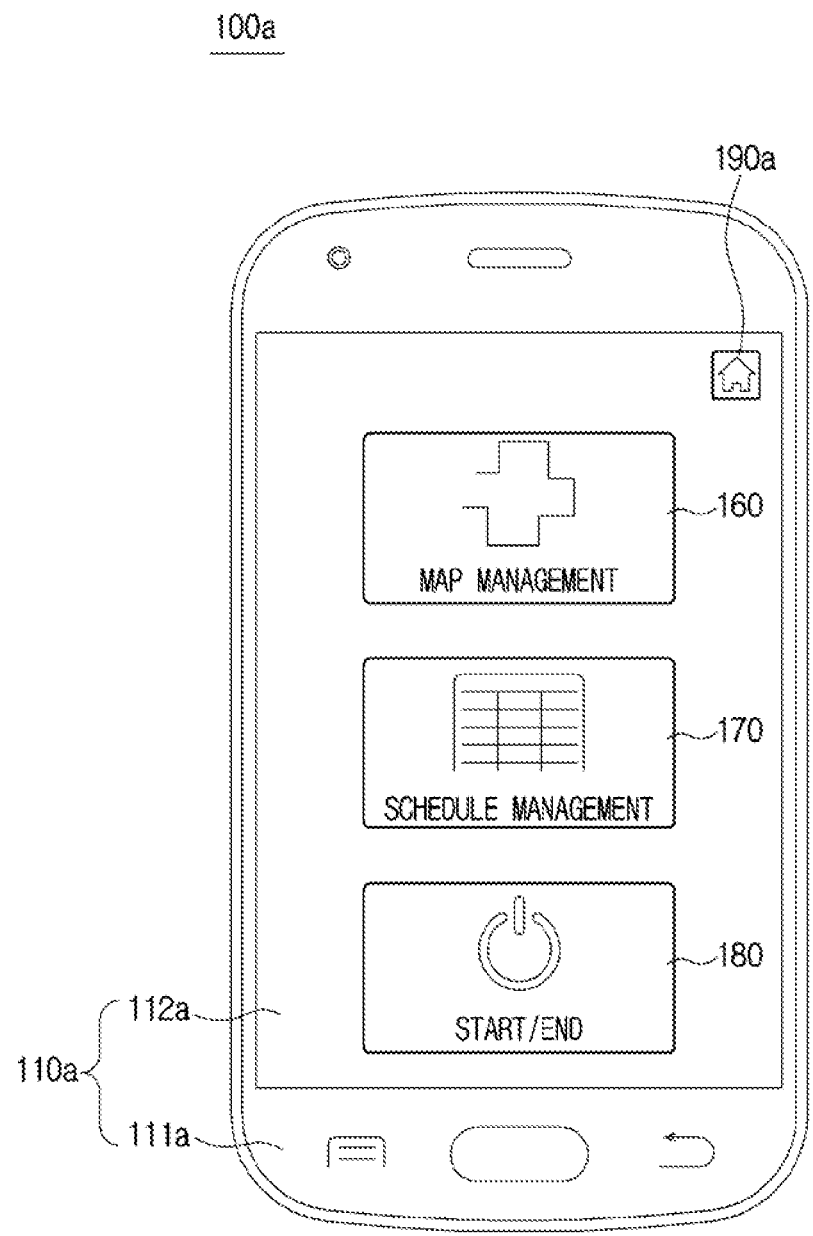

[Fig. 6]
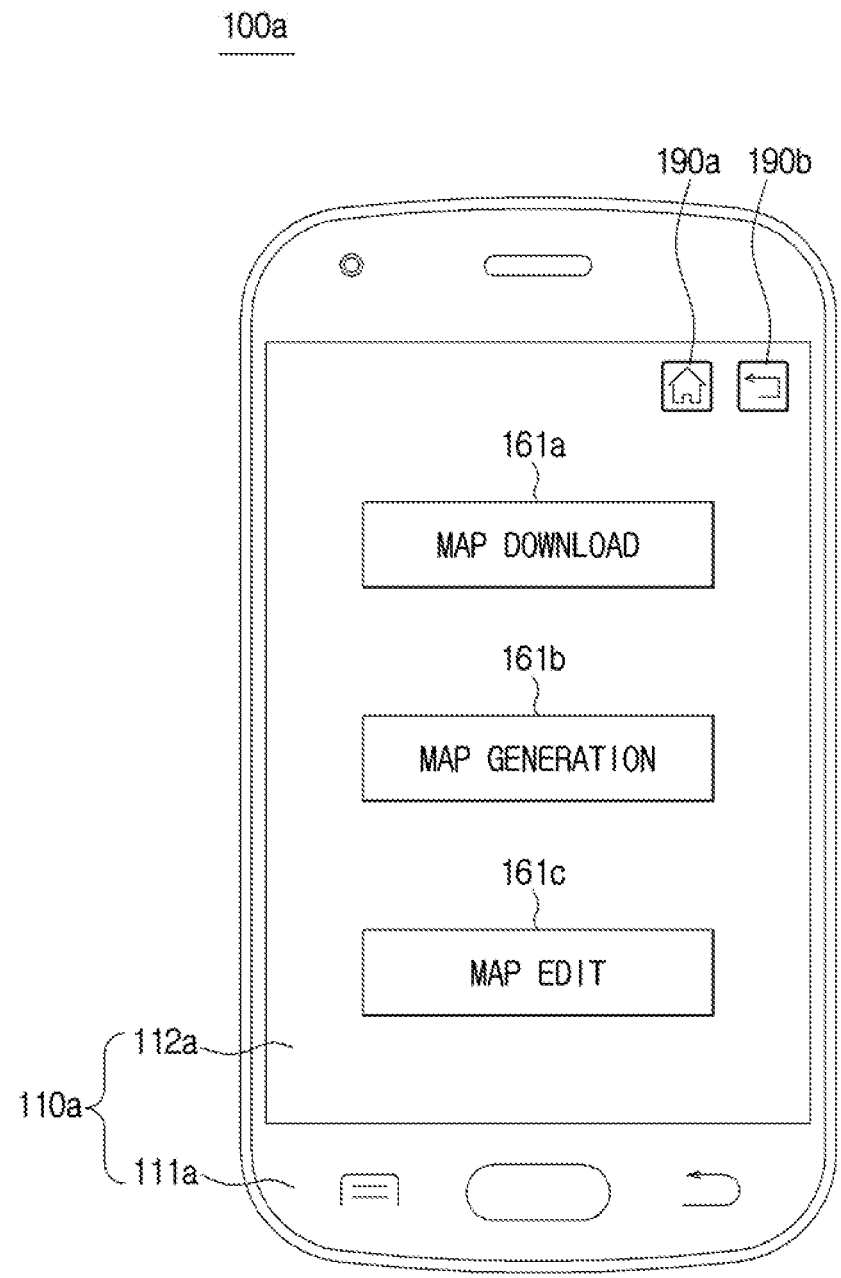

[Fig. 7]
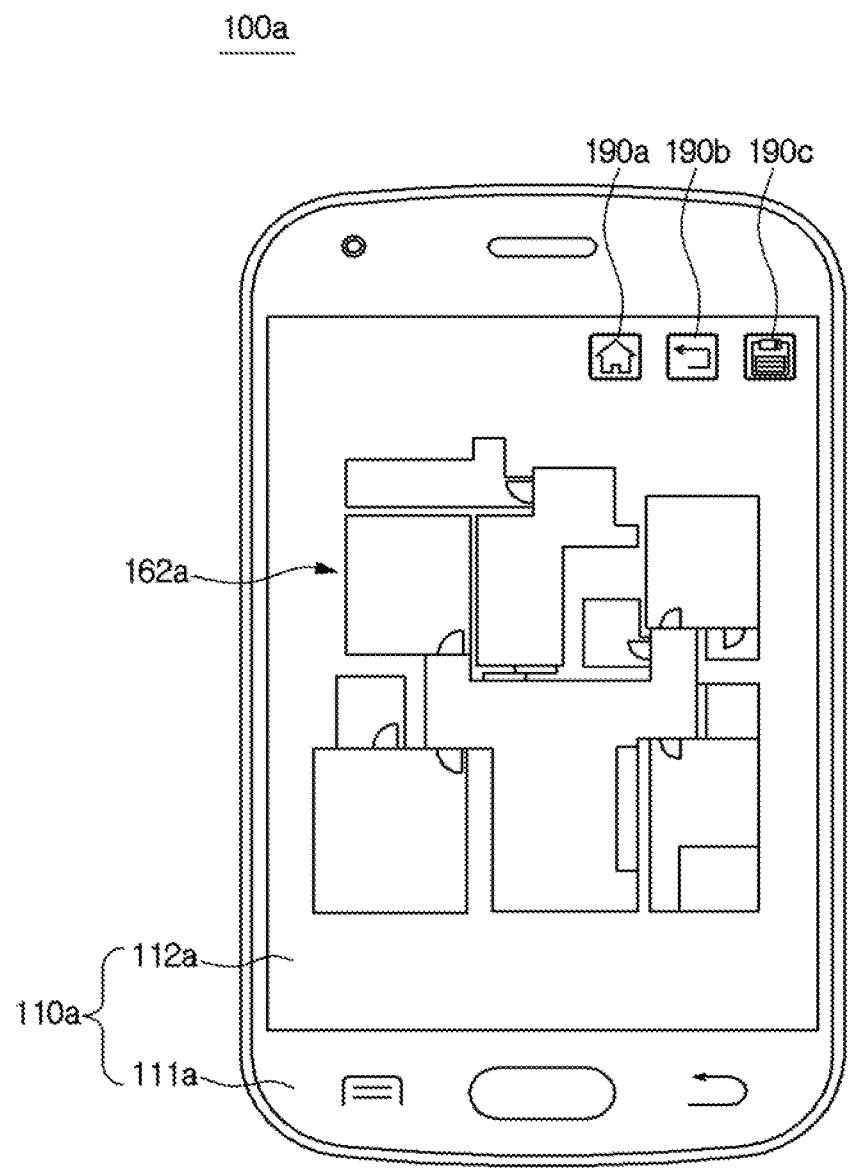

[Fig. 8]
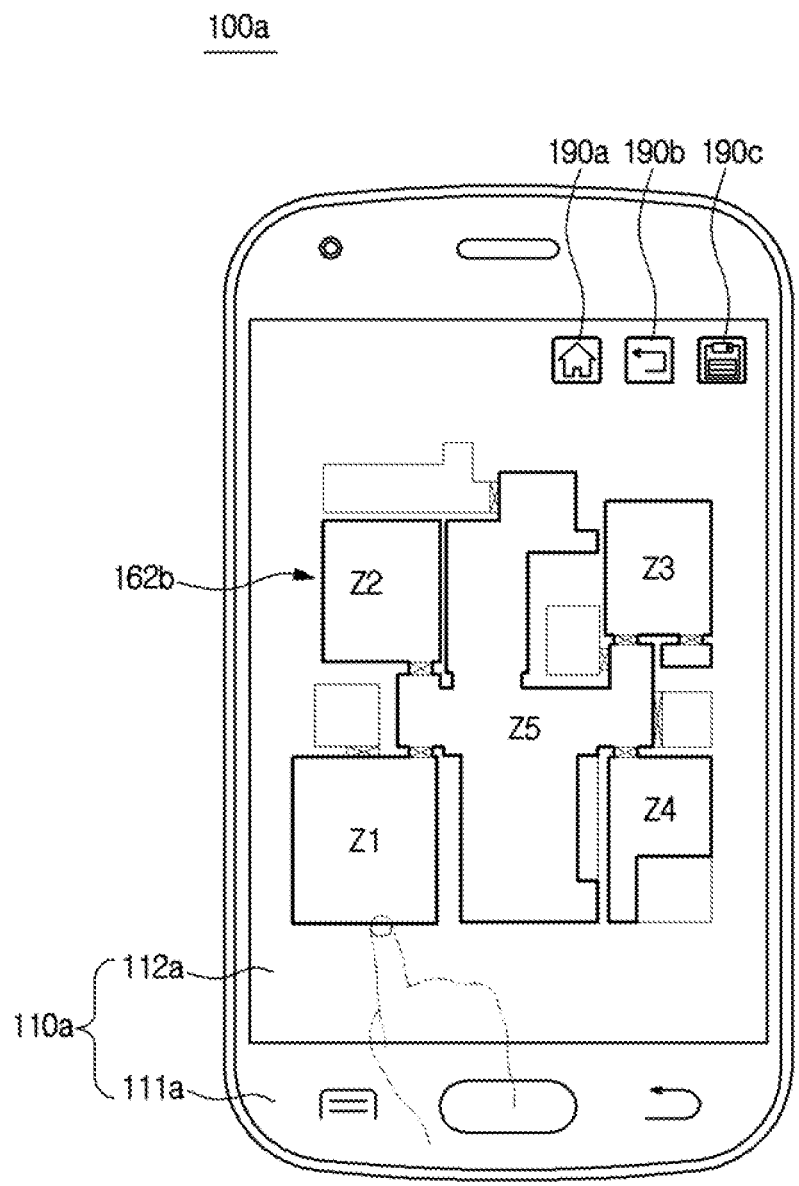

[Fig. 9]
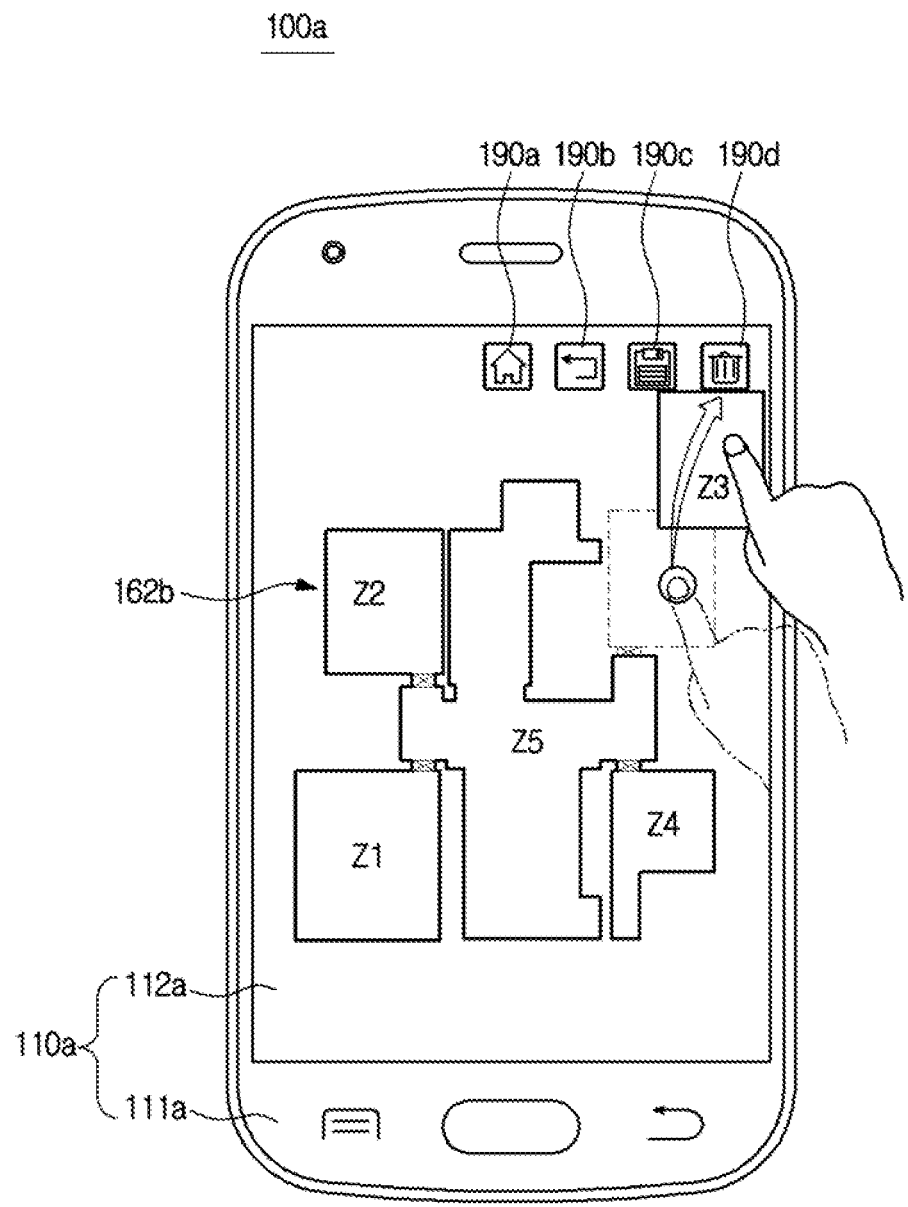

[Fig. 10]
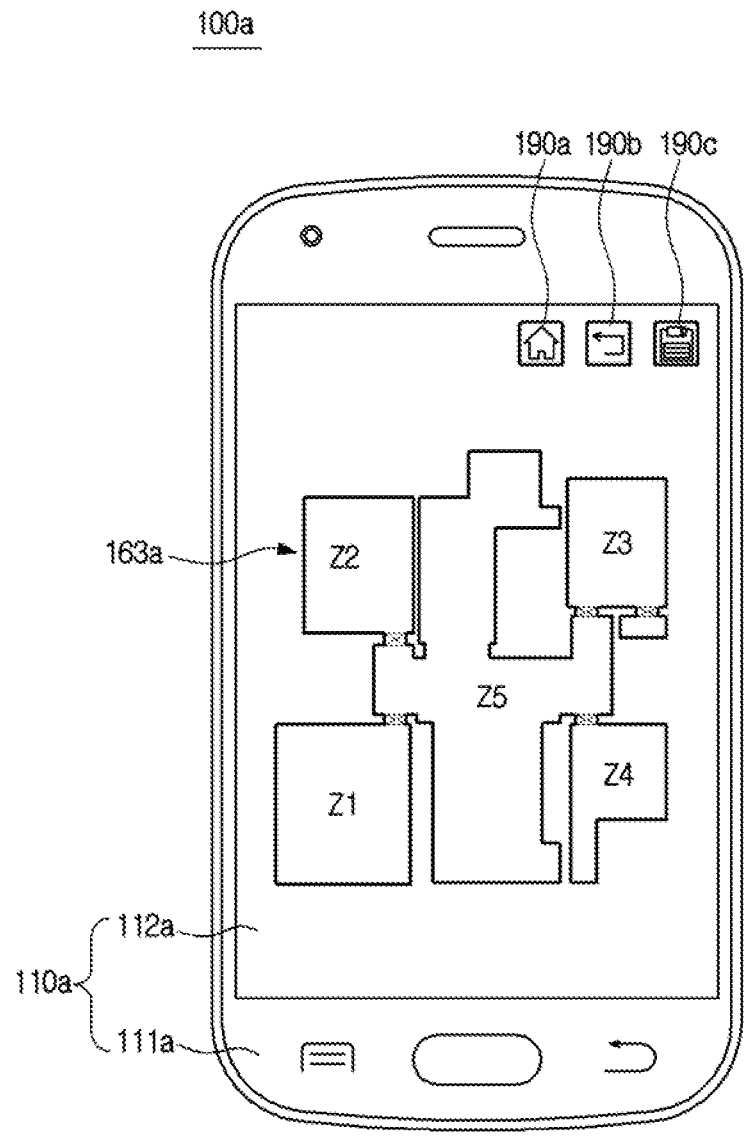

[Fig. 11]
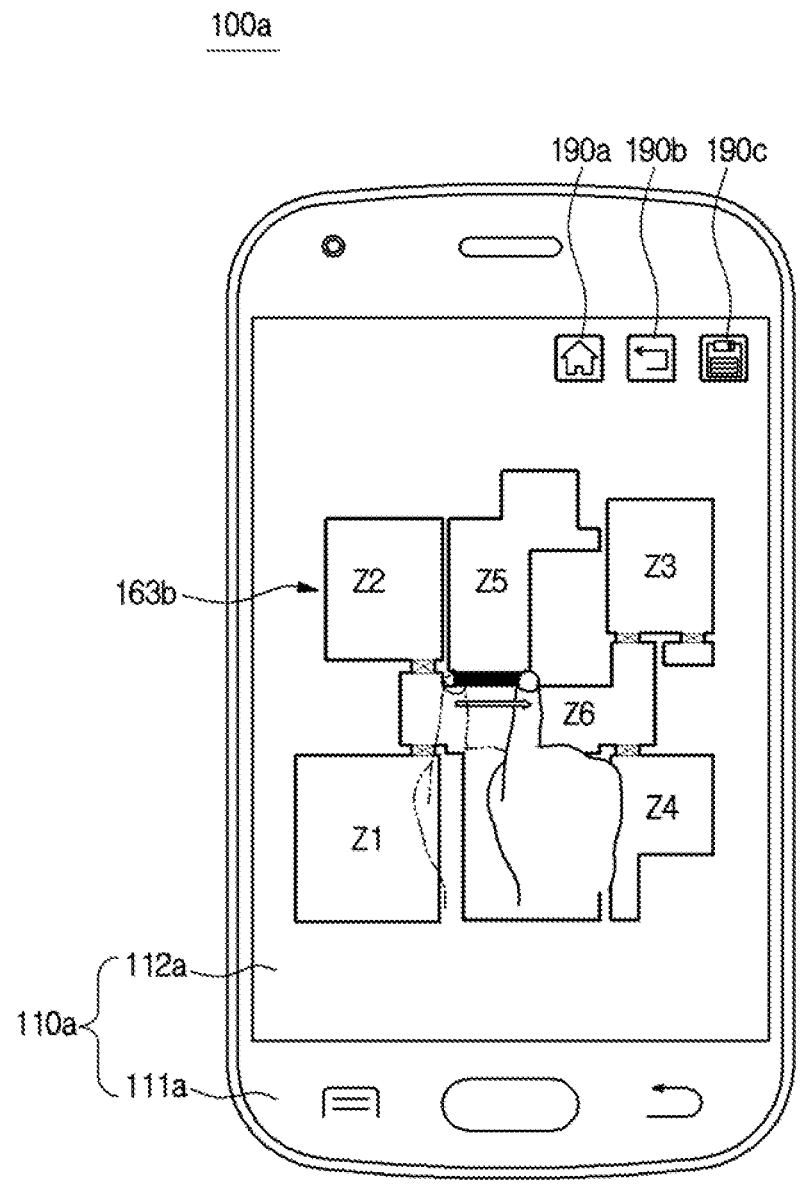

[Fig. 13]
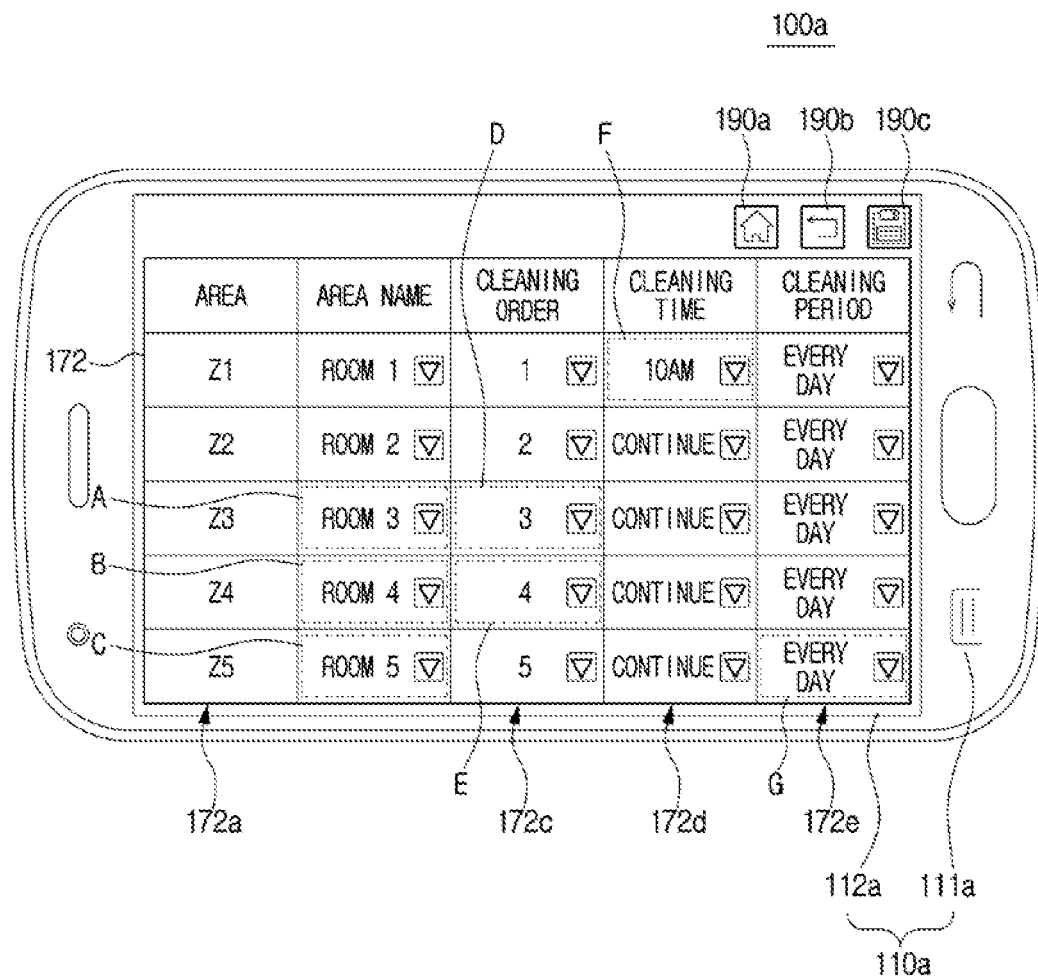

[Fig. 14a]
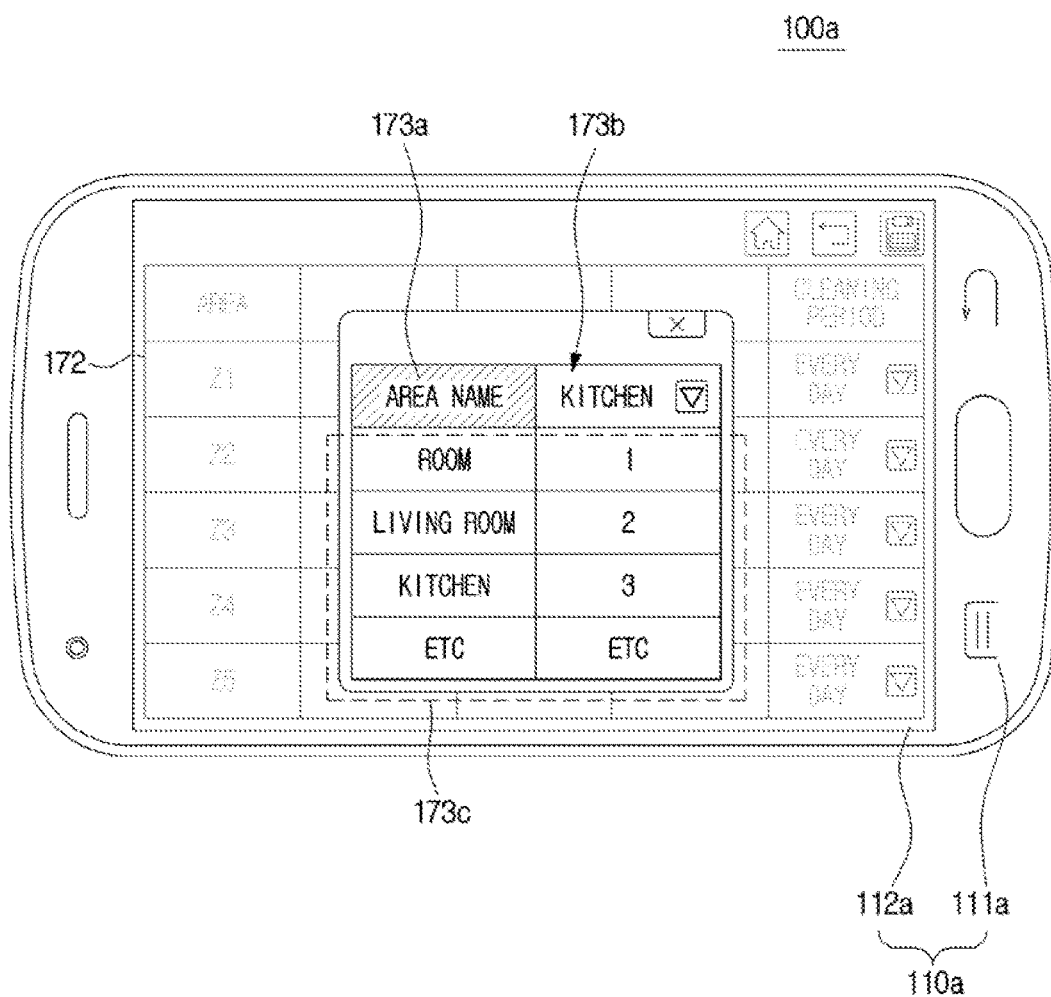

[Fig. 14b]
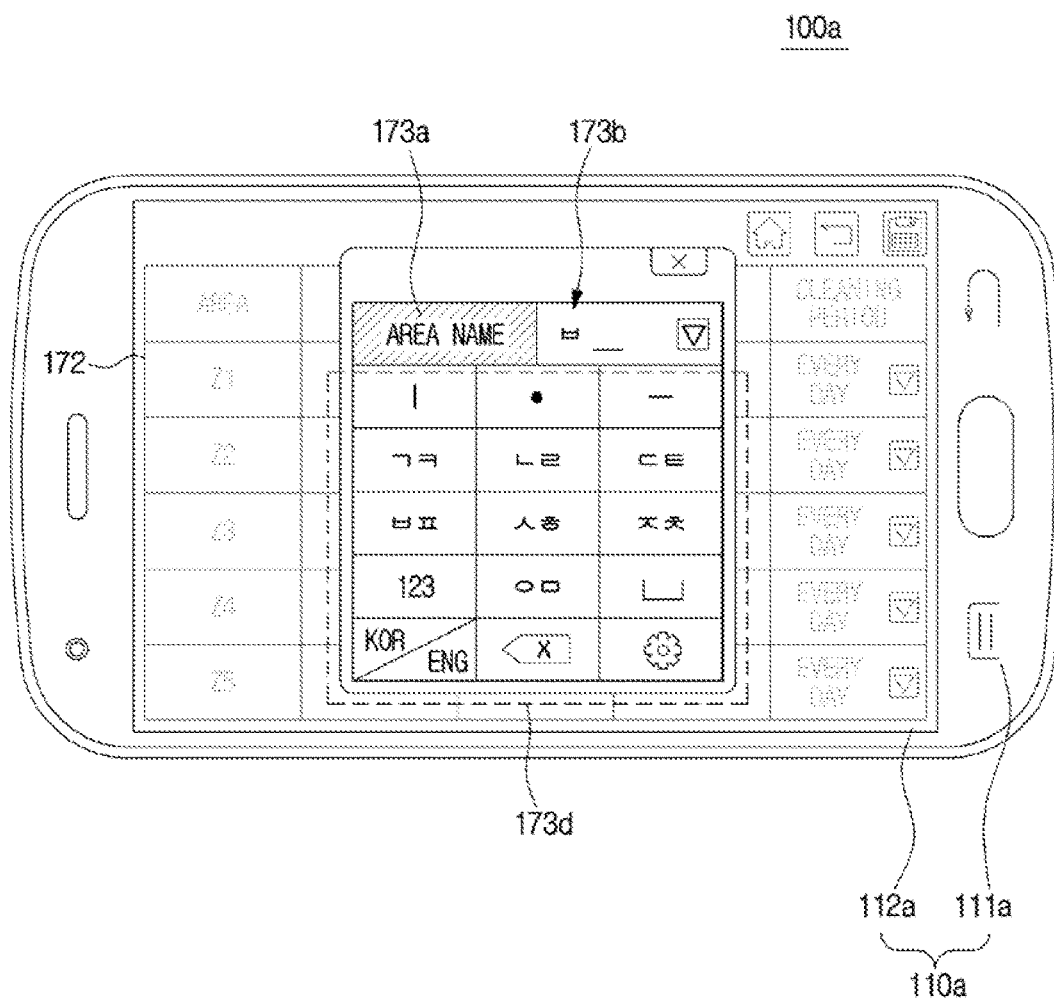

[Fig. 15]
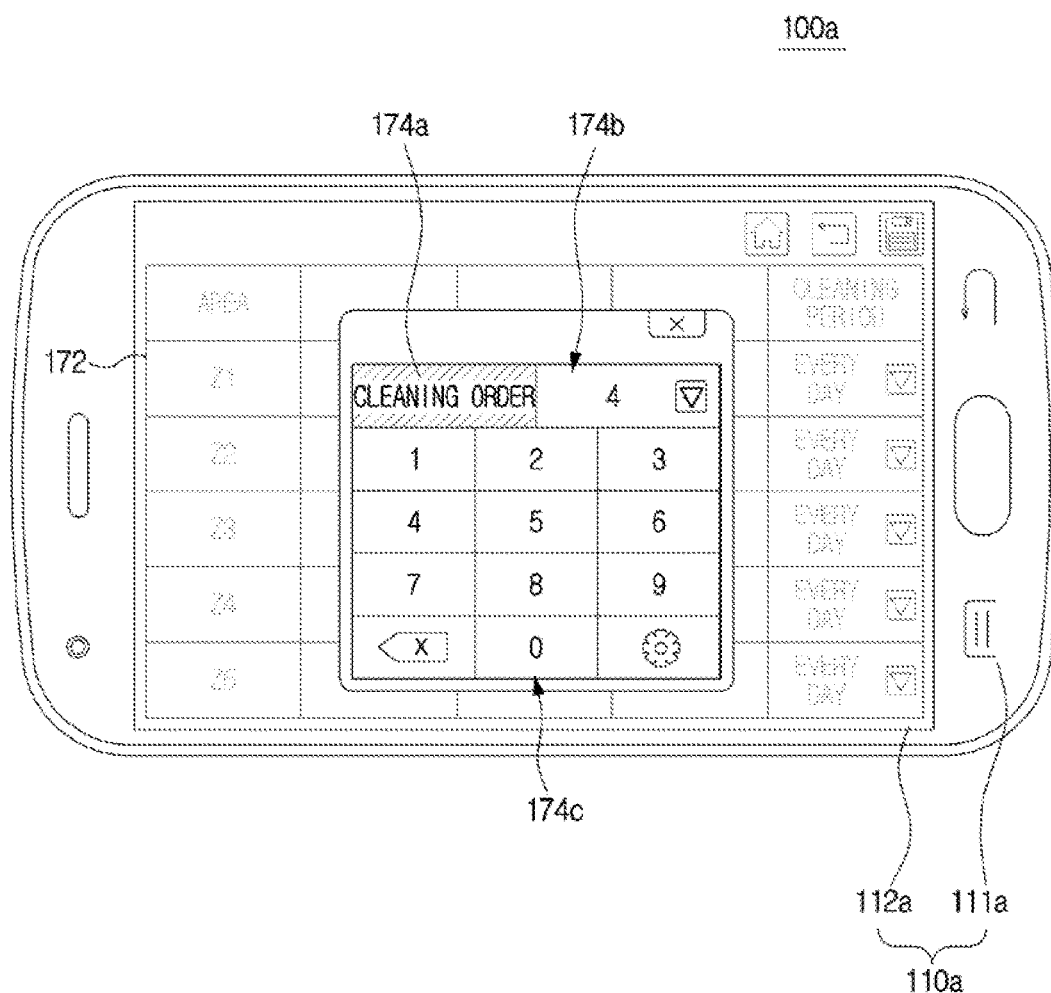

[Fig. 16]
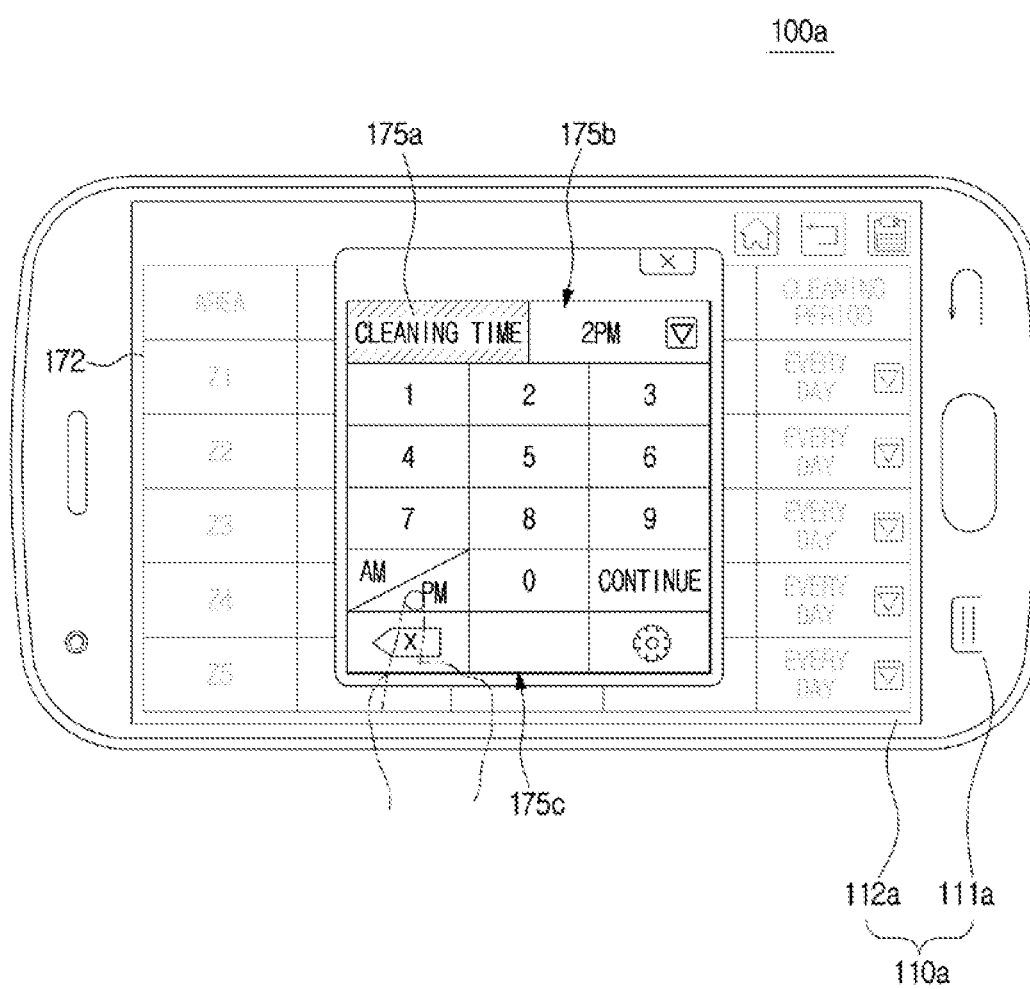

[Fig. 17]
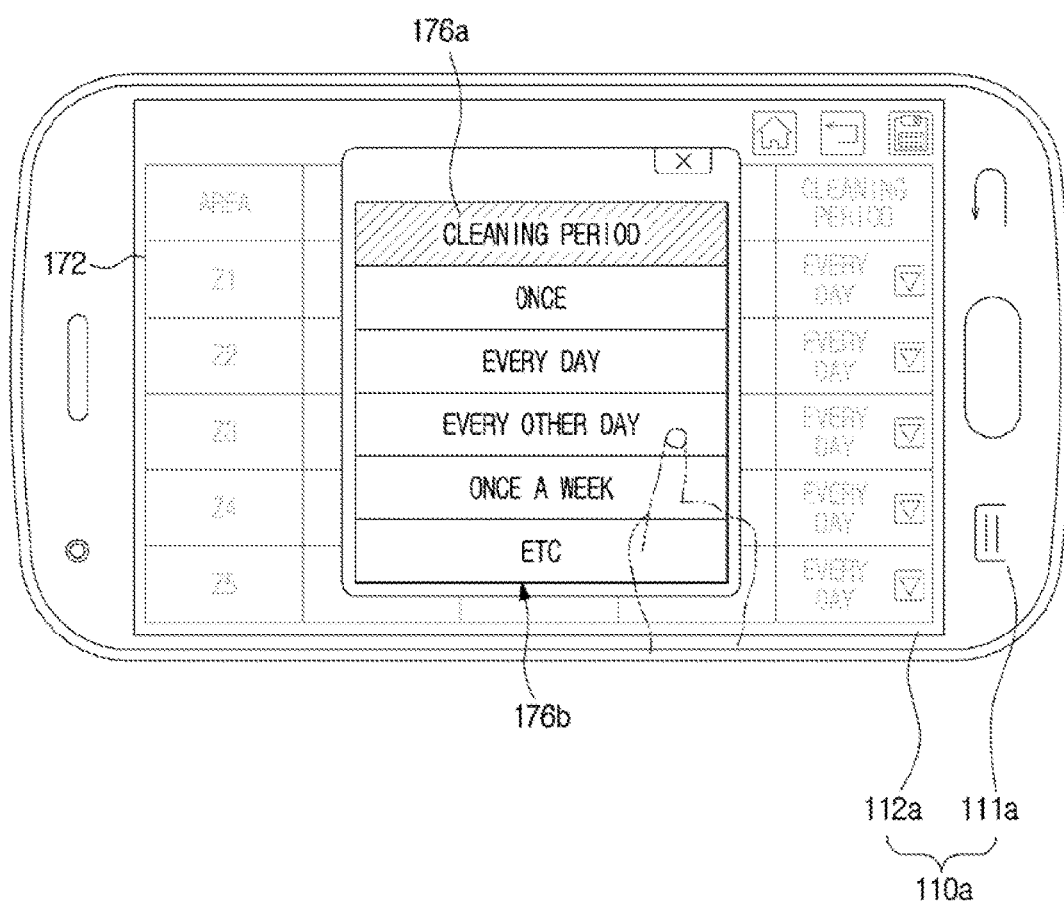

[Fig. 18]
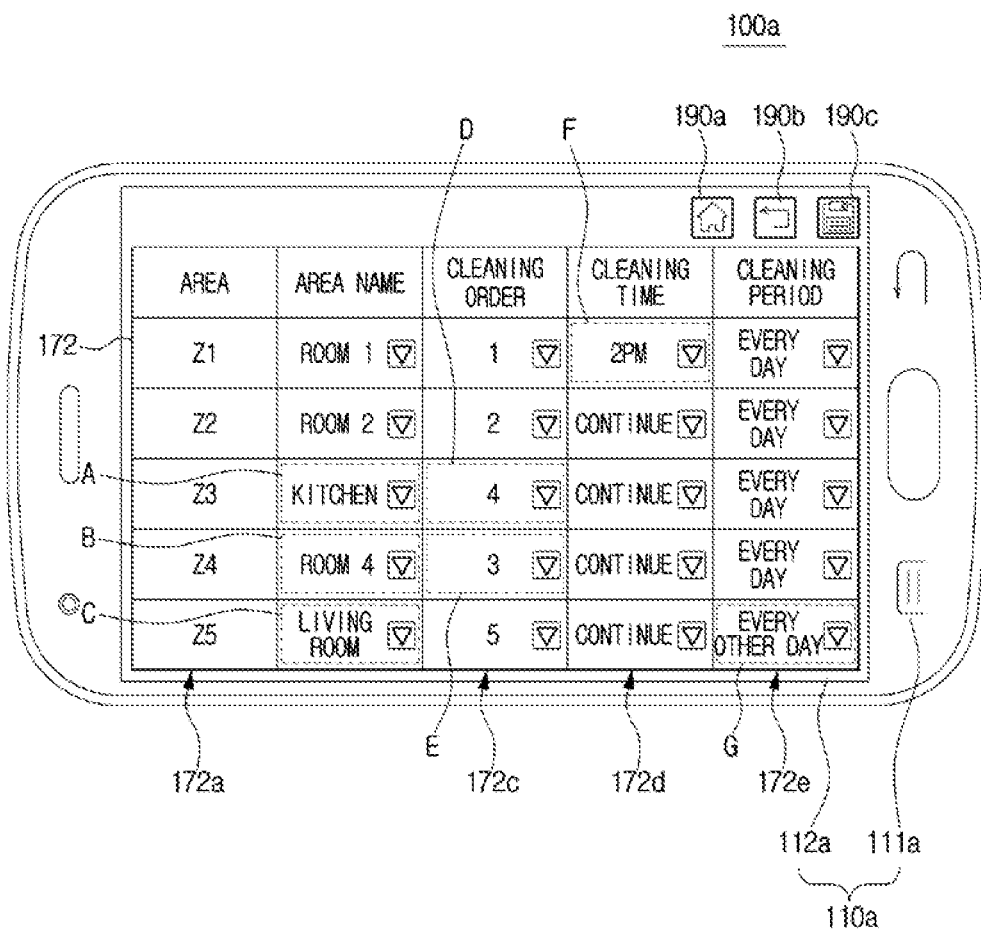

[Fig. 19]
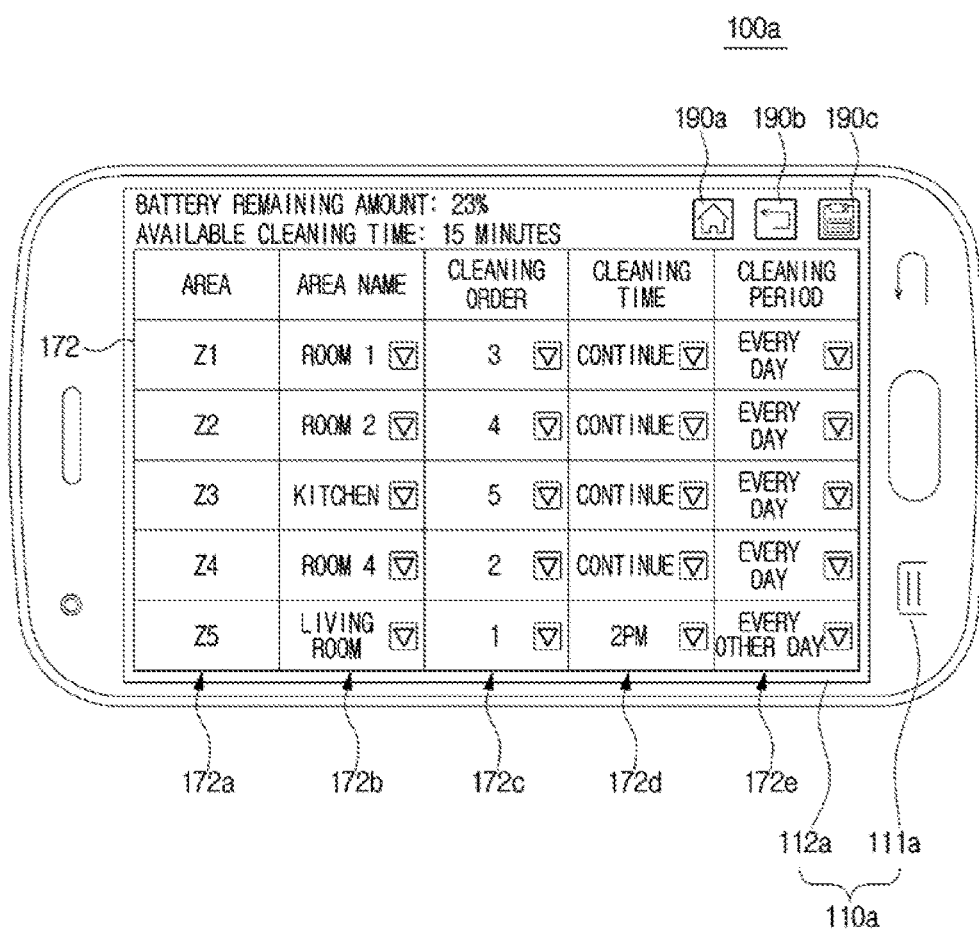

[Fig. 20]
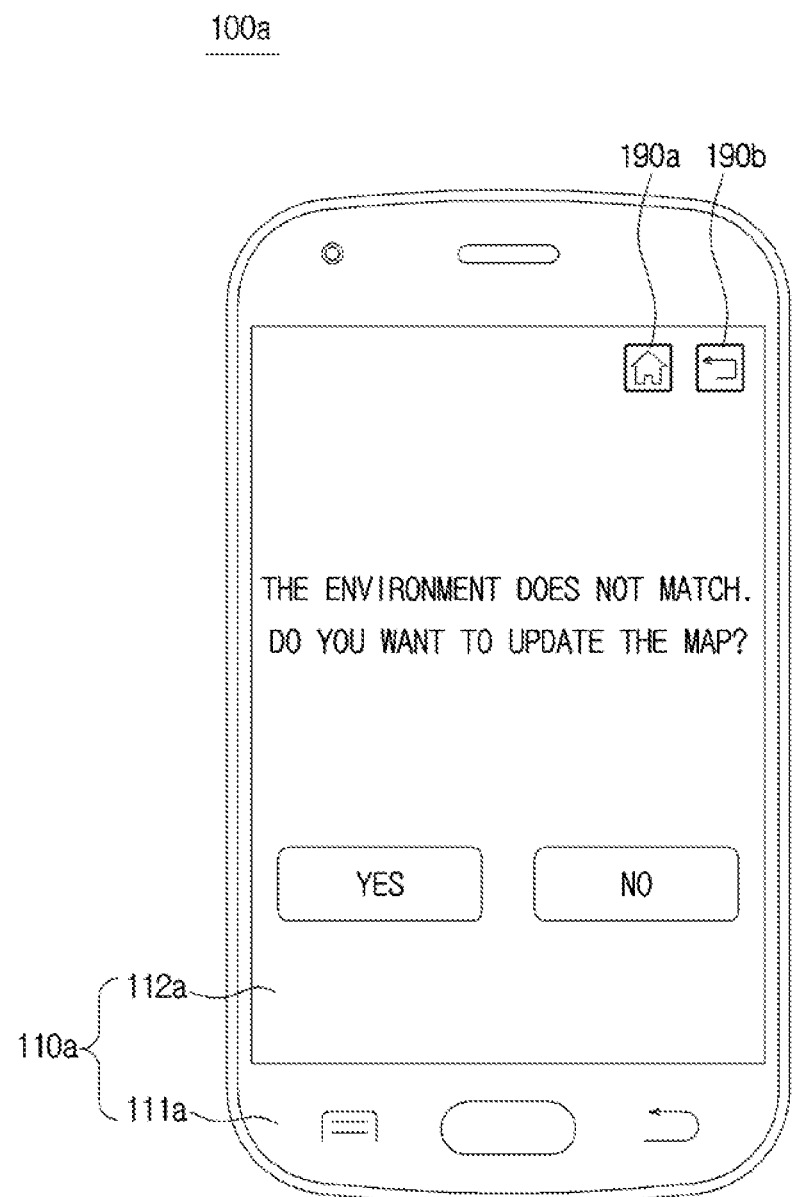

[Fig. 21]
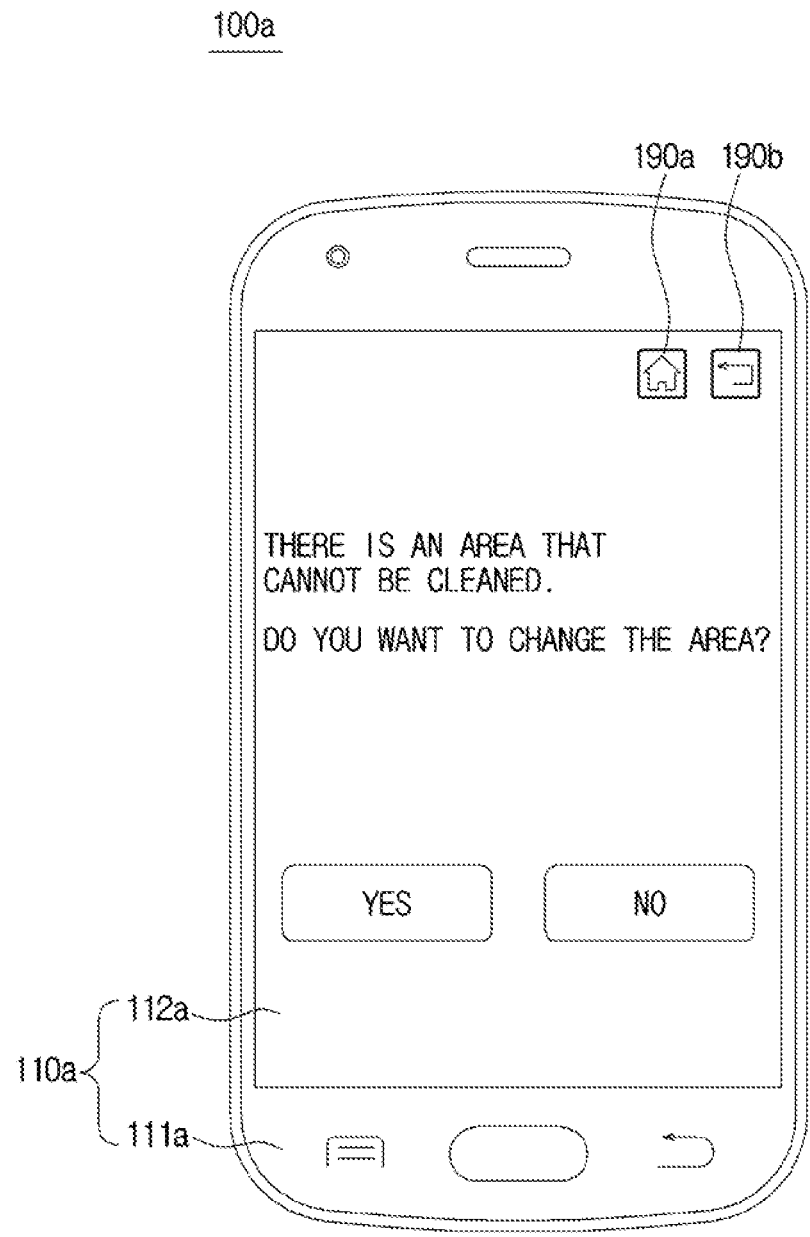

[Fig. 22]
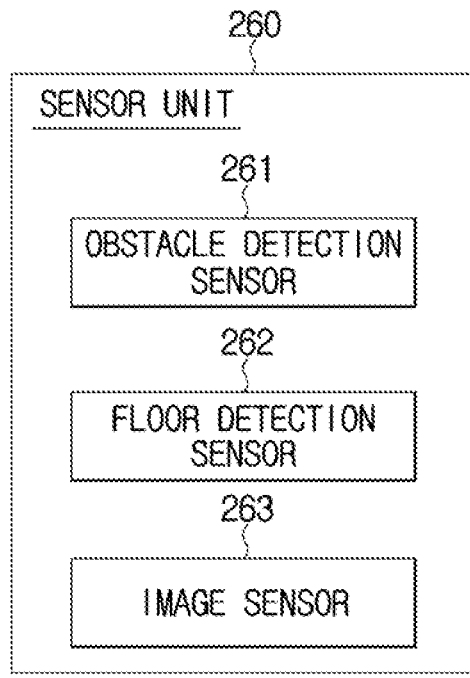
[Fig. 23]
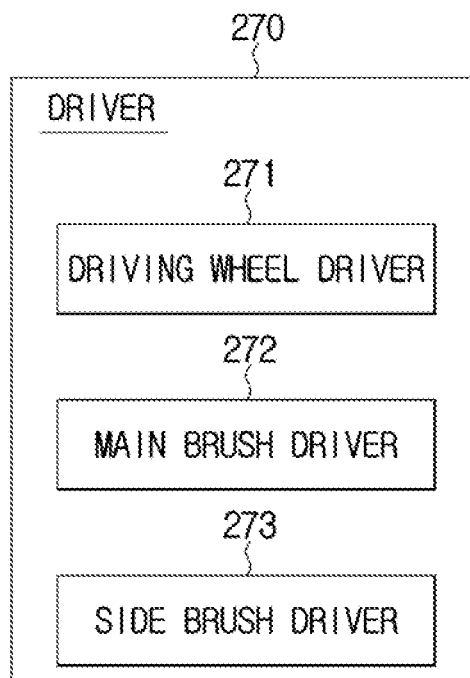

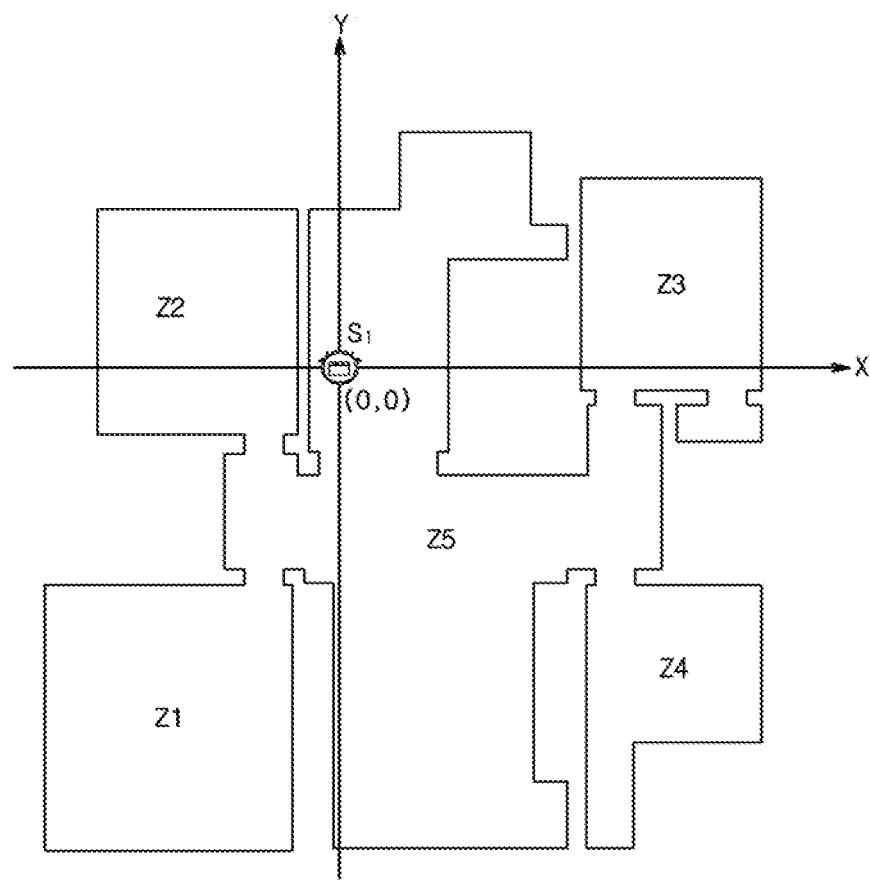
[Fig. 24]

[Fig. 25]
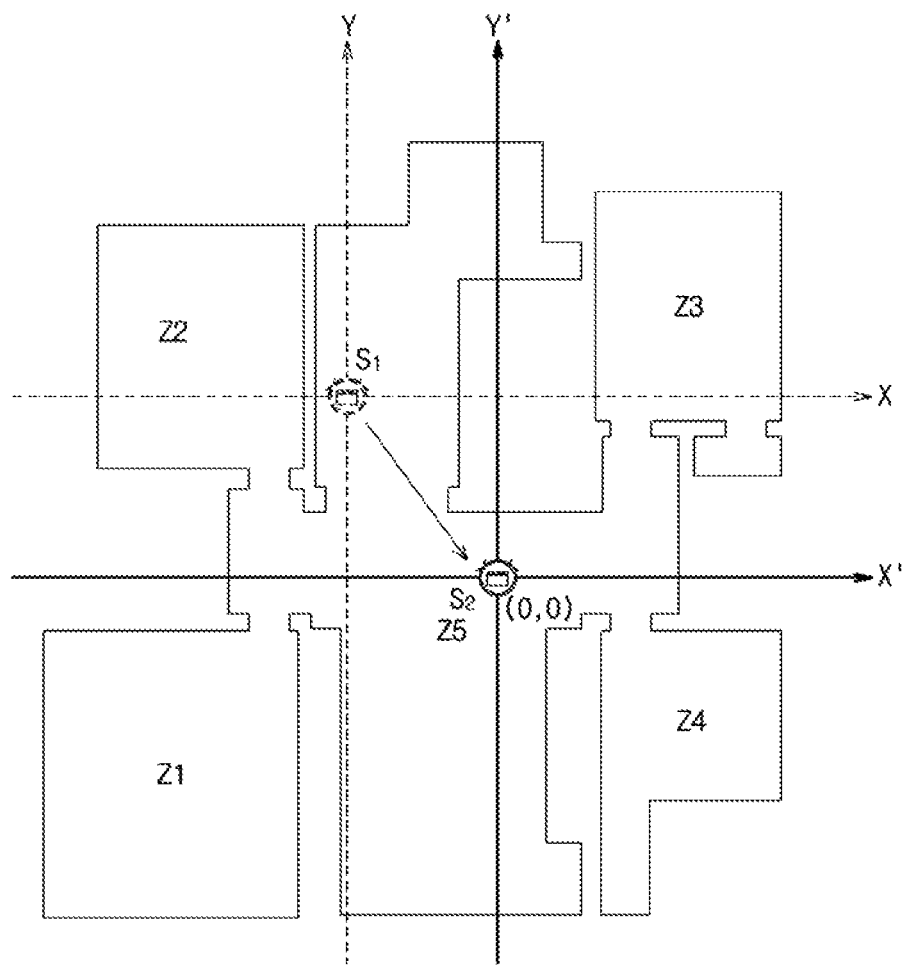

[Fig. 27]
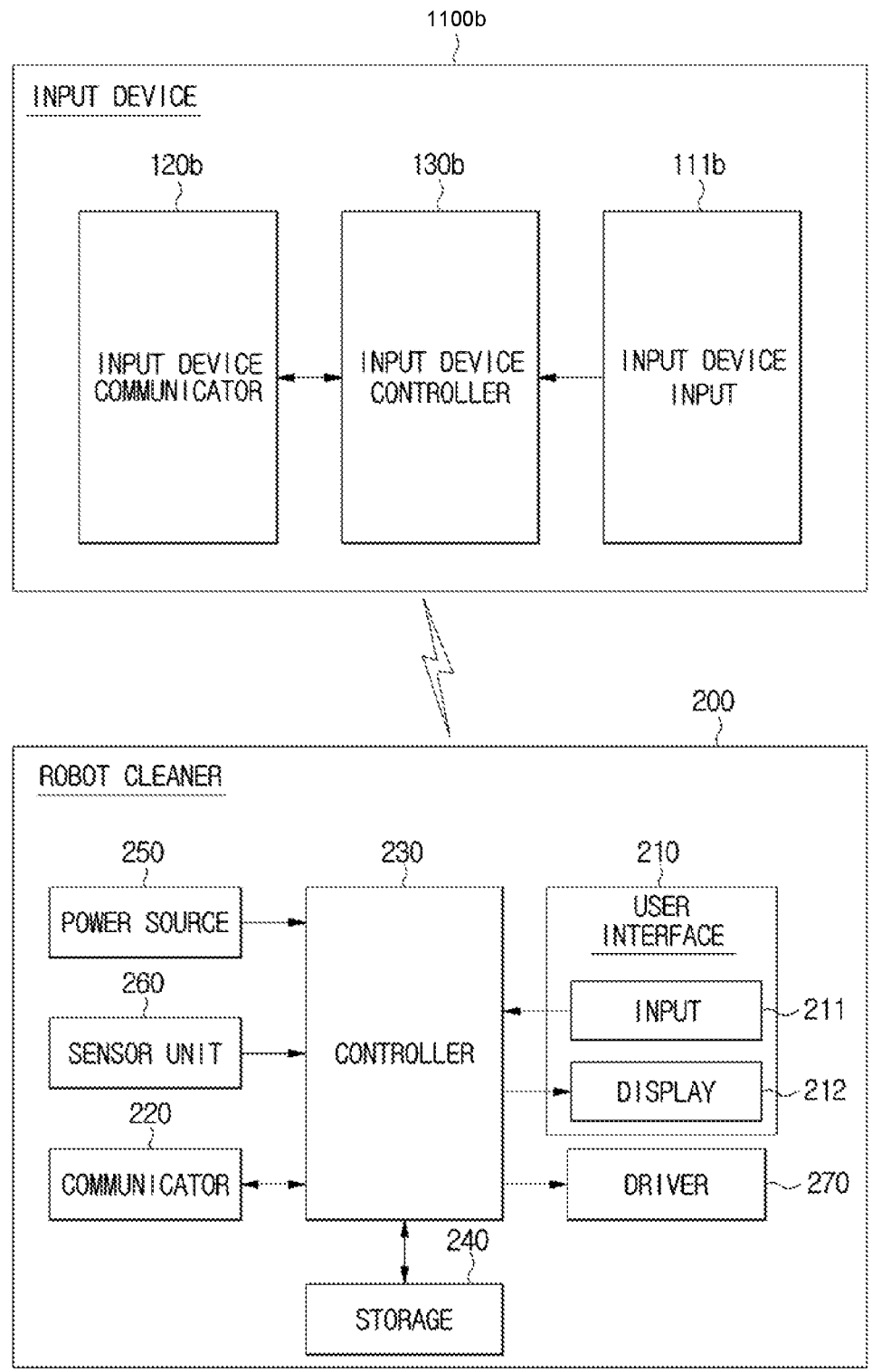

[Fig. 28]
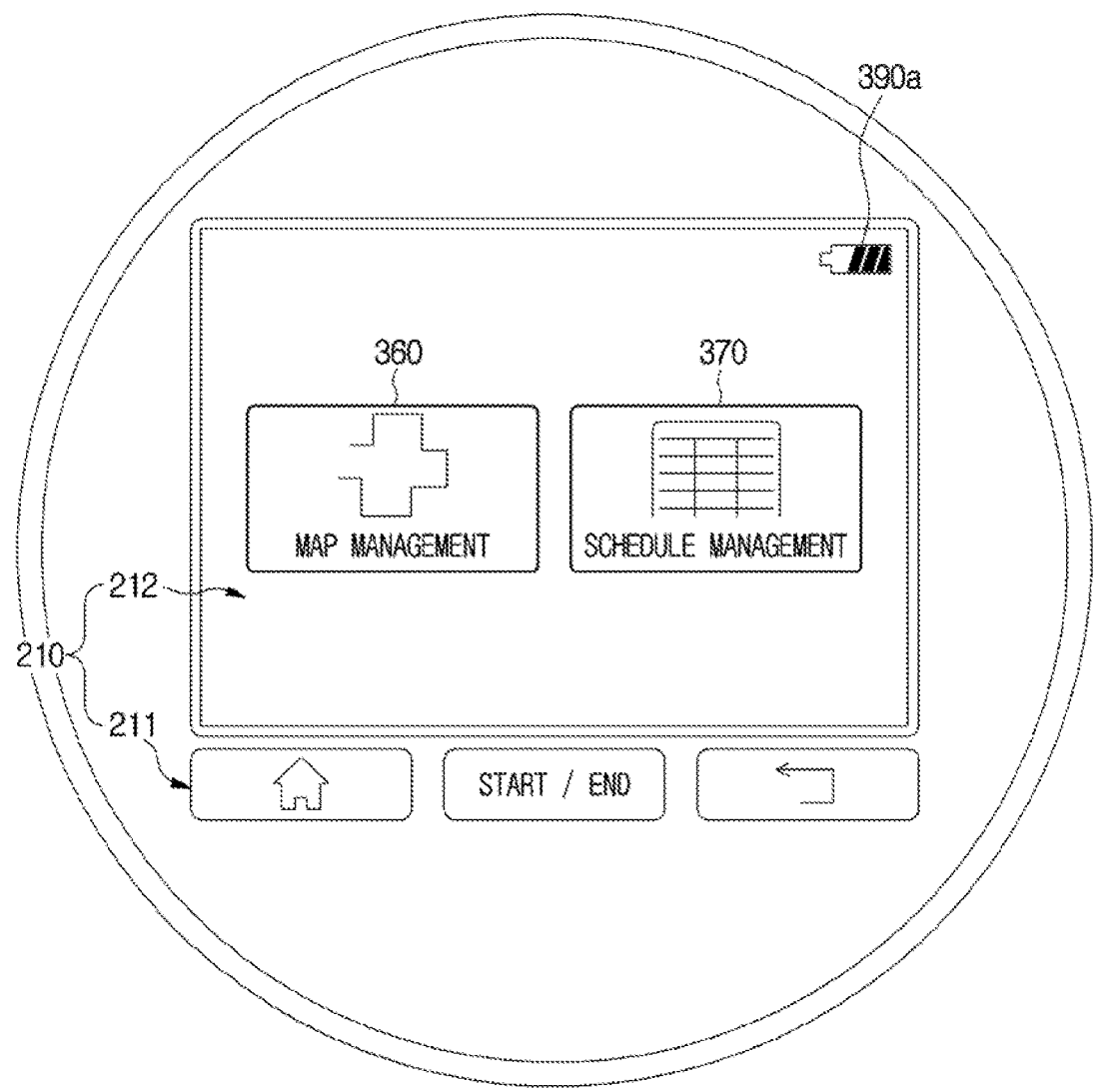

[Fig. 29]
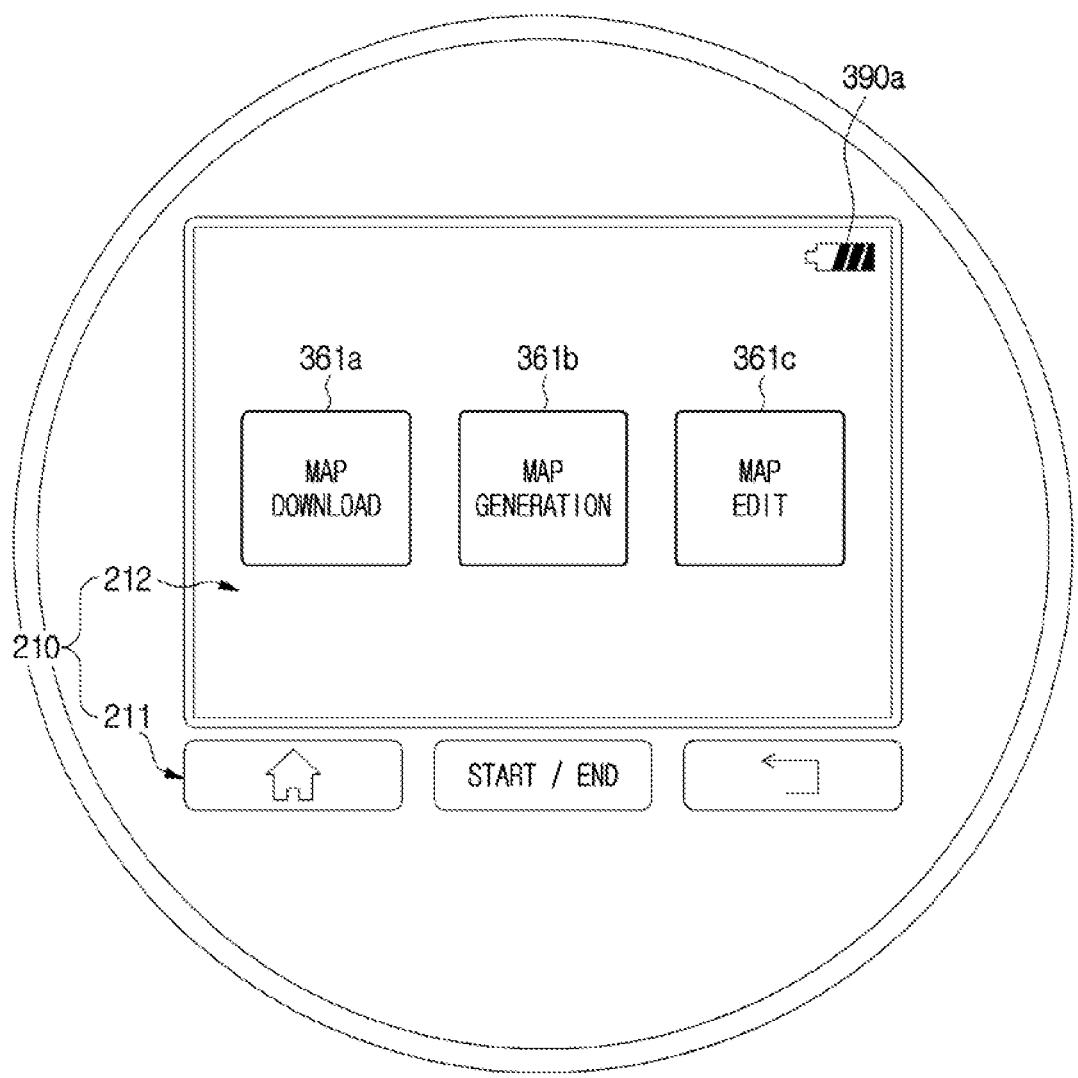

[Fig. 30]
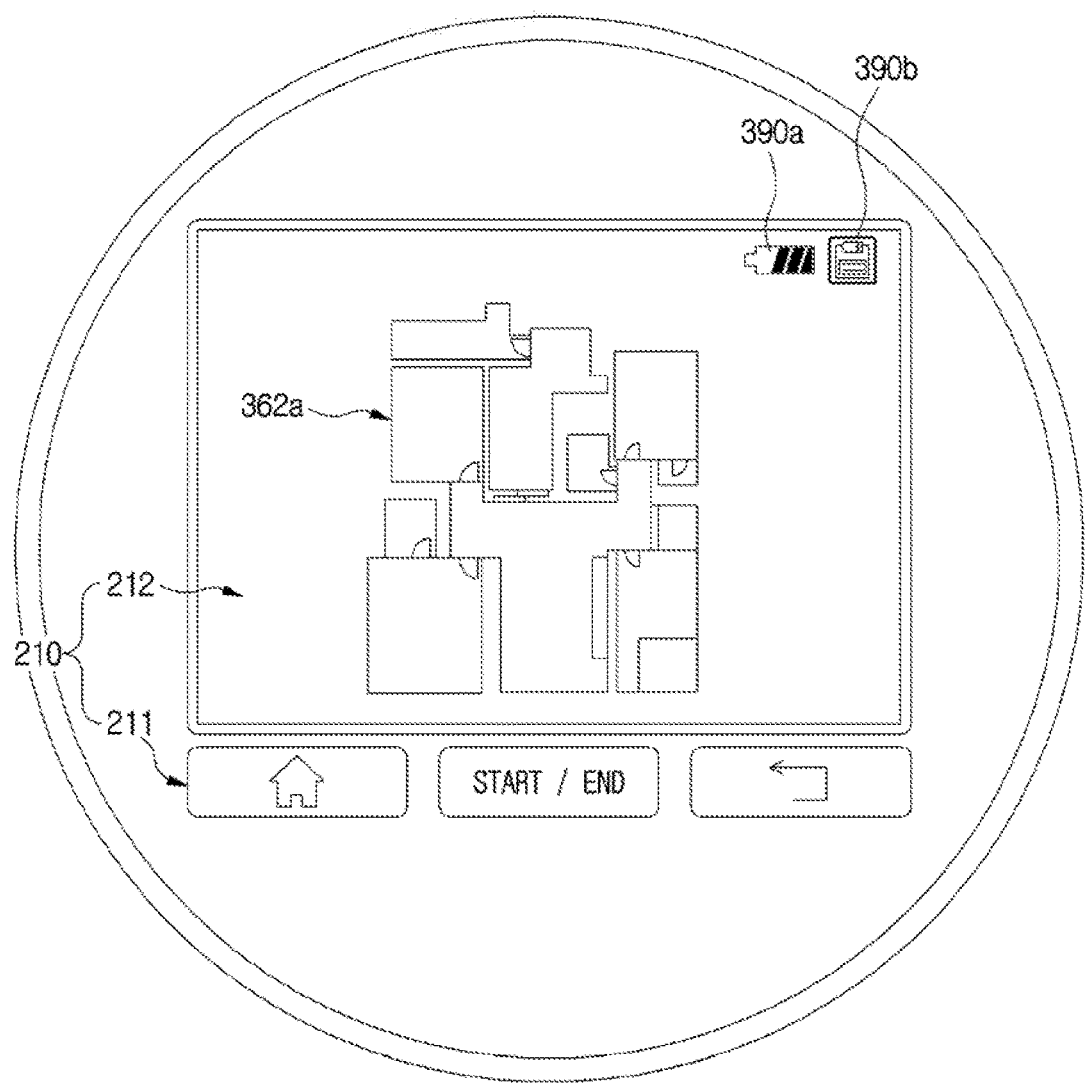

[Fig. 31]
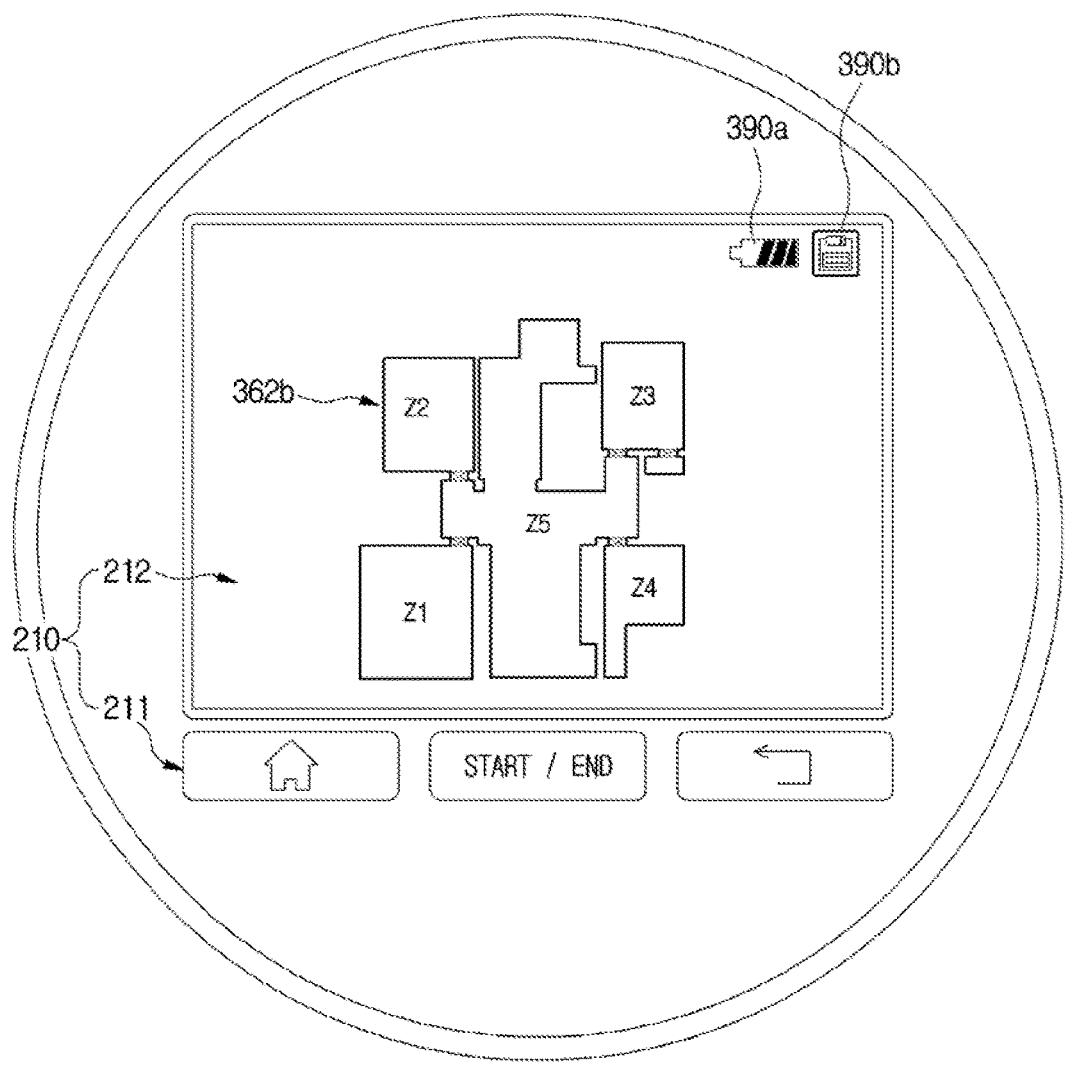

[Fig. 32]
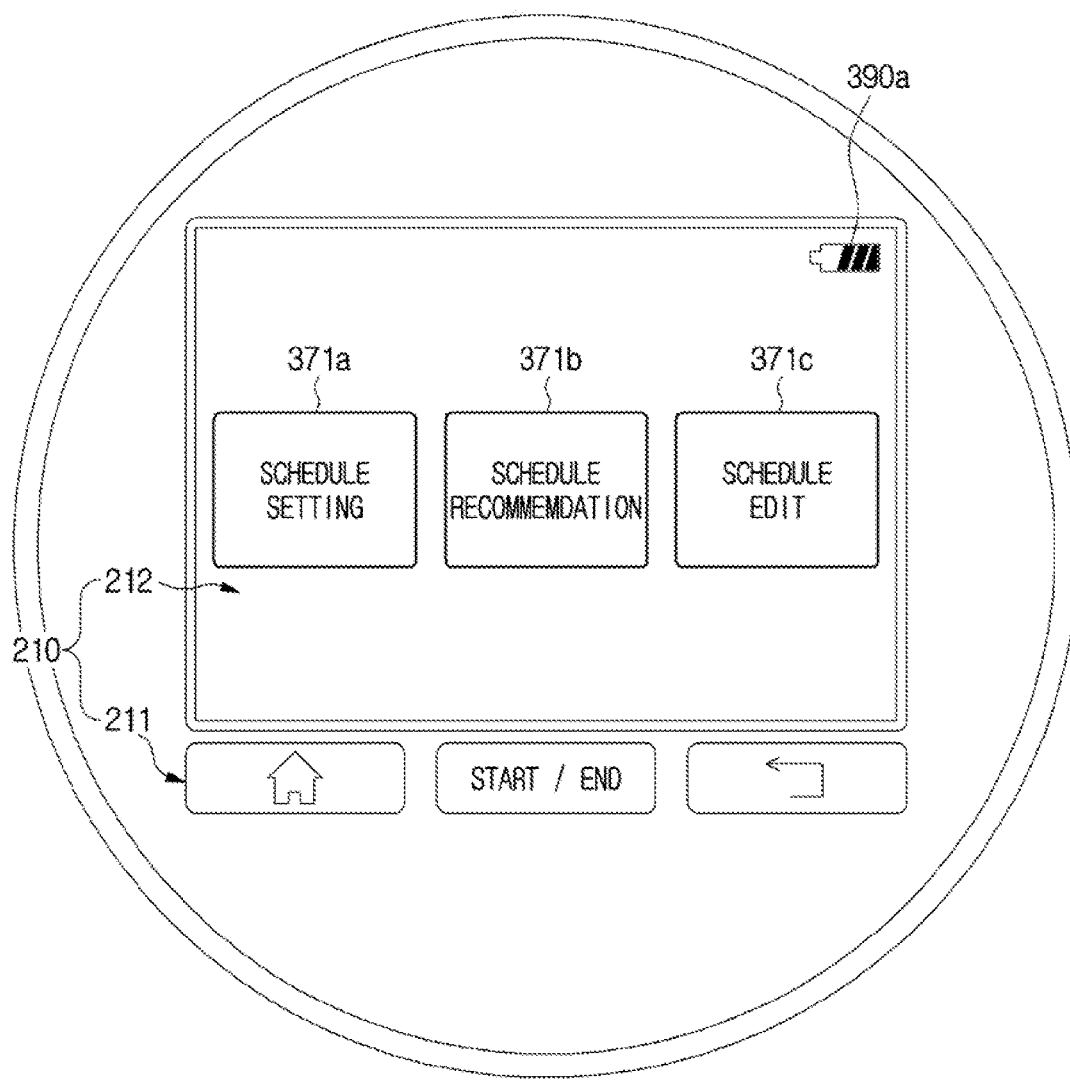

[Fig. 34]
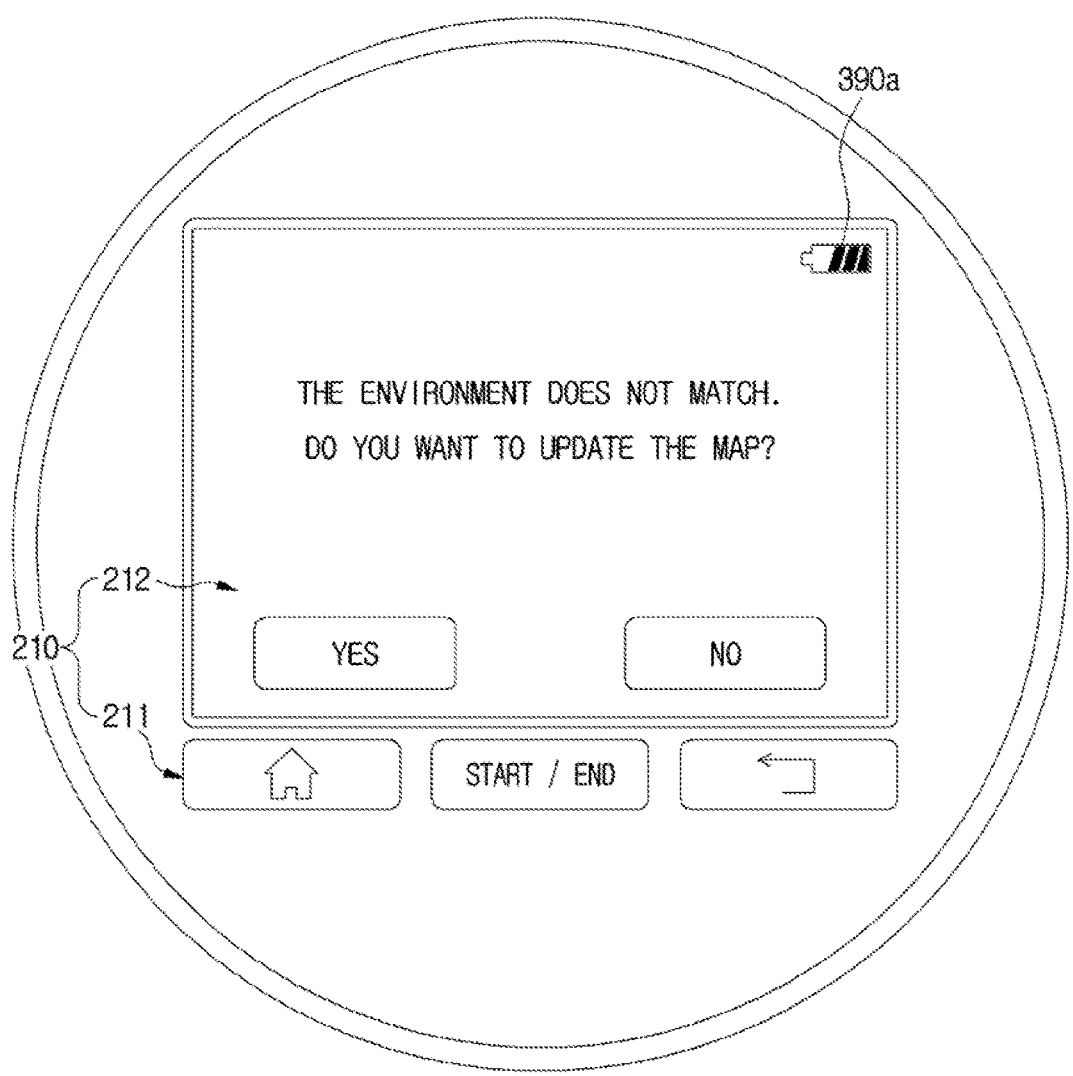

[Fig. 35]
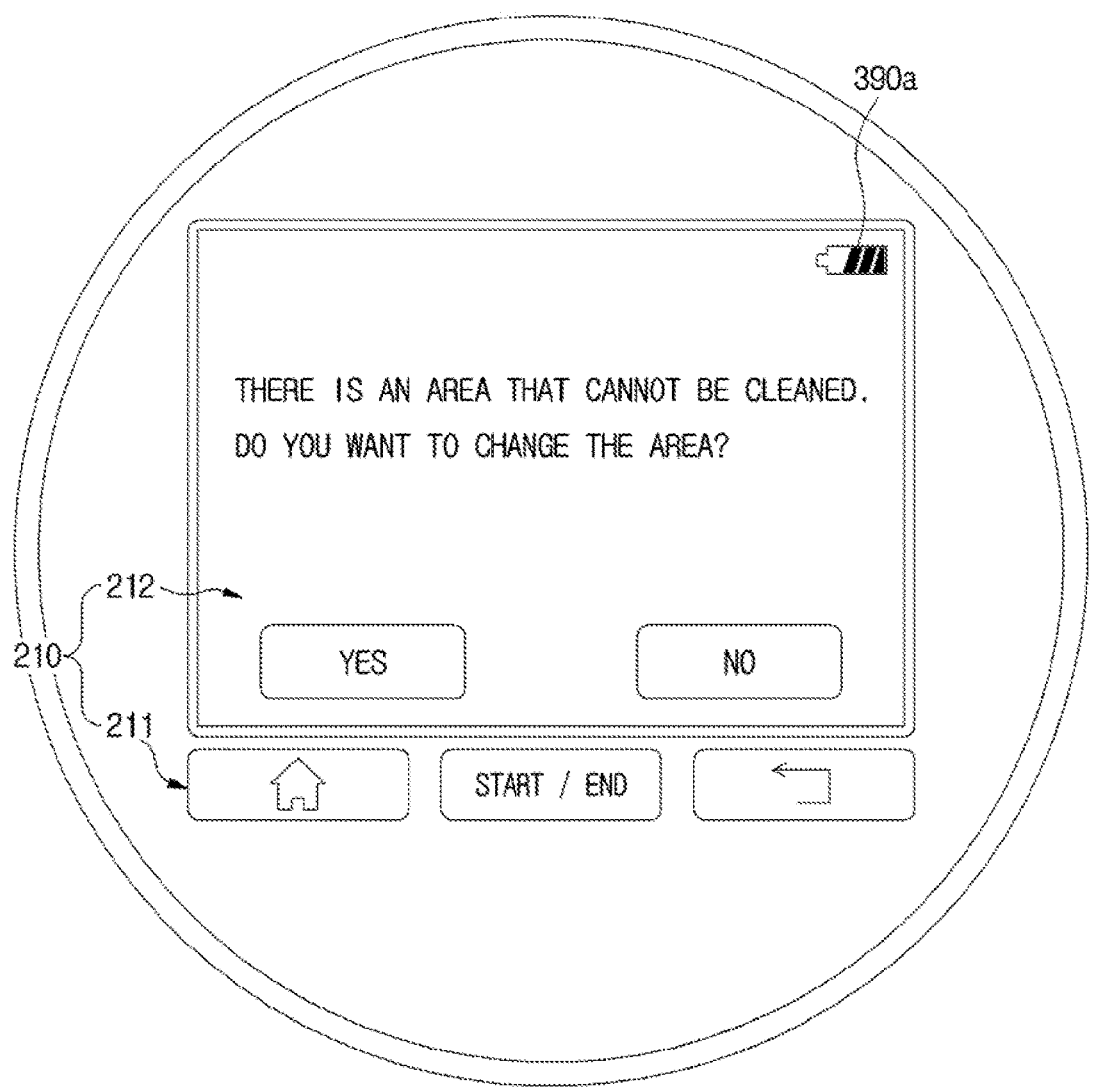

[Fig. 36]
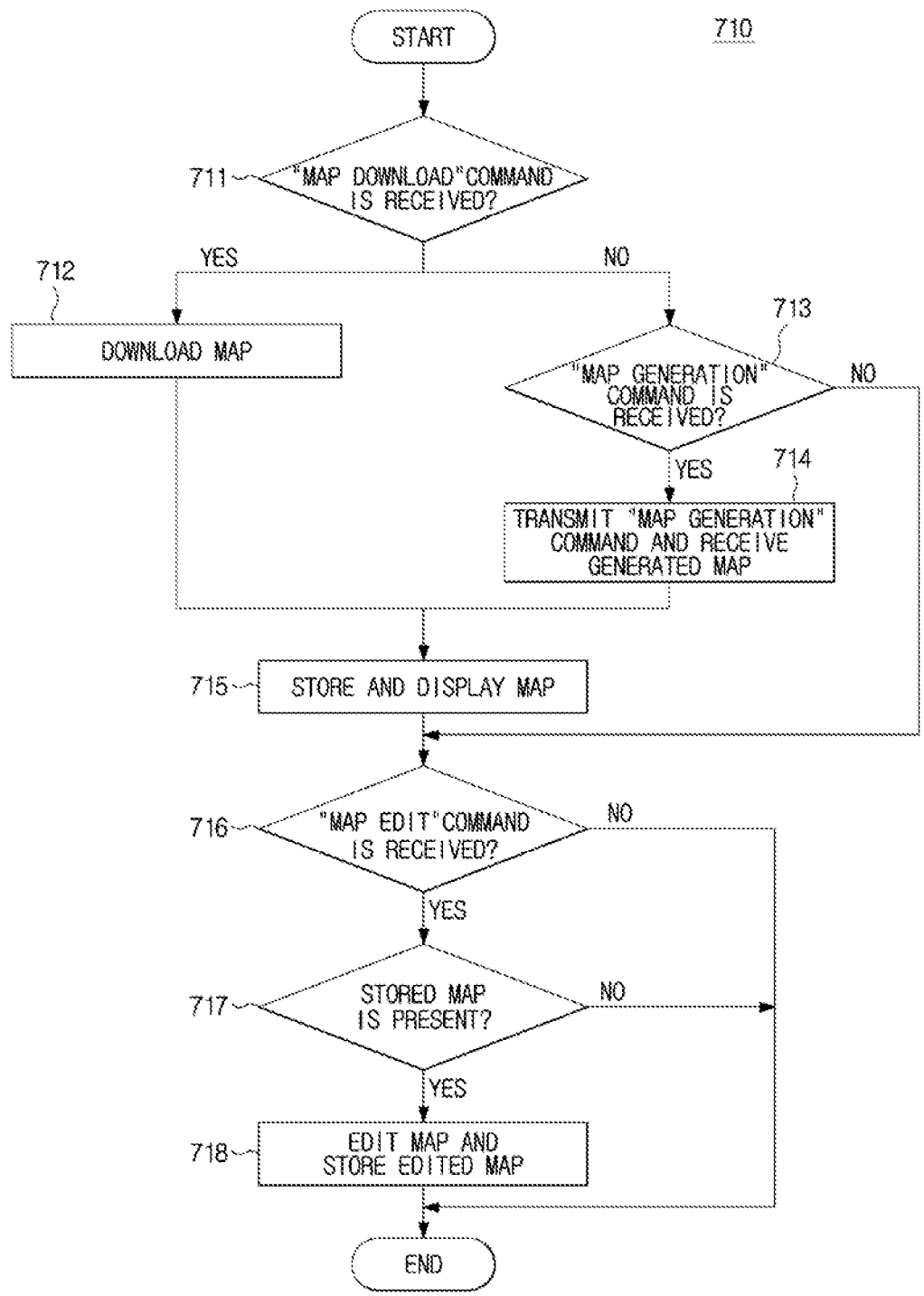

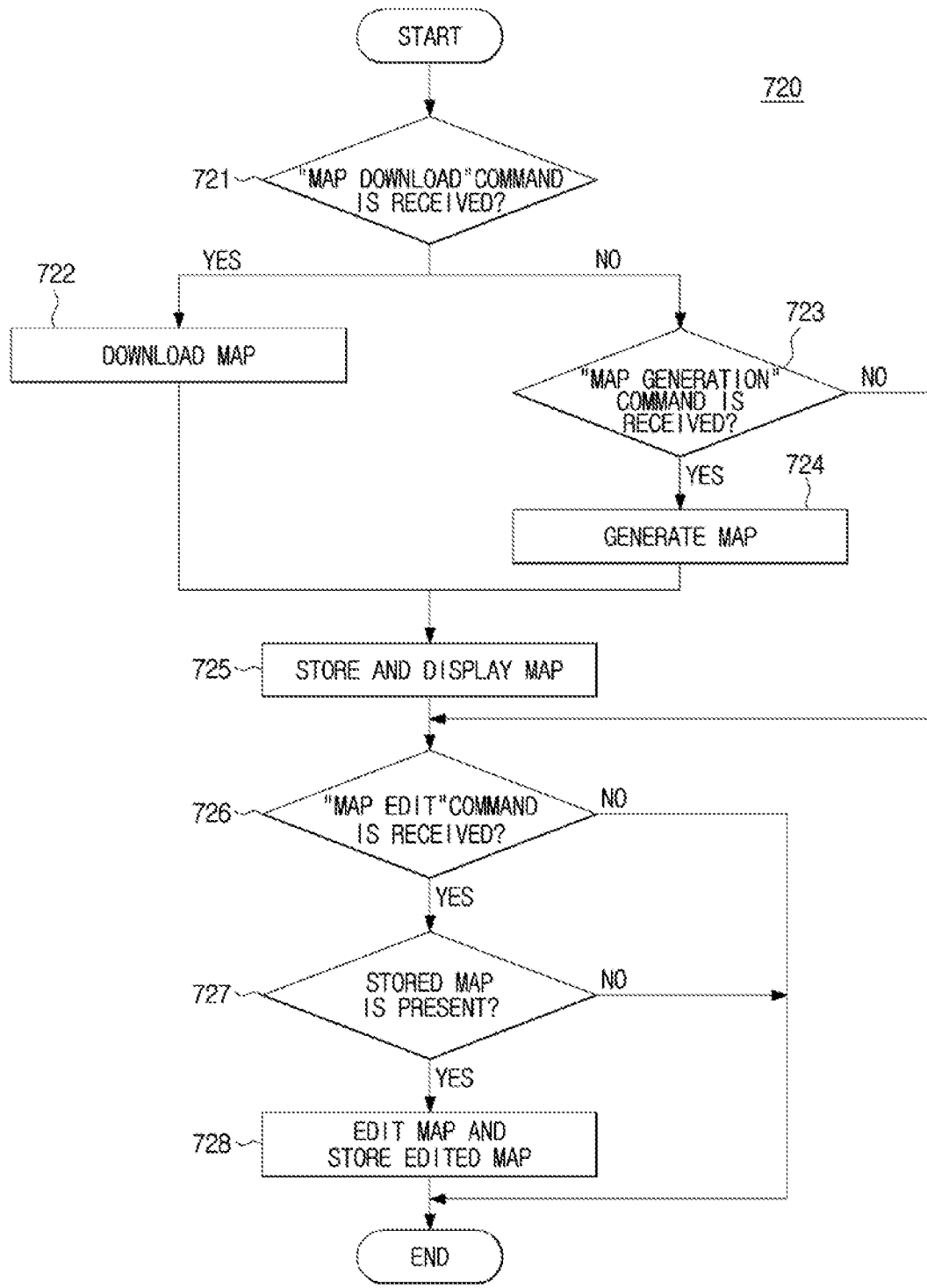
[Fig. 37]

[Fig. 38]
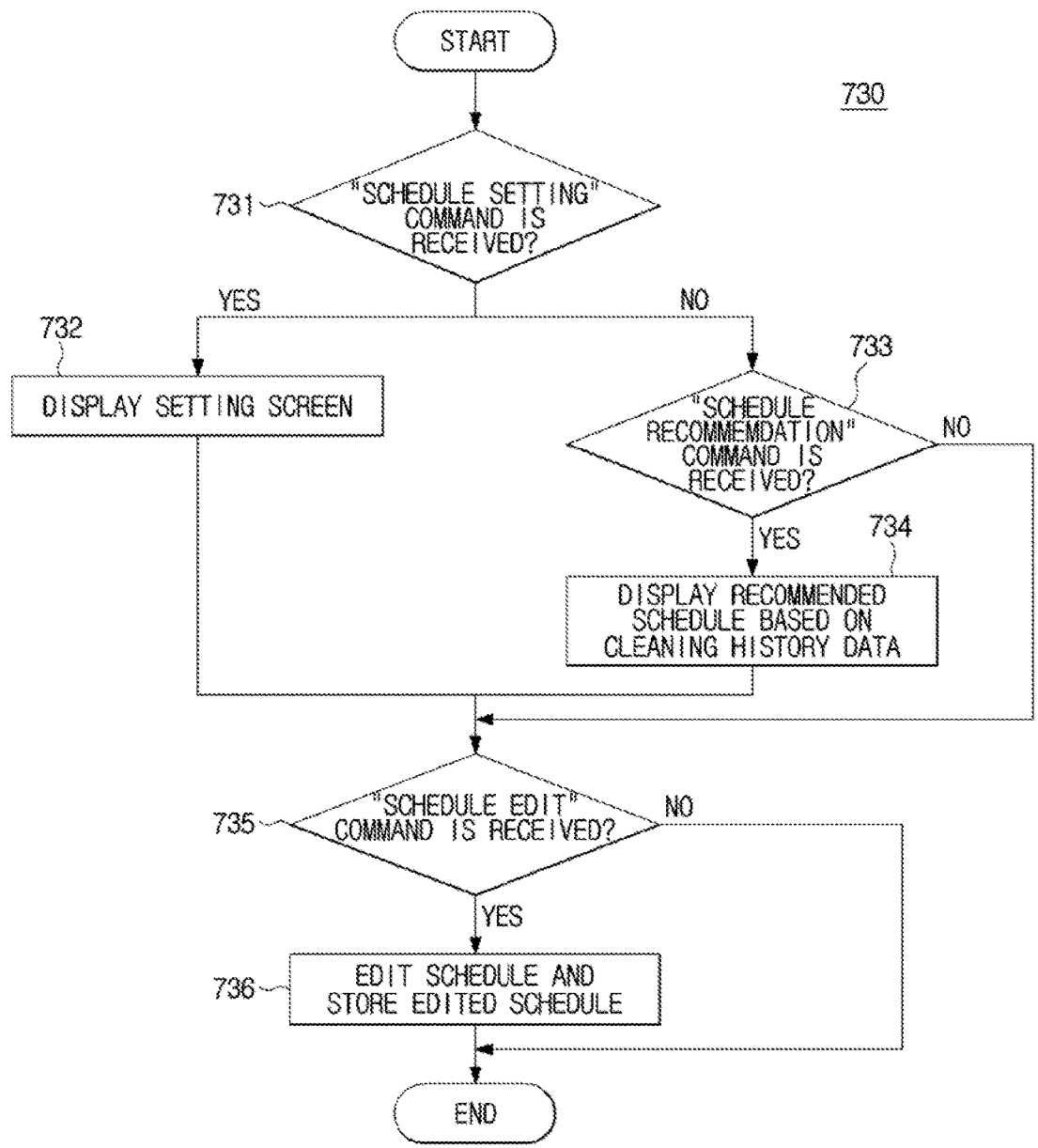

ROBOT CLEANER, CONTROL APPARATUS, CONTROL SYSTEM, AND CONTROL METHOD OF ROBOT CLEANER

CROSS-REFERENCE TO RELATED APPLICATIONS

This application is a U.S. National Stage Application, which claims the benefit under 35 U.S.C. § 371 of PCT International Patent Application No. PCT/KR2015/003979, filed Apr. 21, 2015, which claims the foreign priority benefit under 35 U.S.C. § 119 of Korean Patent Application No. 10-2014-0107445, filed Aug. 19, 2014, the contents of which are incorporated herein by reference.

TECHNICAL FIELD

Embodiments of the present disclosure relate to a robot cleaner, a control apparatus of the robot cleaner, a control system of the robot cleaner and a control method of the robot cleaner.

BACKGROUND ART

In general, robots have been developed for the industrial use and played as a part of the factory automation. In recent years, the field of application of robots has been expanded and medical robots and space robots have been developed. In addition, home robots that can be used in home have been developed.

A representative of the home robot is a robot cleaner wherein the robot cleaner represents an apparatus configured to automatically clean an area to be cleaned by suctioning foreign materials, e.g., dust, from a floor surface while traveling the area to be cleaned without user intervention. The robot cleaner detects obstacles placed in a cleaning area through a variety of sensors, and controls a driving path and a cleaning operation of the robot cleaner based on the detection result.

The initial robot cleaner performs a random cleaning while driving by itself and an area in which the cleaning cannot be cleaned may occur due to the presence of the obstacle and the condition of the floor surface. In order to compensate for this, techniques have been developed in which the cleaning is performed by dividing all the areas to be cleaned, i.e., the entire cleaning area into a plurality of cleaning areas or cells, or the cleaning is performed in a way of generating a cleaning map of the entire cleaning area and diving the generated cleaning map into an area already cleaned and an area to be cleaned.

DISCLOSURE

Technical Problem

Therefore, it is an aspect of the present disclosure to provide a robot cleaner, a control apparatus of the robot cleaner, a control system of the robot cleaner and a control method of the robot cleaner.

Technical Solution

Additional aspects of the disclosure will be set forth in part in the description which follows and, in part, will be obvious from the description, or may be learned by practice of the disclosure.

In accordance with one aspect of the present disclosure, a control apparatus of a robot cleaner may comprise a user interface unit configured to receive a user command controlling the robot cleaner; a controller configured to generate a control signal to receive a map of a cleaning area, based on the user command; and a communicator configured to receive the map of the cleaning area from an external server or the robot cleaner, based on the control signal.

Also, the user interface unit may receive a map download command from the user to download the map of the cleaning area from the external server.

Also, the user interface unit may receive a map generation command from the user so that the robot cleaner generates the map of the cleaning area.

Also, the communicator may transmit the map generation command to the robot cleaner and receives the generated map from the robot cleaner.

Also, the user interface unit may display the received map.

Also, the user interface unit may receive a map edit command configured to edit the received map, from the user.

Also, the edit may comprise at least one of converting a format of the received map into a format of the robot cleaner, dividing the cleaning area, merging the cleaning area, and deleting a part or entire of the cleaning area.

Also, the user interface unit may receive a schedule setting command configured to set a cleaning schedule of the cleaning area, from the user.

Also, the user interface unit may receive a schedule recommendation command from the user to recommend a cleaning schedule of the cleaning area that is appropriate for a state of the robot cleaner.

Also, the cleaning schedule may comprise at least one of a cleaning order, a cleaning time, and a cleaning period.

Also, the state of the robot cleaner may comprise at least one of a charging state of a battery provided in the robot cleaner, a remaining amount of the battery, a cleaning available time of the robot cleaner.

Also, the controller may generate a cleaning schedule of the cleaning area that is appropriate for the state of the robot cleaner, based on a cleaning history data of the robot cleaner.

Also, the cleaning history data may comprise at least one of an area of the cleaning area, a driving speed for the cleaning area, power consumption about the cleaning area, and a cleaning time required for the cleaning area.

Also, the user interface unit may receive a schedule edit command configured to edit the recommended cleaning schedule, from the user Also, when an environment of the cleaning area does not match with the received map or the edited map, the user interface unit may display that the environment does not match.

Also, when an area that cannot be cleaned is present in the cleaning area, the user interface unit may display that the area that cannot be cleaned is present.

In accordance with one aspect of the present disclosure, a robot cleaner may comprise a user interface unit configured to receive a user command; and a controller configured to generate a control signal to download a map of a cleaning area from an external server or configured to generate a map of the cleaning area based on the user command.

Also, the user interface unit may receive a map download command from the user to download the map of the cleaning area, from the external server.

Also, the user interface unit may receive map generation command from the user so that the controller generates a map of the cleaning area.

Also, the user interface unit may display the downloaded map or the generated map.

Also, the user interface unit may receive a map edit command configured to edit the downloaded map or the generated map, from the user.

Also, the user interface unit may receive a schedule setting command configured to set a cleaning schedule of the cleaning area, from the user.

Also, the user interface unit may receive a schedule recommendation command from the user to recommend a cleaning schedule of the cleaning area, which is appropriate for a state of the robot cleaner.

Also, the controller may generate a cleaning schedule of the cleaning area that is appropriate for the state of the robot cleaner based on a cleaning history data of the robot cleaner.

Also, the user interface unit may receive a schedule edit command configured to edit the recommended cleaning schedule, from the user Also, when an environment of the cleaning area does not match with the received map or the edited map, the user interface unit may display that the environment does not match.

Also, the controller may update the generated map or the edited map when the environment does not match.

Also, when an area that cannot be cleaned is present in the cleaning area, the user interface unit may display that the area that cannot be cleaned is present.

Also, the controller may control driving wheels so that the driving wheels performs an area movement when the area that cannot be cleaned is present.

In accordance with one aspect of the present disclosure, a control system of a robot cleaner may comprise a robot cleaner; and a control apparatus configured to control the robot cleaner; wherein the control apparatus comprises a user interface unit configured to receive a user command; a controller configured to generate a control signal to receive a map of a cleaning area, based on the user command; and a communicator configured to receive the map of the cleaning area from an external server or the robot cleaner, based on the control signal.

In accordance with one aspect of the present disclosure, a control method of a robot cleaner may comprise receiving a map of a cleaning area from an external server or a robot cleaner; and displaying the received map.

Also, the control method of a robot cleaner may further comprise editing the received map in response to a user command.

Also, the control method of a robot cleaner may further comprise setting a cleaning schedule of the cleaning area in response to a user command.

Also, the control method of a robot cleaner may further comprise generating a cleaning schedule of the cleaning area that is appropriate for the state of the robot cleaner, based on a cleaning history data of the robot cleaner.

Also, the control method of a robot cleaner may further comprise editing the generated cleaning schedule in response to a user command.

Also, the control method of a robot cleaner may further comprise displaying that an environment does not match, when the environment of the cleaning area does not match with the received map or the edited map.

Also, the control method of a robot cleaner may further comprise updating the generated map or the edited map when the environment does not match.

Also, the control method of a robot cleaner may further comprise displaying that an area that cannot be cleaned is present when the area that cannot be cleaned is present in the cleaning area.

Also, the control method of a robot cleaner may further comprise controlling driving wheels so that the driving wheels performs an area movement when the area that cannot be cleaned is present.

In accordance with still another aspect of the present disclosure, a control method of a robot cleaner may comprise downloading a map of a cleaning area from an external server or generating a map of the cleaning area; and displaying the downloaded map or the generated map.

Also, the control method of a robot cleaner may further comprise editing the downloaded map or the generated map in response to a user command.

Also, the control method of a robot cleaner may further comprise setting a cleaning schedule of the cleaning area in response to a user command.

Also, the control method of a robot cleaner may further comprise generating a cleaning schedule of the cleaning area that is appropriate for the state of the robot cleaner, based on a cleaning history data of the robot cleaner.

Also, the control method of a robot cleaner may further comprise editing the generated cleaning schedule in response to a user command.

Also, the control method of a robot cleaner may further comprise displaying that an environment does not match, when the environment of the cleaning area does not match with the received map or the edited map.

Also, the control method of a robot cleaner may further comprise updating the generated map or the edited map when the environment does not match.

Also, the control method of a robot cleaner may further comprise displaying that an area that cannot be cleaned is present when the area that cannot be cleaned is present in the cleaning area.

Also, the control method of a robot cleaner may further comprise controlling driving wheels so that the driving wheels performs an area movement when the area that cannot be cleaned is present.

Advantageous Effects

In accordance with one aspect of the present disclosure, it may be possible to download or generate a map of a cleaning area and to allow a map editing to be performed by a user. In addition, it may be possible to set and edit a cleaning schedule, e.g., priority of cleaning area, a cleaning time, and a cleaning period. When setting the cleaning schedule, it may be possible to provide a function of recommending a cleaning schedule based on cleaning history data.

In accordance with another aspect of the present disclosure, it may be possible to automatically determine whether the environment is changed or whether the cleaning is available, during the robot cleaner performs the cleaning, and it may be possible to actively deal with this. In addition, it may be possible to improve the user convenience of the robot cleaner by providing a user interface.

DESCRIPTION OF DRAWINGS

These and/or other aspects of the present disclosure will become apparent and more readily appreciated from the following description of the embodiments, taken in conjunction with the accompanying drawings of which:

FIG. 1 is a view illustrating a control system of a robot cleaner.

FIG. 4 is a control block diagram illustrating a control system 1 of the robot cleaner.

FIG. 5A is a view illustrating a home screen of a display of a terminal device.

FIG. 5B is a view illustrating changing a screen according to executing an application.

FIG. 6 is a view illustrating a screen for the map management.

FIG. 7 is a view illustrating a screen of a terminal device display displaying a downloaded map.

FIG. 8 is a view illustrating an example of map editing.

FIG. 9 is a view illustrating another example of map editing.

FIG. 10 is a view illustrating an example of a map generated by the robot cleaner and displayed on the terminal device display.

FIG. 11 is a view illustrating another example of map editing.

FIG. 13 is a view illustrating a setting screen for the cleaning schedule.

FIGS. 14A and 14B are views illustrating setting of area names.

FIG. 15 is a view illustrating setting of cleaning order.

FIG. 16 is a view illustrating setting of cleaning time.

FIG. 17 is a view illustrating setting of cleaning period.

FIG. 18 is a view illustrating a screen in which setting the cleaning schedule is completed.

FIG. 19 is a view illustrating a case in which a cleaning schedule based on cleaning history data is displayed on the terminal device display.

FIG. 20 is a view illustrating a screen according to the mismatch of the environment.

FIG. 21 is a view illustrating a screen of the terminal device display indicating that the cleaning is impossible.

FIG. 22 is a view illustrating an exemplary configuration of the sensor.

FIG. 23 is a view illustrating an example of a configuration of driver.

FIG. 24 and FIG. 25 are views illustrating a screen for the map management.

FIG. 27 is a control block diagram illustrating a control system of the robot cleaner according to another embodiment.

FIG. 28 is a view illustrating a configuration of the user interface of the robot cleaner.

FIG. 29 is a view illustrating a screen according to the mismatch of the environment.

FIG. 30 is a view illustrating a screen of a display displaying a downloaded map.

FIG. 31 is a view illustrating an example of map editing.

FIG. 32 is a view illustrating an example of a screen for the schedule management.

FIG. 34 is a view illustrating a screen according to the mismatch of the environment.

FIG. 35 is a view illustrating a screen of a display indicating that the cleaning is impossible.

FIG. 36 is a flow chart illustrating a control method of the robot cleaner according to an embodiment.

FIG. 37 is a flow chart illustrating a control method of a robot cleaner according to another embodiment.

FIG. 38 is a flow chart illustrating a control method of a robot cleaner according to alternate another embodiment.

BEST MODE

The present disclosure will be described more fully hereinafter with reference to the accompanying drawings, in which exemplary embodiments of the present disclosure are shown. As those skilled in the art would realize, the described embodiments may be modified in various different ways, all without departing from the spirit or scope of the present disclosure.

Hereinafter, a robot cleaner, a control apparatus of the robot cleaner, a control system of the robot cleaner and a control method of the robot cleaner will be described in detail with reference to the accompanying drawings. Like numbers refer to like elements throughout the drawings.

Figure 2:
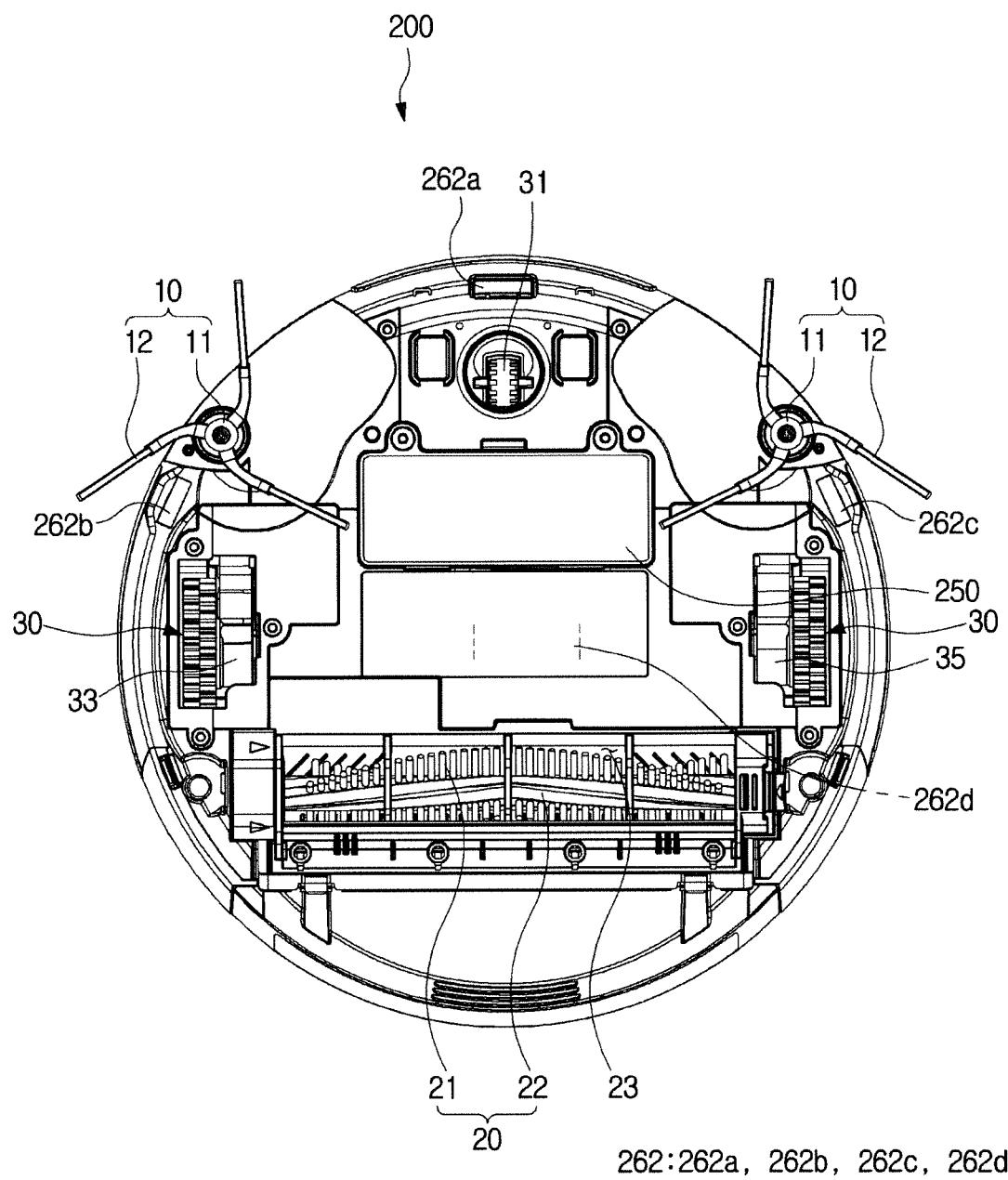
FIG. 2 is a bottom view illustrating the robot cleaner.
Figure 3A:
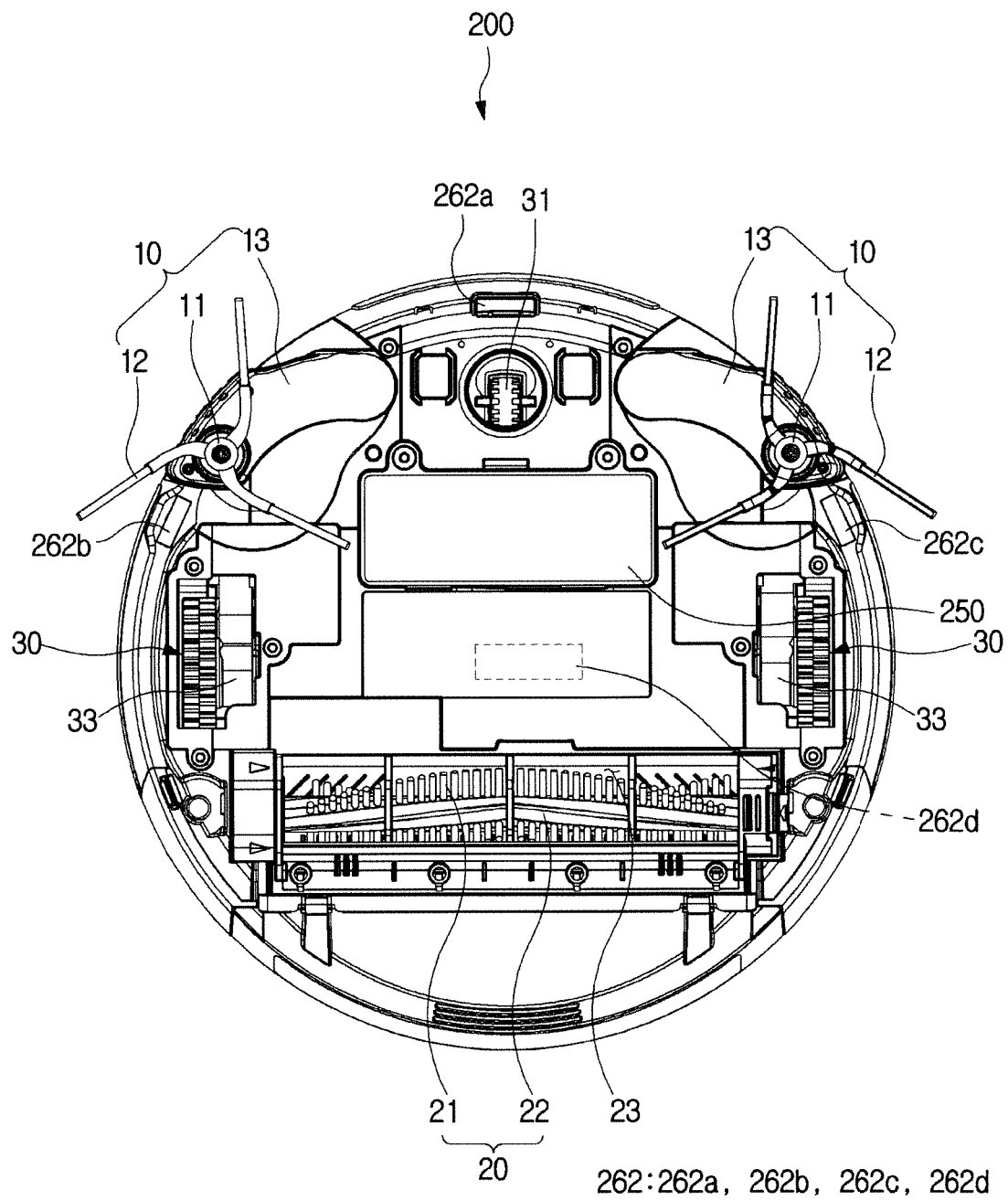
FIGS. 3A and 3B are bottom views illustrating a robot cleaner.
Figure 3B:
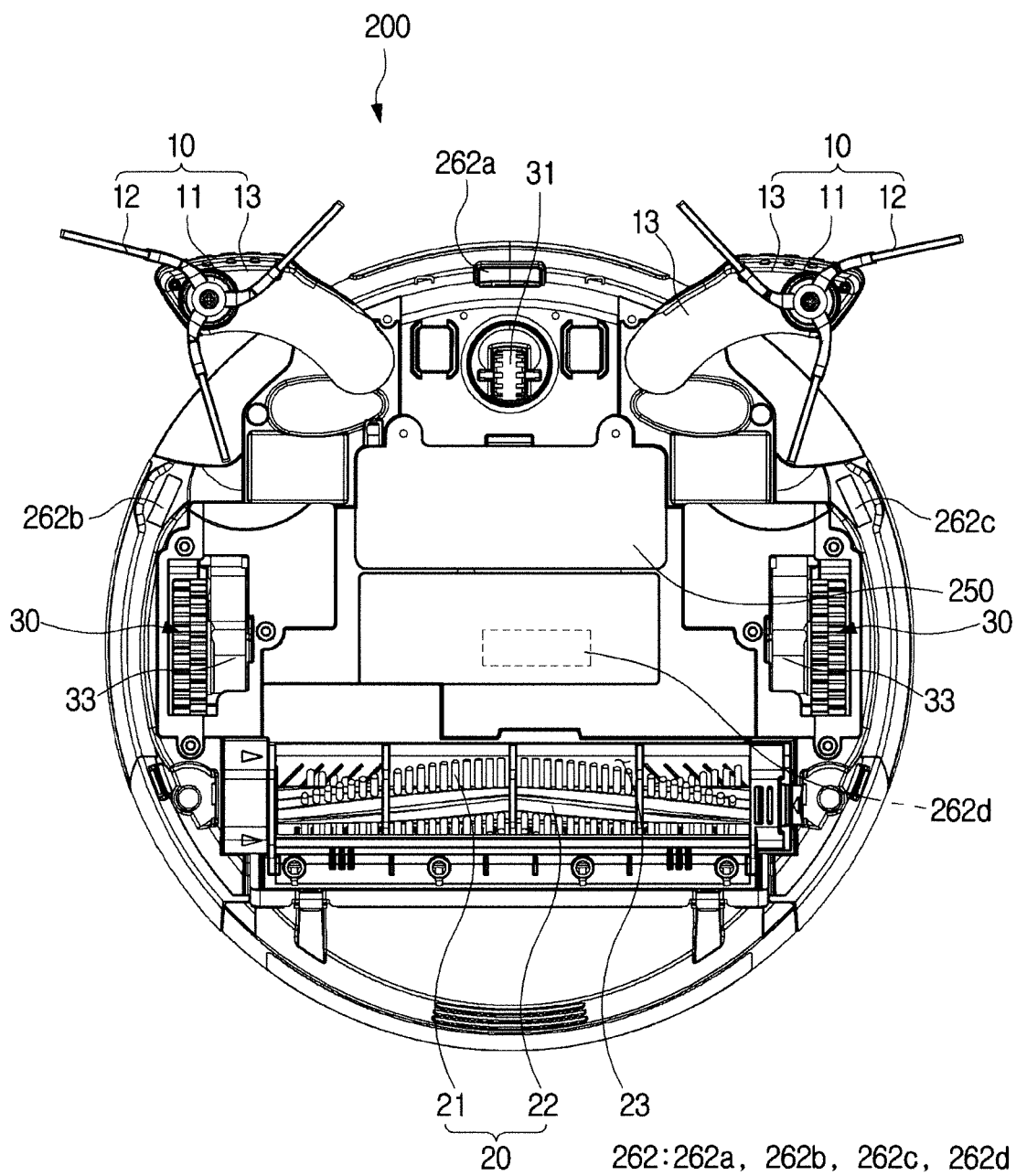

FIG. 1 is a view illustrating a control system of a robot cleaner according to an embodiment, FIG. 2 is a bottom view illustrating the robot cleaner according to an embodiment, and FIGS. 3A and 3B are bottom views illustrating a robot cleaner according to another embodiment.

Referring to FIGS. 1 to 3B, a control system 1 of the robot cleaner may include a robot cleaner 200 and a control apparatus configured to control the robot cleaner 200, wherein the control apparatus may be provided in the type of a terminal device 100a. The terminal device 100a may employ a cellular phone as illustrated in FIG. 1, but is not limited thereto. The terminal device 100a may employ a PDA, a laptop, a digital camera, and an MP3 player, as well as the cellular phone.

The terminal device 100a may include a user interface unit 110a configured to provide a user interface. The terminal device 100a may include a terminal device input 111a and a terminal device display 112a to receive a user command for controlling the robot cleaner 200 or to display various information of the robot cleaner 200.

The terminal device input 111a may include various buttons, or hardware devices, e.g., a switch, a pedal, a keyboard, a mouse, a track-ball, various levers, a handle and a stick, for inputting from a user. The terminal device input 111a may include a Graphical User Interface (GUI), e.g., a touch pad, i.e., a software device for inputting from a user. The touch pad may be implemented as a touch screen panel (TSP) and form a mutual layer structure with the terminal device display 112a.

The terminal device display 112a may include a cathode ray tube (CRT), a digital light processing (DLP) panel, a plasma display panel, a liquid crystal display (LCD) panel, an electro-luminescence (EL) panel, an electrophoretic display (EPD) panel, an electrochromic display (ECD) panel, a light emitting diode (LED) panel, or an organic light-emitting Diode (OLED) panel, but is not limited thereto.

As described above, when the terminal device display 112a is implemented by a touch screen panel (TSP) having a mutual layer structure with the touch pad, the terminal device display 112a may be used as an input as well as a display. Hereinafter, for convenience of description, it is assumed that the terminal device display 112a is configured as a touch screen panel.

As illustrated in FIGS. 1 to 3B, the robot cleaner 200 may include a body 2, a driving wheel assembly 30, a main brush 20, a side brush assembly 10, a power source 250, a communicator 5, and a user interface unit 210.

The power source 250 may supply driving power to drive the robot cleaner 200. The power source 250 may include a battery electrically connected to a driver driving the body 2 and a variety of components mounted to the body 2, and configured to supply the power to the driver. The battery may be provided with a rechargeable secondary battery that is chargeable by receiving the power from a docking station (not shown). The docking station may be a device on which the robot cleaner 200 is docked when a cleaning procedure is completed or when an amount of the battery is lower than a reference value, and configured to supply the power to the docked robot cleaner 200 by using the external or internal power source.

The power source 250 may be mounted on the lower portion of the body 2 as illustrated in FIGS. 2 to 3B, but is not limited thereto.

Figure 26:
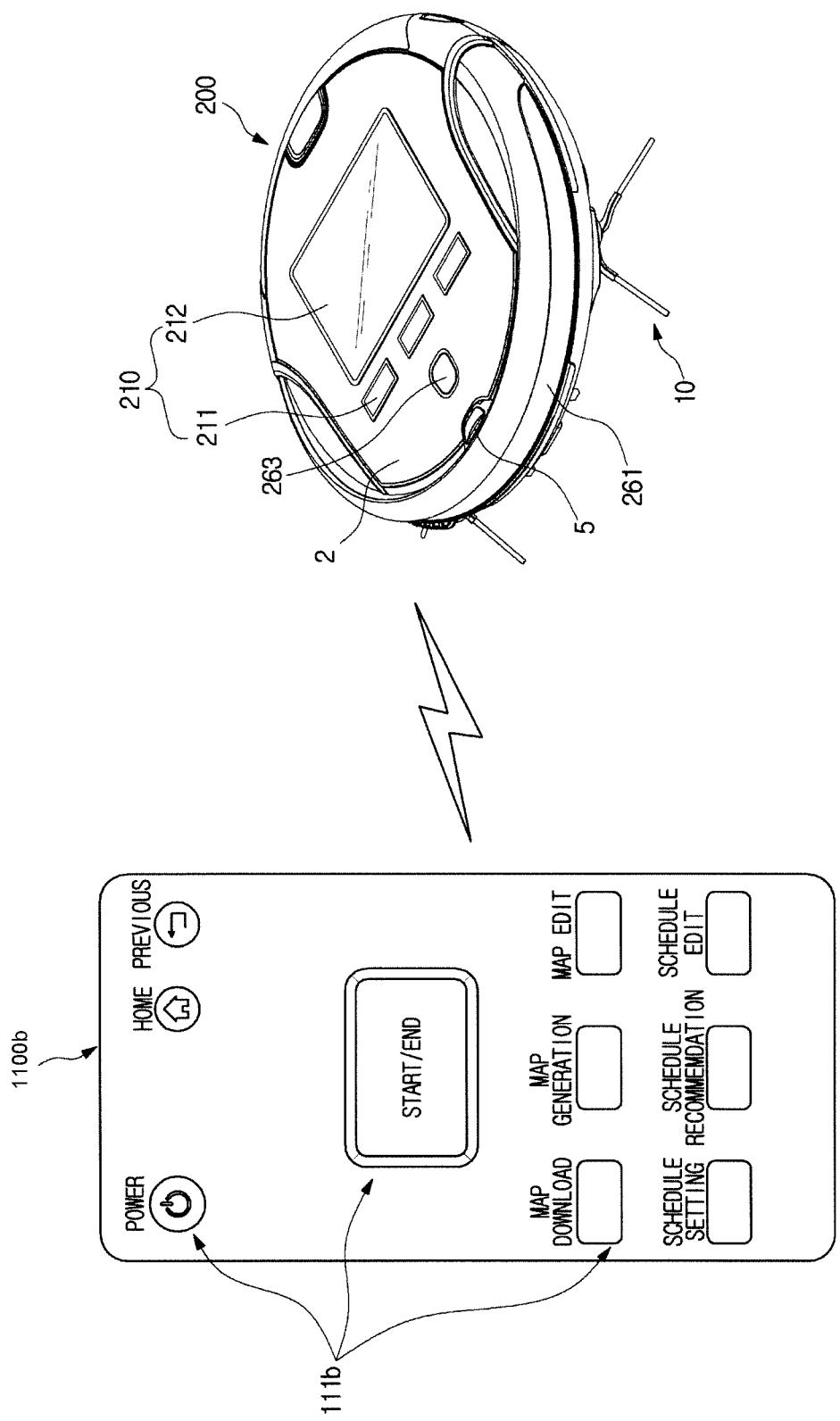
FIG. 26 is a view illustrating a control system of a robot cleaner according to another embodiment.

The communicator 5 may be provided in the upper front of the body 2 and allow the body 2 to the communicate with an external device, e.g., a docking station, a virtual guard, the terminal device 100a and a remote controller 1100b (refer to FIG. 26). The communicator 5 may transmit information related to whether the robot cleaner 200 completes a cleaning, the remaining amount of the battery in the body 2, and a position of the body 2 to the docking station, and receive a docking signal, which is configured to induce the robot cleaner 200 to perform a docking, from the docking station.

Further, the communicator 5 may transmit and receive a virtual guard forming a virtual wall and an entry restriction signal. When the robot cleaner 200 drives, the virtual guard may form the virtual wall by transmitting the entry restriction signal to a connection path between a current cleaning area and a certain area, and the communicator 5 may receive the entry restriction signal to prevent the robot cleaner 200 from being enter the certain area.

The communicator 5 may receive a command input from a user via the terminal device 100a or the remote controller 1100b. For example, the user can input a cleaning start/stop command, a cleaning area map generating command, and a movement command of the robot cleaner 200 via the terminal device 100a. The communicator 5 may receive a user's command from the terminal device 100a and allow the robot cleaner 200 to perform an operation corresponding to the command. A more detailed description of the communicator 5 will be described later.

The driving wheel assembly 30 may be provided in plural, and as illustrated in FIG. 2, the two driving wheel assemblies 30 may be disposed at a lower portion of the main body 2 and symmetrically arranged at a left edge and right edge with respect to the center of the lower portion of the body 2. The driving wheel assembly 30 may include driving wheels 33 and 35 enabling the main body 2 to move forward and backward and rotate during the cleaning. The driving wheel assembly 30 may be modularized and thus detachably mounted to the lower portion of the body 2. Therefore, when the driving wheel 33 and 35 needs repair or replacement due to breakdown, only the driving wheel assembly 30 may be separated from the lower portion of the main body 2 for repair or replacement without disassembling the main body 2. The driving wheel assembly 30 may be mounted to the lower portion of the body 2 by using hook engagement, screw engagement, or tight-fitting engagement.

The caster 31 may be mounted to a front edge portion from the center of the lower portion of the body 2. The caster 31 may enable the body 2 to maintain a stable posture. The caster 31 may be provided integrally with the driving wheel assembly 30 in a single assembly.

The main brush unit 20 may be mounted to a suction port 23 formed at the lower portion of the body 2. The main brush unit 20 may include a main brush 21 and a roller 22. The main brush 21 may be provided at an outer surface of the roller 22. As the roller 22 rotates, the main brush 21 may sweep dust on a floor and guide the dust toward the suction port 23. The main brush 21 may be made of various materials having elasticity. In addition, the roller 22 may be configured as a rigid body, but is not limited thereto.

Although not illustrated in the drawings, a blower may be provided in the suction port 23 to generate suction force so as to move the dust, which is sucked into the suction port 23, toward a dust collector.

The side brush assembly 10 may be modularized and thus detachably mounted to the lower portion of the body 2. Therefore, when the side brush assembly 10 needs repair or replacement due to breakdown, only the side brush assembly 10 may be separated from the lower portion of the main body 2 for repair or replacement without disassembling the main body 2. The side brush assembly 10 may be mounted to the lower portion of the body 2 by using hook engagement, screw engagement, or tight-fitting engagement. FIG. 2 illustrates that two side brush assemblies 10 are mounted to an edge portion of the left and right side of the caster 31, but alternatively, two or more than the side brush assemblies 10 may be mounted on a bottom surface of the body 2 with a certain distance. That is, the number of the mounted 10 may be not limited.

The side brush assembly 10 may include a rotary shaft 11 and a side brush 12. As the rotary shaft 11 rotates, the side brush 12 may rotate together with the rotary shaft 11 about the rotary shaft 11. As the roller 22 rotates, the side brush 12 may sweep dust on a floor on which the robot cleaner 200 drives, toward the suction port 23.

As illustrated in FIGS. 3A and 3B, the side brush assembly 10 may further include a side arm 13 so as to form a protruding side brush assembly 10. In other words, the side arm 13 may be mounted to the body 2 to be rotatable with a certain angle and the rotary shaft 11 and the side brush 12 may be attached to the side arm 13 such that the rotary shaft 11 and the side brush 12 protrude from and return to the body 2 according to the rotation of the side arm 13.

The dust collector may be mounted on the rear side of the body 2 and configured to filter and collect foreign materials, e.g., dust guided to the suction port 23 through the main brush unit 20 and the side brush assembly 10.

Various sensors may be mounted on the body 2. The various sensors may include at least one of an obstacle detection sensor 261, a floor detection sensor 262, and a vision sensor 263.

The obstacle detection sensor 261 may be configured to detect an obstacle placed in a driving path of the robot cleaner 200, e.g., furniture, a wall surface, and a wall edge, and implemented by an ultrasonic sensor capable of recognizing a distance, but is not limited thereto.

The obstacle detection sensor 261 may be provided in plural in the front portion and the lateral side of the body 2 to form a circumference of the body 2. On the front surface of the plurality of obstacle detection sensors 261, a sensor window may be provided to protect and prevent the obstacle detection sensor 261 from the outside.

The floor detection sensor 262 may be configured to detect a distance between the floor surface and the robot cleaner 200 or an inclination of the floor surface, and configured to detect a condition of the floor surface, e.g., the presence of cliff or threshold. At least one floor detection sensor 262 may be provided on the bottom surface of the body 2 or inside of the body 2. When the floor detection sensor 262 is provided in plural, some of the plurality of the floor detection sensors 262 may be implemented by an optical sensor configured to detect a distance, and some the plurality of the floor detection sensors 262 may be implemented by a tilt sensor configured to detect a tilt. For example, as illustrated in FIGS. 2 to 3B, the floor detection sensor 262 may include optical sensors 262a, 262b, and 262c provided on the bottom surface of the body 2, and a tilt sensor 262d provided inside of the body 2.

The vision sensor 263 may represent a sensor configured to recognize a position of the robot cleaner 200 and to generate a map of a driving or a cleaning area of the robot cleaner 200. The vision sensor 263 may be implemented by an apparatus capable of acquiring image data, e.g., a camera, and provided at the upper portion of the body 2. In other words, the vision sensor 263 may extract feature points from image data of the upper portion of the body 2 and recognize the position of the robot cleaner 200 by using the feature points. The vision sensor 263 may allow the map of the cleaning area to be generated and allow a current position of the robot cleaner 200 on the map to be recognized. A more detailed description of the obstacle detection sensor 261, the floor detection sensor 262 and the vision sensor 263 that can be mounted on the body 2 will be described later.

The user interface unit 210 may be provided on the upper portion of the body 2. The user interface unit 210 may include an input 211 configured to receive user commands and a display 212 configured to display various states of the robot cleaner 200, and thus the user interface unit 210 may provide a user interface. For example, it may be possible to display a charging state of the battery, whether the dust collector is full of dust, a cleaning mode, a sleep mode of the robot cleaner 200, through the display 212. The implementation of the input 211 and the display 212 may be the same as those of the terminal device input 111a and the terminal device display 112a, and thus a description thereof will be omitted.

Hereinbefore an appearance of the control system 1 of the robot cleaner according to an embodiment has been described, and hereinafter the configuration of the robot cleaner 200 will be described in detail with reference to the block diagrams.

FIG. 4 is a control block diagram illustrating a control system 1 of the robot cleaner according to an embodiment.

Referring to FIG. 4, the control system 1 of the robot cleaner may include the terminal device 100a and the robot cleaner 200 which are connected by a wire and/or wireless communication. The terminal device 100a may include a terminal device communicator 120a, a terminal device controller 130a, a terminal device storage 140a and a user interface unit 110a. The robot cleaner 200 may include a power source 250, a sensor unit 260, a communicator 220, a controller 230, a driver 270, and a storage 240.

The terminal device communicator 120a may transmit and receive various signals and data to/from the robot cleaner 200 or the external server through the wired and/or wireless communication. For example, the terminal device communicator 120a may download an application for managing the robot cleaner 200 from an external sever, e.g., a web server and a mobile communication server, in response to a user command via the user interface unit 110a. The terminal device communicator 120a may download the map of the cleaning area from the external server.

The terminal device communicator 120a may transmit the user's "map generation" command to the robot cleaner 200, and receive the generated map. In addition, the terminal device communicator 120a may transmit a map edited by the user to the robot cleaner 200. The terminal device communicator 120a may transmit a set or edited cleaning schedule to the robot cleaner 200. The terminal device communicator 120a may receive a cleaning history data from the robot cleaner 200. The cleaning history data may include an area of a cleaning area, a driving speed for a cleaning area, power consumption, and a cleaning time required, which are formed according to the cleaning history of the robot cleaner 200.

The terminal device communicator 120a may transmit "cleaning start" command or "cleaning end" command input from the user to the robot cleaner 200.

To this end, the terminal device communicator 120a may include various communication modules, e.g., a wireless Internet module, a short range communication module, and a mobile communication module.

The wireless Internet module represents a module configured to perform the communication by being connected to an external network via a communication protocol, e.g., a wireless LAN (WLAN), a Wi-Fi, a Wireless broadband (Wibro), a World Interoperability for Microwave Access (Wimax), and a High Speed Downlink Packet Access (HS-DPA).

The short-range communication module represents a module configured to perform the communication with an external device in the short range, according to the short range communication protocol, e.g., a BLUETOOTH, a Radio Frequency Identification (RFID), an Infrared Data Association (IrDA), an Ultra Wideband (UWB), or a ZIG-BEE.

The mobile communication module represents a module configured to perform the communication by being connected to a mobile communication network according to various mobile communication protocols, e.g., 3rd Generation (3G), 3rd Generation Partnership Project (3GPP), and Long Term Evolution (LTE).

However, the communication module is not limited thereto and thus the communication terminal device communicator 120a may employ a communication module in another type other than the above description, as long as capable of performing the communication between the robot cleaner 200 and the external server.

The terminal device controller 130a may control the overall operation of the terminal device 100a. The terminal device controller 130a may control the respective components of the terminal device 100a i.e., the terminal device communicator 120a, the terminal device display 112a, and the terminal device storage 140a, based on the user command input through the user interface unit 110a.

The terminal device controller 130a may generate a control signal for the terminal device communicator 120a. For example, when a user inputs "map download" command, the terminal device controller 130a may generate a control signal so that the terminal device communicator 120a downloads the map of the cleaning area from the external server. When the user inputs "map generation" command, the terminal device controller 130a may generate a control signal the terminal device communicator 120a transmits the map generation command to the robot cleaner 200. The terminal device controller 130a may generate the control signal the terminal device communicator 120a receives the cleaning history data from the robot cleaner 200.

The terminal device controller 130a may generate a control signal for the terminal device display 112a. For example, the terminal device controller 130a may generate a control signal the terminal device display 112a outputs a screen corresponding to a user input. The terminal device controller 130a may generate a control signal so that the terminal device display 112a performs changing a screen. The terminal device controller 130a may generate a control signal so that the terminal device display 112a displays the received map, or the stored or edited map. The terminal device controller 130a may generate a control signal so that the terminal device display 112a displays a stored or edited cleaning schedule.

The terminal device controller 130a may generate a control signal for the terminal device storage 140a. The terminal device controller 130a may generate a control signal so that the terminal device storage 140a stores the received map or the edited map. The terminal device controller 130a may generate a control signal so that the terminal device storage 140a stores the set cleaning schedule or the edited cleaning schedule. When the cleaning history data is received, the terminal device controller 130a may generate a control signal so that the terminal device storage 140a stores the received cleaning history data.

The terminal device controller 130a may generate a cleaning order and a cleaning schedule based on the cleaning history data. When the user inputs "schedule recommendation", the terminal device controller 130a may control the terminal device communicator 120a so that the terminal device communicator 120a receives the cleaning history data, and the terminal device controller 130a may generate a cleaning schedule that is appropriate for the current state of the robot cleaner 200, e.g., the charging state of the power source 250, based on the received cleaning history data.

The terminal device controller 130a may be various types of processors including at least one chip on which an integrated circuit is formed. The terminal device controller 130a may be provided in one processor, or separately provided in a plurality of processors.

The terminal device storage 140a may temporarily or non-temporarily store data and programs for the operation of the terminal device 100a. For example, the terminal device storage 140a may store an application for managing the robot cleaner 200. The terminal device storage 140a may store the received map or the edited map, and store the set cleaning schedule or the edited cleaning schedule. The terminal device storage 140a may store the received cleaning history data.

The terminal device storage 140a may store a program for generating a cleaning schedule based on the cleaning history data. In addition, the terminal device storage 140a may store a program for outputting a screen or changing a screen based on the user input.

The terminal device storage 140a may include at least one storage medium of a flash memory type, a hard disk type, a multimedia card micro type, a card type memory (e.g., SD or XD memory), a Random Access Memory (RAM), a static random access memory (SRAM), a read only memory (ROM), an electrically erasable programmable read-only memory (EEPROM), a programmable read-only memory (PROM), a magnetic memory, a magnetic disk, or an optical disk. However, the type of the terminal device storage 140a is not limited thereto and thus it may be implemented in any other form known in the art. The terminal device 100a may operate a web storage that performs a storage function on the internet.

The user interface unit 110a may receive various commands for controlling the robot cleaner 200 from a user. For example, a user may input the "map download" command to download a map of a cleaning area, a "map generation" command to generate a map, and a "map edit" to edit a map, via the user interface unit 110a. In addition, a user may input a "schedule setting" command to set a cleaning schedule, a "schedule recommendation" command to generate a cleaning schedule that is appropriate for the state of the robot cleaner 200 and "schedule edit" to edit a cleaning schedule, via the user interface unit 110a.

The user interface unit 110a may display various kinds of information of the robot cleaner 200. For example, the user interface unit 110a may display the map of the cleaning area on which the robot cleaner 200 will drive. The user interface unit 110a may display the received map or the edited map. The user interface unit 110a may output a screen for setting the cleaning schedule or a screen for editing. The user interface unit 110a may display the set schedule or the edited schedule.

Hereinafter changing a screen according to the user input, a screen for editing the map, a screen for setting the cleaning schedule, or a screen for editing will be described with reference to FIGS. 5A to 20.

FIG. 5A is a view illustrating a home screen of a display of a terminal device.

Referring to FIG. 5A, the user interface 110a including a terminal device input 111a and a terminal device display 112a may be provided on a front surface of the terminal device 100a. The terminal device input 111a may be provided with a plurality of buttons. At this time, the button may be a hardware button or a software button. The terminal device display 112a may be configured as a touch screen panel so as to detect a user's input.

An application for managing the robot cleaner 200 may be installed in the terminal device 100a. At this time, the application for managing the robot cleaner 200 will be simply referred to as 'robot cleaner application'. The terminal device display 112a may display the installed application on the home screen and provide convenience for user access to the application. For example, the terminal device display 112a may display the installed application with "robot cleaner" icon 150.

A user may execute the robot cleaner application by touching the icon 150 of "robot cleaner". When the robot cleaner application is executed, the terminal device display 112a may change a screen to a screen as shown in FIG. 5B. FIG. 5B is a view illustrating changing a screen according to executing an application.

"Home screen" icon 190a may be displayed at the upper end of the terminal device display 112a so as to return to the home screen. That is, when the "Home screen" icon 190a is selected, the screen may be returned to the screen shown in FIG. 5A. "Map management" icon 160, "schedule management" icon 170, and "start/end" icon 180 may be sequentially displayed at the lower side of the "home screen" icon 190a. The "map management" icon 160 may be configured to manage the map of an area in which the robot cleaner 200 will drive or an area which will be cleaned by the robot cleaner 200, i.e., a cleaning area. The "schedule management" icon 170 may be configured to manage a cleaning schedule such as a cleaning order for at least one divided cleaning area. In addition, the "start/end" icon 180 may be configured to input the user's cleaning start or cleaning end command.

A user may select the "map management" icon 160 to change the screen of the terminal device display 112a into the map management screen. FIG. 6 is a view illustrating a screen for the map management.

Referring to FIG. 6, the "home screen" icon 190a and a "previous screen" icon 190b configured to return to a previous screen may be displayed at the upper end of the terminal device display 112a. That is, when the "previous screen" icon 190b is selected, the screen may return to the previous screen. "Map download "icon 161a, "map generation "icon 161b, and "map edit" icon 161c may be sequentially displayed at the lower ends of the" home screen "icon 190a and the "previous screen" icon 190b. The "map download" icon 161a may be configured to input a user command to download the map of the cleaning area. The "map generation" icon 161b may be configured to input a user command to generate a map of the cleaning area. The "map edit" icon 161c may be configured to edit the downloaded or generated map or the map stored in the terminal device storage 140a.

A user may allow the terminal device 100a to download the map of the cleaning area by selecting the "map download" icon 161a. The terminal device 100a may download the map of the cleaning area from the external server through the terminal device communicator 120a, and the terminal device storage 140a may temporarily or non-temporarily store the downloaded map according to the selection of the "map download" icon 161a. The downloaded map may be displayed on the terminal device display 112a as shown in FIG. 7.

FIG. 7 is a view illustrating a screen of a terminal device display displaying a downloaded map, and FIG. 8 is a view illustrating an example of map editing.

Referring to FIG. 7, in the upper end of the terminal device display 112a, the "home screen" icon 190a, the "previous screen" icon 190b, and "save" icon 190c configured to store the displayed map may be displayed. That is, when the "save" icon 190c is selected, the map displayed on the terminal device display 112a may be stored in a terminal device storage 140a.

In the lower end, the map 162a downloaded via the terminal device communicator 120a may be displayed. The map 162a downloaded from the external server may be provided in a format that is not recognized by the robot cleaner 200, and in this case, a user may be required to process or edit the map 162a into a format recognized by the robot cleaner 200.

As illustrated in FIG. 8, a user may draw a line along a perimeter of the area to be cleaned, with reference to the downloaded map 162a, and display an outline. At least one cleaning area may be set by the outline displayed by the user, and a name to distinguish each area, e.g., Z1, Z2, Z3, Z4 and Z5 may be displayed while setting the cleaning area. The name of the each area may be automatically generated by the terminal device controller 130a and then displayed or the name of the each area may be displayed according to a user's manual input. In addition, by inputting a horizontal direction and a vertical direction length or an area of the cleaning area, it may be possible to edit the map into a format that the robot cleaner 200 can recognize. At this time, a user may input a length or an area of the entire cleaning area, or a length or an area of each cleaning area.

A user may further perform editing to divide or merge the cleaning area on the edited map 162b, and the use may store the edited map 162b by clicking the "save" icon 190c.

As mentioned above, the map editing may include converting a map format into a format of the robot cleaner 200, dividing the cleaning area, and merging the divided cleaning area, but is not limited thereto. The map editing may include other types of editing, e.g., deleting a part of the cleaning area.

FIG. 9 is a view illustrating another example of map editing. FIG. 9 is a view illustrating editing performed by deleting a part of the cleaning area.

Referring to FIG. 9, in the upper end of the terminal device display 112a, the "home screen" icon 190a, the "previous screen" icon 190b, the "save" icon 190c, and "delete" icon 190d for deleting as editing may be displayed. In the lower end, the map 162b edited as the format of the robot cleaner 200 may be displayed.

A user may select an area, e.g., Z3 area, to be deleted in the cleaning area included in the map 162b, and drag the Z3 area to the "delete" icon 190d so that the user may delete the Z3 area in the map 162b.

Referring again to FIG. 6, the user may select the "map generation" icon 161b so that the robot cleaner 200 generates a map of the cleaning area. The user may input the command configured to generate the map of the cleaning area by selecting the "map generation" icon 161b. The terminal device communicator 120a may transmit the user's "map generation" command to the robot cleaner 200 and the robot cleaner 200 may generate the map of the cleaning area while driving, according to the command.

When the map generation is completed, the robot cleaner 200 may transmit the generated map to the terminal device 100a. The map received via the terminal communicator 120a may be temporarily or non-temporarily stored in the terminal device storage 140a. The received map may be displayed on the terminal device display 112a, as shown in FIG. 10.

FIG. 10 is a view illustrating an example of a map generated by the robot cleaner and displayed on the terminal device display, and FIG. 11 is a view illustrating another example of map editing.

Referring to FIG. 10, in the upper end of the terminal device display 112a, the "home screen" icon 190a, the "previous screen" icon 190b, and the "save" icon 190c may be displayed.

In the lower end, a map 163a generated by driving of the robot cleaner 200 may be displayed. A name to distinguish each area, e.g., Z1, Z2, Z3, Z4 and Z5 may be displayed in the terminal device display 112a while displaying the generated map 163a. The name of the each area may be automatically generated by the terminal device controller 130a and then displayed or the name of the each area may be displayed according to a user's manual input.

Meanwhile, since the map 163a is directly generated by the robot cleaner 200, the format of the map 163a may be recognized by the robot cleaner 200. Accordingly, the user does not need to perform editing for converting the format. However, the user may perform editing, such as dividing, merging, or deleting the cleaning area.

As shown in FIG. 11, the user may divide Z5 area by drawing a closed line in a position to be divided in the Z5 area of the generated map 163a. While dividing the area, a name, e.g., Z5 and Z6, may be displayed again to distinguish the divided area. The name for distinguishing the divided area may be automatically generated by the terminal device controller 130a and then displayed or displayed according to a user's manual input. The user may store the divided-edited map 163b by clicking the "save" icon 190c.

Referring again to FIG. 6, the user may edit the map stored in the terminal device storage 140a by selecting the "map edit" icon 161c. At this time, the stored map may represent a map finally stored. Therefore, the stored map may include a map downloaded from the external server, a map generated by the robot cleaner 200, or a map in which the editing is performed in the downloaded map or the generated map. When the user selects the "map edit" icon 161c, the terminal device display 112a may display the finally stored map on the screen and wait for the editing by the user.

Hereinbefore the map management screen has been described with reference to FIGS. 6 to 11, and the above description is merely examples of the map management screen. The map management screen is not limited thereto, and thus a configuration of each screen and a position of the configuration may vary.

Figure 12:
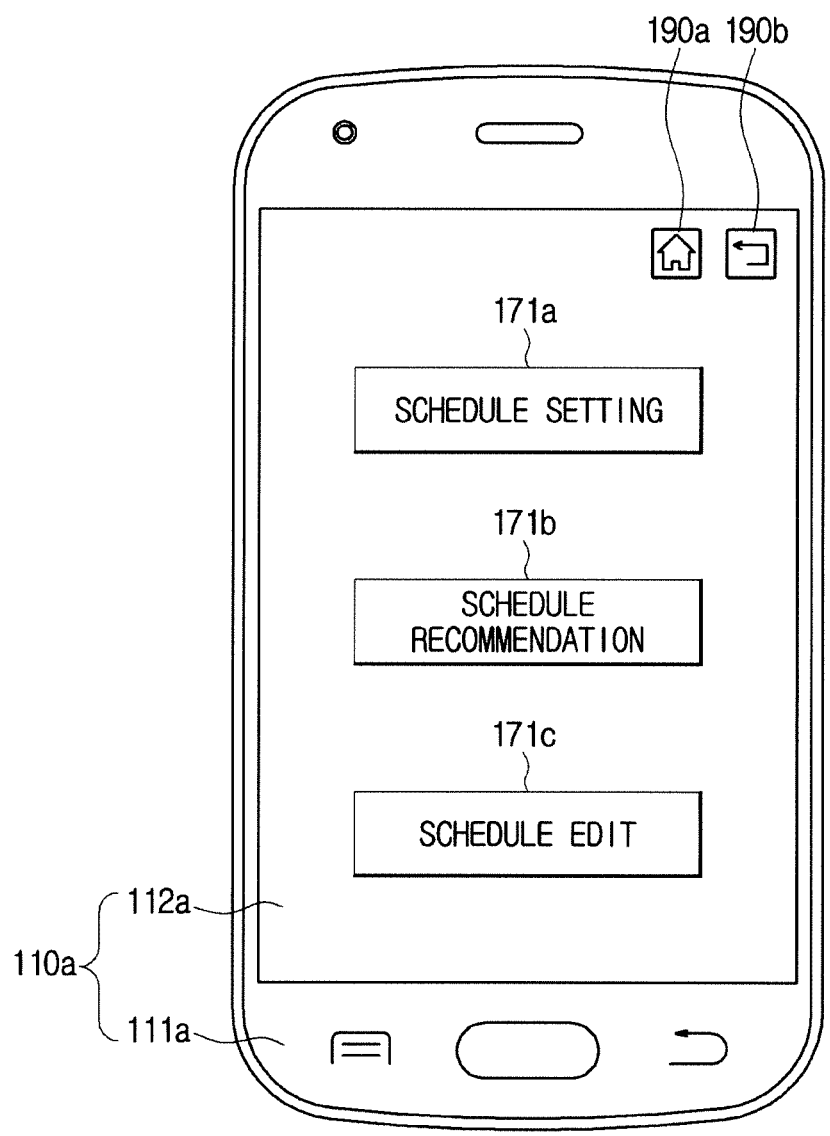
FIG. 12 is a view illustrating a screen for schedule management.

Referring again to FIG. 5B, the user may change the screen of the terminal device display 112a into the screen for the schedule management by selecting the "schedule management" icon 170 among the plurality of icons. FIG. 12 is a view illustrating a screen for schedule management.

As illustrated in FIG. 12, in the upper end of the terminal device display 112a, the "home screen" icon 190a, and the "previous screen" icon 190b may be displayed.

In the lower side of the "home screen" icon 190a and the "previous screen" icon 190b, "schedule setting" icon 171a, "schedule recommendation" icon 171b, and "schedule edit" icon 171c may be sequentially displayed. The "schedule setting" icon 171a may be configured to set a cleaning schedule, e.g., a cleaning order, a cleaning time, and a cleaning period. The "schedule recommendation" icon 171b may be configured to input a user's command configured to generate a cleaning schedule appropriate for the state of the robot cleaner 200. The "schedule edit" icon 171c may be configured to edit the map stored in the terminal device storage 140a.

A user may set the cleaning schedule about the cleaning area by selecting the "schedule setting" icon 171a. The terminal device display 112a may perform changing screen as illustrated in FIG. 13, according to the selection of the "schedule setting" icon 171a by the user.

FIG. 13 is a view illustrating a setting screen for the cleaning schedule.

Referring to FIG. 13, in the upper end of the terminal device display 112a, the "home screen" icon 190a, the "previous screen" icon 190b, and the "save" icon 190c may be displayed. The "save" icon 190c may be configured to store the set cleaning schedule and when the "save" icon 190c is selected, the cleaning schedule set via the terminal device display 112a may be stored in the terminal device storage 140a.

In the lower end, a table 172 for setting the cleaning schedule may be displayed. The table for setting the cleaning schedule may be referred to as 'schedule table'. The schedule table 172 may include "area" 172a, "area name" 172b, "cleaning order" 172c, "cleaning time" 172d, and "cleaning period"172e.

The "area" 172a may represent a cleaning area forming a map, wherein the map may represent a map finally stored in the terminal device storage 140a. Hereinafter for the convenience of description, it is assumed that the map is finally stored as illustrated in FIG. 10. The plurality of cleaning area Z1, Z2, Z3, Z4, and Z5 may be displayed in the "area" 172a.

The "area name" 172b may represent a functional name of the cleaning area. Z1, Z2, Z3, Z4, and Z5 may be names to distinguish the cleaning area, but it may be difficult to intuitively recognize that which cleaning area practically corresponds to which function space by using the name of Z1, Z2, Z3, Z4, and Z5. For example, it may be difficult to intuitively recognize whether Z1 area corresponds to a kitchen, a room, or a living room. Therefore, a user may newly input a functional name of the cleaning area in the "area name" 172b.

The "cleaning order" 172c may represent an order in which the cleaning is performed. The "cleaning time" 172d may represent a period of time in which the cleaning is performed, and the "cleaning period" 172e may represent a period in which the cleaning is performed.

When a user selects the "schedule setting" icon 171a, the terminal device controller 130a may randomly generate a cleaning schedule and control the terminal device display 112a so that the terminal device display 112a displays a schedule table corresponding to the cleaning schedule. That is, the terminal device display 112a may display a random schedule table 172 as illustrated in FIG. 13.

By corresponding to the cleaning area Z1, Z2, Z3, Z4, and Z5, the area name" 172b may be generated and displayed as room 1, room 2, room 3, room 4, and room 5, the "cleaning order" 172c may be generated and displayed as 1, 2, 3, 4, and 5, the "cleaning time" 172d may be generated and displayed as 10 AM, continuous, continuous, continuous, and continuous, and the "cleaning period" 172e may be generated and displayed as every day, every day, every day, every day, and every day.

A user may complete a setting of the cleaning schedule by selecting a cell to be changed from the schedule table 172 that is randomly displayed and by changing it into a desired name, a desired order, a desired time, and a desired period. A detail description thereof will be described with reference to FIGS. 14A to 18.

FIGS. 14A and 14B are views illustrating setting of area names, FIG. 15 is a view illustrating setting of cleaning order, FIG. 16 is a view illustrating setting of cleaning time, FIG. 17 is a view illustrating setting of cleaning period, and FIG. 18 is a view illustrating a screen in which setting the cleaning schedule is completed.

In a state in which a user wants to change a name of area in the schedule table 172 of FIG. 13, i.e., a user wants to change a name of cell A, when selecting the cell A, the screen may be changed into a screen as illustrated in FIG. 14A. The changed screen may be configured with a part 173a displaying "area name", a part 173c to which a functional name of the cleaning area is input, and a part 173b on which the user's input is displayed. When the user inputs a name that the user wants to set for a cell, e.g., 'kitchen', the user may change a name of the corresponding cell.

According to the selection of the cell A, the screen may be changed into a screen as illustrated in FIG. 14B. The changed screen may be configured with the part 173a displaying "area name", and a part 173d to which a functional name of the cleaning area is input, and the part 173b on which the user's input is displayed. In this time, the part 173d to which a functional name of the cleaning area is input may be provided to allow a user to directly input the consonants and vowels.

In a state in which a user wants to change the cleaning order in the schedule table 172 of FIG. 13, i.e., a user wants to change the cleaning order of cell D, when selecting the cell D, the screen may be changed into a screen as illustrated in FIG. 15. The changed screen may be configured with a part 174*a* displaying "cleaning order", a part 174*c* to which the cleaning order is input, and a part 174*b* on which the user's input is displayed. When the user inputs a cleaning order that the user wants to set for a cell, e.g., '4', the user may change the cleaning order of the corresponding cell.

In a state in which a user wants to change the cleaning time in the schedule table 172 of FIG. 13, i.e., a user wants to change the cleaning time of cell F, when selecting the cell F, the screen may be changed into a screen as illustrated in FIG. 16. The changed screen may be configured with a part 175*a* displaying "cleaning time", a part 175*c* to which the cleaning time is input, and a part 175*b* on which the user's input is displayed. When the user inputs a cleaning time that the user wants to set for a cell, e.g., '2 PM', the user may change the cleaning time of the corresponding cell.

In a state in which a user wants to change the cleaning period in the schedule table 172 of FIG. 13, i.e., a user wants to change the cleaning period of cell G, when selecting the cell G, the screen may be changed into a screen as illustrated in FIG. 17. The changed screen may be configured with a part 176*a* displaying "cleaning period", and a part 176*b* to which the cleaning period is input. When a user inputs a cleaning period that the user wants to set for a cell, e.g., 'every other day', the user may change the cleaning time of the corresponding cell.

According to the same procedure as described above, in FIG. 13, the area name 172*b* of cell A, cell B, and cell C may be changed from 'room 3' to 'kitchen', from 'room 4' to 'room 3' and from 'room 5' to 'living room'. The cleaning order 172*c* of cell D and cell E may be changed from '4' to '3' and from '3' to '4'. The cleaning time 172*d* of cell F may be changed from '10 AM' to '2 PM', and the cleaning period 172*e* of cell G may be changed from 'every day' to 'every other day'. According to the setting of the cleaning schedule, the terminal device display 112*a* may display a schedule table 172 in accordance with the cleaning schedule, i.e., a schedule table 172 that is changed as illustrated in FIG. 18.

A user may store the set cleaning schedule by clicking the "save" icon 190*c*.

Referring again to FIG. 12, the user may select the "schedule recommendation" icon 171*b* so that a cleaning schedule appropriate for the state of the robot cleaner 200 is generated and recommended. By selecting the "schedule recommendation" icon 171*b*, the user may input a command configured to recommend the cleaning schedule. The terminal device communicator 120*a* may transmit a user's "schedule recommendation" command to the robot cleaner 200 and the robot cleaner 200 may transmit the cleaning history data in response to the command. The received cleaning history data may be transmitted to the terminal device controller 130*a* and the terminal device controller 130*a* may generate a cleaning schedule appropriate for the current state of the robot cleaner 200 (e.g., a charging state of the power source 250, a battery remaining amount, or a cleaning available time) based on the cleaning history data (e.g., an area of a cleaning area, a driving speed for a cleaning area, power consumption, and a cleaning time required) and control the terminal device display 112*a* so that the terminal device display 112*a* displays the cleaning schedule.

FIG. 19 is a view illustrating a case in which a cleaning schedule based on cleaning history data is displayed on the terminal device display.

Referring to FIG. 19, in the upper end of the terminal device display 112*a*, the "home screen" icon 190*a*, the "previous screen" icon 190*b*, and the "save" icon 190*c* may be displayed.

In the lower end, it may be possible to display the cleaning schedule that is generated based on the cleaning history data, in the form of the schedule table 172, so as to recommend the cleaning schedule to a user. The cleaning schedule may be displayed with a state value of the robot cleaner 200 that is applied to generating the cleaning schedule, i.e., the battery remaining amount or a cleaning available time of the robot cleaner 200.

The user may store the cleaning schedule that is generated and recommended based on the cleaning history data, without change, or the user may store the cleaning schedule after changing a part or entire of the cleaning schedule. A method of changing the cleaning schedule may be the same as or similar with the method as illustrated in FIGS. 13 to 18, and thus a detail description thereof will be omitted.

Referring again to FIG. 12, the user may edit the cleaning schedule stored in the terminal device storage 140*a* by selecting the "schedule edit" icon 171*c*. When the user selects the "schedule edit" icon 171*c*, the terminal device display 112*a* may display the stored cleaning schedule in the form of the schedule table 172 and wait for the editing or the change input by the user. At this time, the stored cleaning schedule may represent a cleaning schedule finally stored. Hereinafter for the convenience of description, it is assumed that the cleaning schedule is finally stored as illustrated in FIG. 18.

Hereinbefore the schedule management screen has been described with reference to FIGS. 12 to 19, and the above description is merely examples of the schedule management screen. The schedule management screen is not limited thereto, and thus a configuration of each screen and a position of the configuration may vary.

Referring again to FIG. 5B, the user may allow the robot cleaner 200 to start the cleaning or to finish the cleaning by selecting the "start/end" icon 180 among the plurality of icons illustrated in FIG. 5B. When the robot cleaner 200 performs the cleaning, what the user selects the "start/end" icon 180 may be the same as inputting the cleaning end command. When the cleaning end command is input from a user, the terminal device controller 130*a* may transmit a control signal to end the cleaning to the robot cleaner 200 through the terminal communicator 120*a*. The robot cleaner 200 may finish the cleaning in response to the command and move to the docking station.

When the robot cleaner 200 does not perform the cleaning, what the user selects the "start/end" icon 180 may be the same as inputting the cleaning start command. When the cleaning start command is input from a user, the terminal device controller 130*a* may transmit a control signal to start the cleaning to the robot cleaner 200 according to the stored map and the stored cleaning schedule, through the terminal communicator 120*a*. The stored map may represent a map finally stored, and the stored cleaning schedule may represent a cleaning schedule finally stored.

The robot cleaner 200 may receive the stored map and the stored cleaning schedule with the control signal, and start the cleaning according to the received map and cleaning schedule. During the robot cleaner 200 performs the cleaning, there may be a case in which the received information does not match with the actual cleaning environment. For example, according to the change in the position of the docking station, a cleaning start position of the robot cleaner 200 may be changed and a distance between the cleaning start position and each of cleaning area may vary. That is, the robot cleaner 200 cannot perform the cleaning based on the received map.

In this case, the robot cleaner 200 may transmit a message indicating that the environment does not match, to the terminal device 100*a* and the terminal device display 112*a* may output a screen as illustrated in FIG. 20, in response to the control signal of the terminal device controller 130*a*.

FIG. 20 is a view illustrating a screen according to the mismatch of the environment.

Referring to FIG. 20, in the upper end of the terminal device display 112*a*, the "home screen" icon 190*a* and the "previous screen" icon 190*b* may be displayed.

In the lower end of the "home screen" icon 190*a* and the "previous screen" icon 190*b*, a phrase "the environment does not match. Do you want to update the map?" and "yes" icon and "no" icon, which is configured to input a user answer about whether to update the map, may be displayed. That is, when the user inputs "no", the robot cleaner 200 may stop the cleaning that is currently performed, based on the user command, and move to the docking station. When a user inputs "yes", the robot cleaner 200 may perform a coordinate conversion based on the user command and update the map. A detail description of updating the map will be described later.

During the robot cleaner 200 performs the cleaning, an area which cannot be cleaned may occur. For example, when an entrance of Z1 area, which is set as a first cleaning area, is closed, the robot cleaner 200 may be not allowed to enter the Z1 area and thus the robot cleaner 200 cannot perform the cleaning. In this case, the robot cleaner 200 may send a message indicating that the cleaning is impossible, to the terminal device 100*a*, and the terminal device display 112*a* may output a screen of FIG. 21 in response to the control signal of the terminal device controller 130*a*.

FIG. 21 is a view illustrating a screen of the terminal device display indicating that the cleaning is impossible.

Referring to FIG. 21, in the upper end of the terminal device display 112*a*, the "home screen" icon 190*a* and the "previous screen" icon 190*b* may be displayed.

In the lower end of the "home screen" icon 190*a* and the "previous screen" icon 190*b*, a phrase "There is an area that cannot be cleaned. Do you want to change the area?" and "yes" icon and "no" icon, which is configured to input a user answer about whether to change the area, may be displayed. That is, when a user inputs "no", the robot cleaner 200 may stop the cleaning that is currently performed, based on the user command, and move to the docking station. When a user inputs "yes", the robot cleaner 200 may move to a next cleaning area and then perform the cleaning, based on the received cleaning schedule. In the above example, in a state in which the cleaning of the Z1 area is impossible, when a user inputs "yes", the robot cleaner 200 may move a next cleaning area, i.e., Z2 area, and then perform the cleaning the Z2 area.

Referring again to FIG. 4, the robot cleaner 200 may include the power source 250, the communicator 220, the controller 230, the driver 270, and the storage 240.

The power source 250 may be provided as the battery, as mentioned above, and supply the driving power to drive the robot cleaner 200.

The communicator 220 may transmit and receive a variety of signals and data to and from the terminal device 100*a* and the external device via the wired and/or wireless communication. For example, the communicator 220 may receive the user's "map generation" command from the terminal device 100*a* and then transmit the generated map to the terminal device 100*a*. The communicator 220 may receive the stored map in the terminal device 100*a* and the cleaning schedule stored in the terminal device 100*a*. The stored map may represent a map finally stored, and the stored cleaning schedule may represent a cleaning schedule finally stored. The communicator 220 may send the current state values and the cleaning history data of the robot cleaner 200 to the terminal device 100*a*.

In addition, the communicator 220 may receive the user's cleaning start command or cleaning end command from the terminal device 100*a* During the robot cleaner 200 performs the cleaning, when there is a condition in which the environment does not match, the communicator 220 may transmit a message indicating that the environment does not match, to the terminal device 100*a*. Likewise, when the area that cannot be cleaned occurs, the communicator 220 may transmit a message indicating that the cleaning is impossible, to the terminal device 100*a*.

To this end, the communicator 220 may include a variety of communication modules, e.g., a wireless Internet module, a short range communication module, and a mobile communication module, and a description of the wireless Internet module, the short-range communication module, and the mobile communication module is the same as described above.

FIG. 22 is a view illustrating an exemplary configuration of the sensor. Referring to FIG. 22, the sensor 260 may include the obstacle detection sensor 261, the floor detection sensor 262 and the vision sensor 263.

The obstacle detection sensor 261 may be provided in plural on an outer circumferential surface of the body 2 and configured to detect obstacles present in the front or that lateral side of the robot cleaner 200. The obstacle detection sensor 261 may transmit the detected detection information to the controller 230.

The obstacle detection sensor 261 may be provided by a contact type sensor, a non-contact type sensor, or a combination of the contact type sensor and the non-contact sensor, depending on whether to make contact with obstacles. The contact type sensor may represent a sensor configured to detect obstacles when the body 2 collides with obstacles, and the non-contact type sensor may represent a sensor configured to detect obstacles without a collision between the body 2 and obstacles or configured to detect obstacles in advance before a collision between the body 2 and obstacles occurs.

The non-contact type sensor may include an ultrasonic sensor, an optical sensor or a RF sensor. When the obstacle detection sensor 261 is implemented by the ultrasonic sensor, the obstacle detection sensor 261 may emit ultrasonic waves to a driving path and detect obstacles by receiving the reflected ultrasonic waves. When the obstacle detection sensor 261 is implemented by the optical sensor, the obstacle detection sensor 261 may emit infrared light or visible light and detect obstacles by receiving the reflected light. When the obstacle detection sensor 261 is implemented by the RF sensor, the obstacle detection sensor 261 may transmit radio waves in a certain frequency, e.g., microwave, by using Doppler effect and detect obstacles by detecting the change in frequency of the reflected waves.

The floor detection sensor 262 may include a variety shapes optical sensors 262*a*, 262*b* and 262*c* in the bottom surface of the body 2 to detect a distance between the floor surface and the robot cleaner 200, or a distance between the floor surface and the bottom surface of the robot cleaner 200. For example, the optical sensors 262*a*, 262*b* and 262*c* may employ an infrared sensor using the infrared region light, emit infrared light to the floor surface, and detect a distance from the floor surface by using the reflected infrared light. The optical sensors 262*a*, 262*b* and 262*c* may be configured with the same type sensor, e.g. the same type infrared sensor, or configured with a different type sensor.

The floor detection sensor 262 may include a tilt sensor 262d configured to measure an inclined angle of the robot cleaner 200, i.e., an inclination formed between the body 2 and a horizontal surface. For example, the tilt sensor 262d may employ a tilt switch, an acceleration sensor, and a gyro sensor. The tilt switch may be turned on when an inclined angle of the body 2 is equal to or more than a certain angle, and the tilt switch may be turned off when an inclined angle of the body 2 is less than a certain angle. The acceleration sensor may detect the change in the moving speed of the body 2 and the acceleration of gravity applied to the body 2, and the gyro sensor may detect a rotation direction and a rotational angle according to the movement of the body 2. The method of measuring the inclination by using a tilt switch, an acceleration sensor, and a gyro sensor is well known in the art, and thus a detail description thereof will be omitted.

The distance or angle detected by the floor detection sensor 262 may be transmitted to the controller 230.

The vision sensor 263 may be provided as an apparatus capable of acquiring image data, e.g., a camera and mounted on the upper portion of the body 2 to recognize a position of the robot cleaner 200. The vision sensor 263 may extract feature points from image data of the upper portion of the robot cleaner 200 and recognize the position of the robot cleaner 200 by using the feature points. The position information detected by the vision sensor 263 may be transmitted to the controller 230.

A sensor value of the sensor 260, e.g., a sensor value of the obstacle detection sensor 261, the floor detection sensor 262, and the vision sensor 263 may be transmitted to the controller 230 and the controller 230 may generate a map of the cleaning area based on the sensor value. A map generating method based on the sensor value is a known technology and thus a detail description thereof will be omitted. FIG. 22 illustrates an example of the sensor 260 and the sensor 260 may further include a different type sensor or some of those sensors may be omitted in the sensor 260, as long as a sensor is capable of generating a map of the cleaning area.

FIG. 23 is a view illustrating an example of a configuration of driver. Referring to FIG. 23, the driver 270 may include the driving wheel driver 271 configured to control driving of the driving wheel assembly 30, the main brush driver 272 configured to control driving of the main brush 20, and the side brush driver 273 configured to control driving of the side brush assembly 10.

The driving wheel driver 271 may allow the robot cleaner 200 to move by controlling the driving wheels 33 and 35 mounted on the lower portion of the body 2 under the control of the controller 230. When the user's "map generation" command or "cleaning start" command is delivered to the robot cleaner 200, the driving wheel driver 271 may control driving of the driving wheel 33 and the 35 and thus the robot cleaner 200 may drive in the cleaning area. The driving wheel driver 271 may be included in the driving wheel assembly 30 and then modularized.

The main brush driver 272 may drive the roller 22 mounted to the side of the suction port 23 of the body 2 under the control of the controller 230. According to the rotation of the roller 22, the main brush 21 may clean the floor surface while rotating. The side brush driver 273 may drive the rotary shaft 11 of the side brush assembly 10 under the control of the controller 230. The side brush 12 may be rotated by the rotation of the rotary shaft 11 and clean the floor surface. When the side arm 13 is provided, the side brush driver 273 may control the driving of the side arm 13 under the control of the controller 230. When the user's "cleaning start" command is delivered to the robot cleaner 200, the main brush driver 272 may control the driving of the roller 22 and the main brush driver 272 may control the driving of the rotary shaft 11 or the side arm 13.

The controller 230 may control the entire operation of the robot cleaner 200. The controller 230 may control each component of the robot cleaner 200, e.g., the communicator 220, the driver 270, and the storage 240.

The controller 230 may generate a control signal for the driver 270. For example, when the "map generation" command is received, the controller 230 may generate a control signal about the driving wheel driver 271 so that the driving wheel driver 271 drives the driving wheels 33 and 35. During the driving wheels 33 and 35 drive, the controller 230 may receive a sensor value from the sensor 260 and then generate a map of the cleaning area based on the sensor value. When the "cleaning start" command is received, the controller 230 may control the main brush driver 272 so that the main brush driver 272 drives the main brush 20. The controller 230 may control the side brush driver 273 so that the side brush driver 273 drives the side brush assembly 10.

The controller 230 may generate a control signal for the communicator 220. When the "map generation" command is received, the controller 230 may generate a map of the cleaning area based on the sensor value, and the controller 230 may control the communicator 220 so that the communicator 220 transmits the generated map to the terminal device 100a. When the "schedule recommendation" command is received, the controller 230 may generate a control signal to transmit the cleaning history data.

During the cleaning is performed, the controller 230 may determine whether the environment does not match. When the environment does not match, the controller 230 may control the communicator 220 so that the communicator 220 sends a message indicating that the environment does not match, to the terminal device 100a. A user may confirm the message indicating that the environment does not match, and determine whether to update a map. When "map update" command is received, the controller 230 may update the map based on the user's command. When the environment does not match, the controller 230 may automatically update the map.

FIGS. 24 and 25 are views illustrating a map updating process.

Referring to FIGS. 24 and 25, the map generated by the controller 230 or transmitted from the terminal device 100a may form a coordinates with respect to a cleaning start point of the robot cleaner 200 as an origin. For example, as illustrated in FIG. 24, when it is assumed that the cleaning area is formed with Z1, Z2, Z3, Z4 and Z5, and when S1 point of the Z5 area is the cleaning start point of the robot cleaner 200, the map may form coordinates with respect to S1 point as the origin (0,0). That is, any point in the map may have a coordinate value with respect to S1 point as the origin (0,0). The cleaning start point may be a position of the docking station.

When the environment of the robot cleaner 200 is changed, i.e., when the cleaning start point of the robot cleaner 200 is changed, the robot cleaner 200 cannot drive according to the coordinate value of the map. For example, although the robot cleaner 200 determines a position and a direction of a target point according to the coordinate value of the map and then the robot cleaner 200 moves to the determined position and direction, the robot cleaner 200 may not reach the target point. Therefore, the robot cleaner 200 may be required to perform the coordinate conversion in accordance with the change in the environment of the robot cleaner 200, wherein performing the coordinate conversion may be referred to as 'map update'.

As shown in FIG. 25, when a cleaning start position is changed from S1 point to S2 point in the Z5 area, the controller 230 may automatically perform the coordinate conversion with respect to S2 point as the origin (0,0) and update the map, according to the user command or regardless of the user command.

During the cleaning is performed, the controller 230 may determine whether there is an area that cannot be cleaned. When there is the area that cannot be cleaned, the controller 230 may control the communicator 220 so that the communicator 220 sends a message indicating that there is an area that cannot be cleaned. A user may confirm that there is an area that cannot be cleaned, and determine whether to move a cleaning area. When "area movement" command is received, the controller 230 may generate a control signal configured to move to a next priority cleaning area based on the user command. When the area that cannot be cleaned is present, the controller 230 may automatically generate the control signal configured to move to a next priority cleaning area.

The controller 230 may generate a control signal for the storage 240. The controller 230 may generate a control signal so that the storage 240 stores the generated map. The controller 230 may generate a control signal so that the storage 240 stores the map and the cleaning schedule transmitted from the terminal device 100*a*.

The controller 230 may be various types of processors including at least one chip on which an integrated circuit is formed. The controller 230 may be provided in one processor, or separately provided in a plurality of processors.

The storage 240 may temporarily or non-temporarily store data and programs for the operation of the robot cleaner 200. For example, the storage 240 may temporarily or non-temporarily store the state value of the robot cleaner 200. The storage 240 may store the cleaning history data, and the cleaning history data may be updated periodically or aperiodically. When the controller 230 generates a map or updates a map, the storage 240 may store the generated map or the updated map. The storage 240 may store the map or the cleaning schedule transmitted from the terminal device 100*a*.

The storage 240 may store a program for generating or updating a map. In addition, the storage 240 may store a program for generating or updating the cleaning history data. The storage 240 may store a program for determining whether the environment matches or not, or determining whether it is an area that cannot be cleaned or not.

The storage 240 may include at least one storage medium of a flash memory type, a hard disk type, a multimedia card micro type, a card type memory (e.g., SD or XD memory), a Random Access Memory (RAM), a static random access memory (SRAM), a read only memory (ROM), an electrically erasable programmable read-only memory (EEPROM), a programmable read-only memory (PROM), a magnetic memory, a magnetic disk, or an optical disk. However, the type of the storage 240 is not limited thereto and thus it may be implemented in any other form known in the art. The storage 240 may operate a web storage that performs a storage function on the internet.

FIG. 26 is a view illustrating a control system of a robot cleaner according to another embodiment, and FIG. 27 is a control block diagram illustrating a control system of the robot cleaner according to another embodiment. In describing the control system of the robot cleaner according to another embodiment, the same reference numerals are used for the same or similar structures and functions as those of the above-described embodiments, and a detailed description thereof will be omitted.

Referring to FIGS. 26 and 27, the control system 1 of the robot cleaner may include a robot cleaner 200 and a control apparatus configured to control the robot cleaner 200, wherein the control apparatus may be provided in the type of input device 1100*b*, e.g. a remote controller.

The input device 1100*b* may include an input device communicator 120*b*, an input device controller 130*b*, and an input device input 111*b*, and the robot cleaner 200 may include a power source 250, a sensor 260, a communicator 220, a controller 230, a user interface unit 210, a driver 270, and a storage 240.

The input device controller 130*b* may control the input device communicator 120*b* so that the input device communicator 120*b* transmits a user command input via the input device input 111*b* to the robot cleaner 200. The input device controller 130*b* may be various types of processors including at least one chip on which an integrated circuit is formed.

The input device input 111*b* may include various buttons, or hardware devices, e.g., a switch, a pedal, a keyboard, a mouse, a track-ball, various levers, a handle and a stick, for inputting from a user. The input device input 111*b* may include a Graphical User Interface (GUI), e.g., a touch pad, i.e., a software device to input from a user.

FIG. 26 merely illustrates an example of the input device input 111*b*, and thus the input device input 111*b* may have a shape different from the input device input 111*b* of FIG. 26. In FIG. 26, the input device input 111*b* is illustrated in the button type, but the input device input 111*b* may be provided in the different type, as mentioned above. In addition to the above mentioned button, another input button, e.g. "save" button, may be further included as well as the above described button, or some of input button may be omitted.

The input device communicator 120*b* may transmit a user command input via the input device input 111*b* to the robot cleaner 200 according to a control signal. The input device communicator 120*b* may input the user command, e.g., a power on/off command of the robot cleaner 200, a cleaning start or end command, a map download command, a map generation command, a map edit command, a schedule setting command, a schedule recommendation command, and a schedule edit command.

The input device communicator 120*b* may include the short-range communication module e.g., a BLUETOOTH, a Radio Frequency Identification (RFID), an Infrared Data Association (IrDA), an Ultra Wideband (UWB), or a ZIGBEE.

The robot cleaner 200 may include the user interface unit 210. The user interface unit 210 may include an input 211 configured to receive user commands and a display 212 configured to display various states of the robot cleaner 200. The screen via the terminal device display 112*a* according the above mentioned embodiment may be displayed on the display 212 of the robot cleaner 200 and a detail description thereof will be described later.

The input 211 may include various buttons, or hardware devices, e.g., a switch, a pedal, a keyboard, a mouse, a track-ball, various levers, a handle and a stick, to input from a user. The terminal device input 111*a* may include a Graphical User Interface (GUI), e.g., a touch pad, i.e., a software device to input from a user. The touch pad may be implemented as a touch screen panel (TSP) and form a mutual layer structure with the terminal device display 112a.

The display 212 may include a cathode ray tube (CRT), a digital light processing (DLP) panel, a plasma display panel, a liquid crystal display (LCD) panel, an electro-luminescence (EL) panel, an electrophoretic display (EPD) panel, an electrochromic display (ECD) panel, a light emitting diode (LED) panel, or an organic light-emitting Diode (OLED) panel, but is not limited thereto.

As described above, when the display 212 is implemented by a touch screen panel (TSP) having a mutual layer structure with the touch pad, the display 212 may be used as an input as well as a display. Hereinafter, for convenience of description, it is assumed that the display 212 is configured as a touch screen panel.

The power source 250 may be provided as a chargeable battery, and configured to supply the driving power to drive the robot cleaner 200.

The communicator 220 may receive the user command from the input device 1100b. For example, the communicator 220 may receive the user command, e.g., the "power on/off" command, the "cleaning start", the "cleaning end" command, the "map download" command, the "map generation" command, the "map edit" command, the "schedule setting" command, the "schedule recommendation" command, and the "schedule edit" command, via the input device 1100b.

The communicator 220 may transmit and receive various signals and data to/from the external device (e.g., a docking station) or the external server (e.g., a web server and a mobile communication server) through the wired and/or wireless communication. The communicator 220 may download the map of the cleaning area from the external server.

The communicator 220 may include various communication modules, e.g., a wireless Internet module, a short range communication module, and a mobile communication module. The description of the wireless Internet module, the short range communication module, and the mobile communication module is the same as the above mentioned description.

The sensor 260 may detect whether an obstacle is present in the driving path, a distance to the obstacle, a distance to the floor surface, an inclination of the robot cleaner 200, and a position of the robot cleaner 200. The sensor 260 may include at least one of the obstacle detection sensor 261 configured to detect an obstacle placed in the front or the lateral side of the robot cleaner 200, the floor detection sensor 262 configured to detect a distance between the floor surface and the robot cleaner 200 or an inclination of the robot cleaner 200, the vision sensor 263 configured to detect a position of the robot cleaner 200. The description of the obstacle detection sensor 261, the floor detection sensor 262, and the vision sensor 263 has been described in the above, and thus a detail description thereof will be omitted.

A sensor value of the sensor 260, i.e., a sensor value of the obstacle detection sensor 261, the floor detection sensor 262, and the vision sensor 263 may be transmitted to the controller 230 and the controller 230 may generate a map of a cleaning area based on the sensor value.

The driver 270 may include a driving wheel driver 271 configured to control driving of the driving wheel assembly 30, a main brush driver 272 configured to control driving of the main brush 20, and a side brush driver 273 configured to control driving of the side brush assembly 10.

The controller 230 may control the entire operation of the robot cleaner 200. The controller 230 may control each component of the robot cleaner 200, i.e., the driver 270, the communicator 220, the display 212 and the storage 240.

The controller 230 may generate a control signal for the driver 270. For example, when a user inputs the "map generation" command, the controller 230 may generate a control signal for the driver 270 so that the driver 270 drives the driving wheels 33 and the 35. During the driving wheels 33 and the 35 drive, the controller 230 may receive a sensor value from the sensor 260 and then generate a map of a cleaning area based on the sensor value. When the user inputs the "cleaning start" command, the controller 230 may control the main brush driver 272 so that the main brush driver 272 drives the main brush 20. The controller 230 may control the side brush driver 273 so that the side brush driver 273 drives the side brush assembly 10.

The controller 230 may generate a control signal for the communicator 220. For example, when a user inputs the "map download" command, the controller 230 may generate a control signal so that the communicator 220 downloads a map of the cleaning area from the external server.

The controller 230 may generate a control signal for the display 212. For example, the controller 230 may generate a control signal so that the display 212 outputs a screen corresponding to the user input or the display 212 changes the screen corresponding to the user input. The controller 230 may generate a control signal so that the display 212 displays the generated map, the downloaded map, or the stored or edited map. The controller 230 may generate a control signal so that the display 212 displays the set cleaning schedule or the stored or edited cleaning schedule.

The controller 230 may generate a control signal for the storage 240. The controller 230 may generate a control signal so that the storage 240 stores the downloaded map, the generated map, or the edited map. The controller 230 may generate a control signal so that the storage 240 stores the set cleaning schedule or the edited cleaning schedule.

The communicator 220 may generate a cleaning order and a cleaning schedule based on the cleaning history data. When the user inputs "schedule recommendation", the controller 230 may generate a cleaning schedule that is appropriate for the current state of the robot cleaner 200, e.g., the charging state of the power source 250, based on the received cleaning history data.

During the cleaning is performed, the controller 230 may determine whether the environment matches or not. When the environment does not match, the controller 230 may automatically update the map. During the cleaning is performed, the controller 230 may determine whether there is an area that cannot be cleaned. When there is the area that cannot be cleaned, the controller 230 may automatically generate a control signal configured to move to a next priority cleaning area.

The controller 230 may be various types of processors including at least one chip on which an integrated circuit is formed. The controller 230 may be provided in one processor, or separately provided in a plurality of processors.

The storage 240 may temporarily or non-temporarily store data and programs for the operation of the robot cleaner 200. For example, the storage 240 may temporarily or non-temporarily store the state value of the robot cleaner 200. The storage 240 may store the cleaning history data, and the cleaning history data may be updated periodically or aperiodically. When the communicator 220 downloads a map or when the controller 230 generates a map or updates a map, the storage 240 may store the downloaded map, the generated map or the updated map. The storage 240 may store the edited map. The storage 240 may store the set cleaning schedule and the edited cleaning schedule.

The storage 240 may store a program for generating a map or updating a map. The storage 240 may store a program for generating or updating cleaning history data. The storage 240 may store a program for generating a cleaning schedule based on the cleaning history data. The storage 240 may store a program for outputting a screen or switching a screen based on the user input. The storage 240 may store a program for determining whether the environment matches or not, or a program for determining whether it is an area that cannot be cleaned. The implementation of the storage 240 is the same as the above mentioned embodiment, and a detail description thereof will be omitted.

Hereinafter the user interface unit 210 for the map management and the schedule management will be described with reference to FIGS. 28 to 35.

FIG. 28 is a view illustrating a configuration of the user interface of the robot cleaner.

Referring to FIG. 28, the user interface unit 210 may include the input 211 and the display 212. The input 211 may be provided with a plurality of buttons. At this time, the button may be a hardware button or a software button. As illustrated in FIG. 28, the input 211 may include "home screen" button to return to a home screen, "start/end" button to start a cleaning or finish to cleaning, and "previous screen" to return to the previous screen.

Since the display 212 is configured with a touch screen panel, the display 212 may detect a user's input. As illustrated in FIG. 28, the home screen of the display 212 may include "map management" icon 360 and "schedule management" icon 370. In addition, in the upper end of the display 212, a charging state of the power source 250, i.e., a remaining amount of the battery indicator 390a, may be displayed.

A user may change the screen of the display 212 into a map management screen by selecting the "map management" icon 360. FIG. 25 is a view illustrating a screen for the map management.

Referring to FIG. 29, in the upper end of the display 212, the battery remaining amount 390a may be displayed. In the lower side, "map download "icon 361a, "map generation "icon 361b, and "map edit" icon 361c may be sequentially displayed.

A user may allow the robot cleaner 200 to download the map of the cleaning area by selecting the "map download" icon 361a. The robot cleaner 200 may download the map of the cleaning area from the external server through the communicator 220, and the storage 240 may temporarily or non-temporarily store the downloaded map, according to the selection of the "map download" icon 361a by the user. The downloaded map may be displayed on the display 212 as shown in FIG. 30.

FIG. 30 is a view illustrating a screen of a display displaying a downloaded map, and FIG. 31 is a view illustrating an example of map editing.

Referring to FIG. 30, in the upper end of the display 212, the remaining amount of the battery indicator 390a and "save" icon 390b may be displayed. That is, when the "save" icon 390b is selected, the map displayed on the display 212 may be stored in the storage 240.

In the lower side of the "save" icon 390b, the map 362a downloaded via the communicator 220 may be displayed. The map 162a downloaded from the external server may be provided in a format that is not recognized by the robot cleaner 200, as described above. In this case, a user may be required to process or edit the map 362a into a format recognized by the robot cleaner 200.

For this, a user may draw a line along a perimeter of the area to be cleaned, with reference to the downloaded map 362a and display an outline. At least one cleaning area may be set by the outline displayed by the user, and a name to distinguish each area, e.g., Z1, Z2, Z3, Z4 and Z5 may be displayed while setting the cleaning area. The name of the each area may be automatically generated by the controller 230 and then displayed or the name of the each area may be displayed according to a user's manual input. In addition, by inputting a horizontal direction and a vertical direction length or an area of the cleaning area, it may be possible to edit the map into a format that can be recognized by the robot cleaner 200. At this time, a user may input a length or an area of the entire cleaning area, or a length or an area of each cleaning area.

A user may further perform editing to divide or merge the cleaning area on the edited map 362b, and the user may store the edited map 362b by clicking the "save" icon 390b.

As mentioned above, the map editing may include converting a map format into a format of the robot cleaner 200, dividing the cleaning area, and merging the divided cleaning area, but is not limited thereto. The map editing may include other types of editing, e.g., deleting a part of the cleaning area.

Referring again to FIG. 29, the user may select the "map generation" icon 361b so that the robot cleaner 200 generates a map of the cleaning area. The user may input the command configured to generate the map of the cleaning area by selecting the "map generation" icon 361b, and the controller 230 may generate a control signal about the driving wheel driver 271 so that the driving wheel driver 271 drives the driving wheels 33 and 35 in response to the command. During the driving wheels 33 and 35 drive, the controller 230 may receive the sensor value from the sensor 260, and generate the map of the cleaning area based on the sensor value.

The generated map may be temporarily or non-temporarily stored in the storage 240 and as illustrated in FIG. 31, the generated map may be displayed on the display 212. Meanwhile, since the generated map is provided in the format recognized by the robot cleaner 200, the user does not need to perform editing for converting the format. However, the user may perform editing, such as dividing, merging, or deleting the cleaning area. The edited map may be manually stored according to the user's command or automatically stored regardless of the user's command.

As illustrated in FIG. 29, the user may edit the map stored in the storage 240 by selecting the "map edit" icon 361c. At this time, the stored map may represent a map finally stored. Therefore, the stored map may include a map downloaded from the external server, a map generated by the controller 230, or a map in which the editing is performed in the downloaded map or the generated map. When the user selects the "map edit" icon 361c, the display 212 may display the finally stored map on the screen and wait for the editing by the user.

Referring again to FIG. 28, a user may change the screen of the display 212 into the schedule management screen by selecting the "schedule management" icon 370. FIG. 32 is a view illustrating an example of a screen for the schedule management.

As illustrated in FIG. 32, the display 212 may display the remaining amount of the battery indicator 390a and in the lower side, the display 212 may display "schedule setting"

icon 371*a*, "schedule recommendation" icon 371*b*, and "schedule edit" icon 371*c* may be sequentially displayed.

A user may set a cleaning schedule about the cleaning area by selecting the "schedule setting" icon 371*a*. The display 212 may change a screen as illustrated in FIG. 33A, according to the selection of the "schedule setting" icon 371*a* by the user.

Figure 33A:
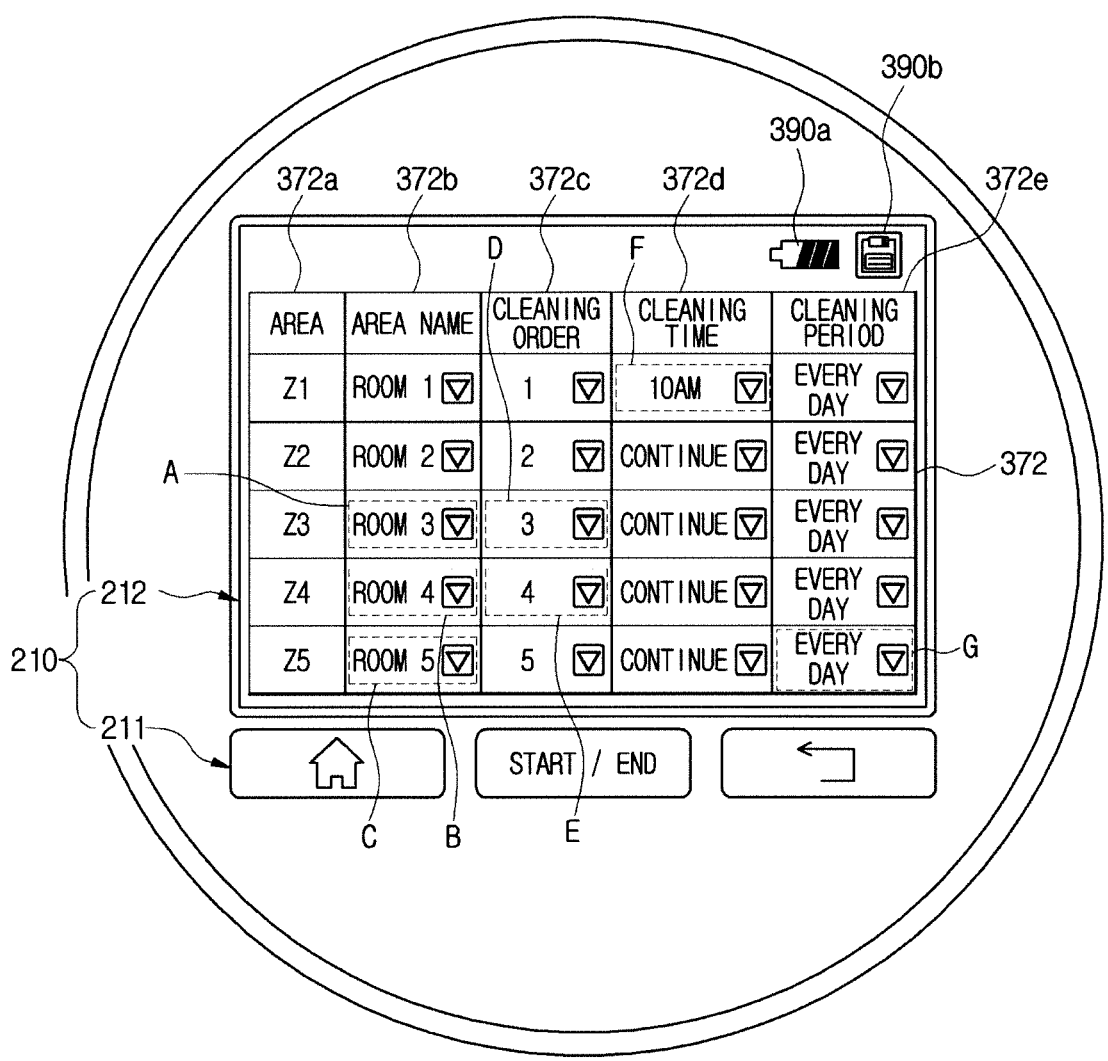
FIG. 33A is a view illustrating an example of a setting screen for the cleaning schedule.

FIG. 33A is a view illustrating an example of a setting screen for the cleaning schedule.

Referring to FIG. 33A, in the upper end of the display 212, "save" icon 390*b* may be displayed together with the remaining amount of the battery indicator 390*a*. The "save" icon 390*b* may be configured to store the set cleaning schedule, and when the "save" icon 390*b* is selected, the cleaning schedule set via the display 212 may be stored in the storage 240.

In the lower side of the "save" icon 390*b*, a table for setting the cleaning schedule, i.e., 'schedule table' 372, may be displayed. The schedule table 372 may include "area" 372*a*, "area name" 372*b*, "cleaning order" 372*c*, "cleaning time" 372*d*, and "cleaning period" 372*e*. In the "area" 372*a*, a cleaning area, e.g., the plurality of cleaning area Z1, Z2, Z3, Z4, and Z5, forming the map may be displayed. In this case, the map may represent a map finally stored. A user may newly input a functional name of the cleaning area in the "area name" 372*b*.

When a user selects the "schedule setting" icon 371*a*, the controller 230 may randomly generate a cleaning schedule and control the display 212 so that the display 212 displays a schedule table corresponding to the cleaning schedule. That is, the display 212 may display a random schedule table 372 as illustrated in FIG. 33A.

By corresponding to the cleaning area Z1, Z2, Z3, Z4, and Z5, the area name" 372*b* may be generated and displayed as room 1, room 2, room 3, room 4, and room 5, the "cleaning order" 372*c* may be generated and displayed as 1, 2, 3, 4, and 5, the "cleaning time" 372*d* may be generated and displayed as 10 AM, continuous, continuous, continuous, and continuous, and the "cleaning period" 372*e* may be generated and displayed as every day, every day, every day, every day, and every day.

A user may complete a setting of the cleaning schedule by selecting a cell to be changed from the schedule table 372 that is randomly displayed and by changing into a desired name, a desired order, a desired time, and a desired period. A detail description of setting the cleaning schedule corresponds to the above mentioned description in FIGS. 14A to 18, and thus a detail description thereof will be omitted.

Figure 33B:
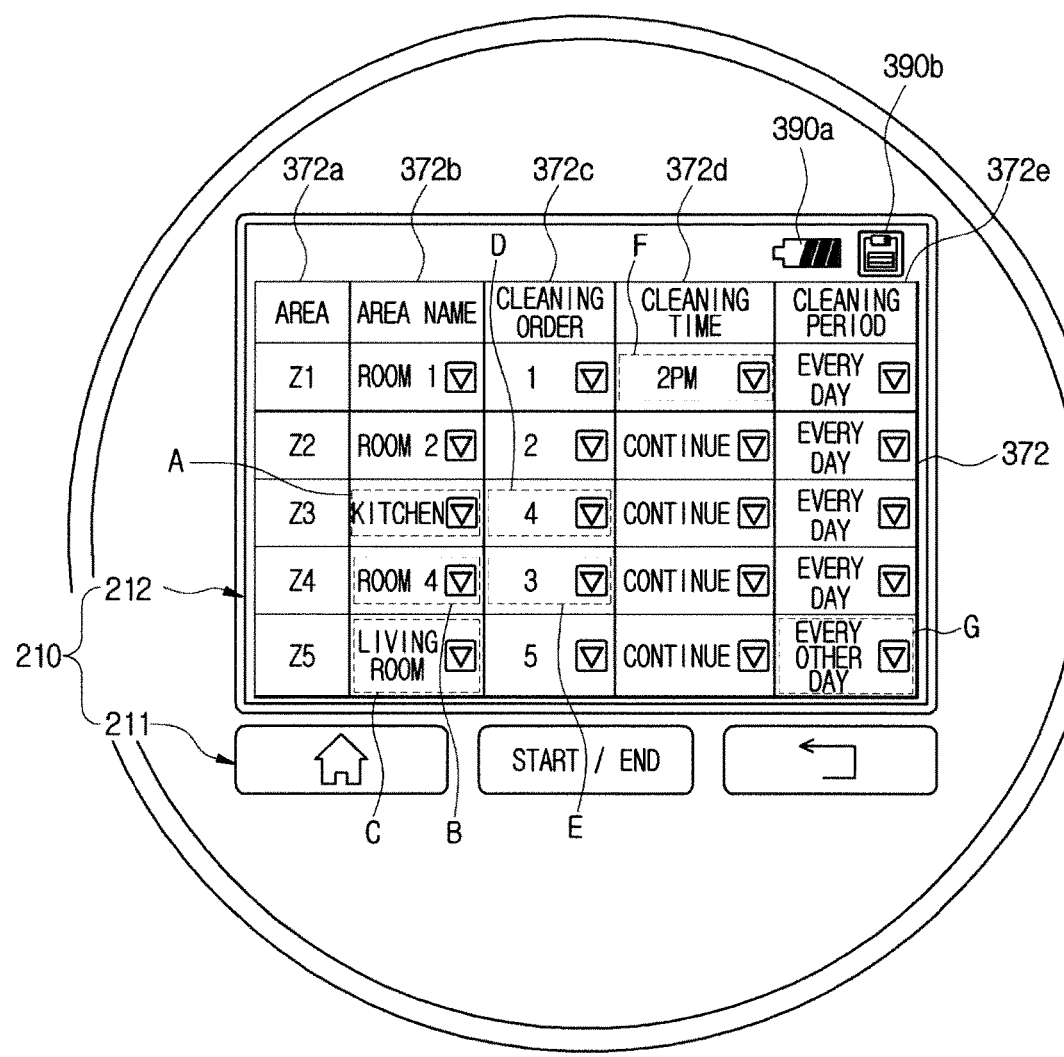
FIG. 33B is a view illustrating an example of a screen in which setting the cleaning schedule is completed.

FIG. 33B is a view illustrating an example of a screen in which setting the cleaning schedule is completed.

Referring to FIG. 33B, the area name 372*b* of cell A, cell B, and cell C may be changed from 'room 3' to 'kitchen', from 'room 4' to 'room 3' and from 'room 5' to 'living room'. The cleaning order 372*c* of cell D and cell E may be changed from '4' to '3' and from '3' to '4'. The cleaning time 372*d* of cell F may be changed from '10 AM' to '2 PM', and the cleaning period 372*e* of cell G may be changed from 'every day' to 'every other day'. According to the setting of the cleaning schedule, the display 212 may display a schedule table 372 in accordance with the cleaning schedule, i.e., a schedule table 372 that is changed as illustrated in FIG. 33B.

A user may store the set cleaning schedule by clicking the "save" icon 390*b*.

Referring again to FIG. 32, the user may select the "schedule recommendation" icon 371*b* so that a cleaning schedule appropriate for the state of the robot cleaner 200 is generated and recommended. By selecting the "schedule recommendation" icon 371*b*, the user may input a command configured to recommend the cleaning schedule. The controller 230 may generate a cleaning schedule appropriate for the current state of the robot cleaner 200 (e.g., a charging state of the power source 250, a battery remaining amount, or a cleaning available time) based on the cleaning history data (e.g., an area of a cleaning area, a driving speed for a cleaning area, power consumption, and a cleaning time required) and control the display 212 so that the display 212 displays the cleaning schedule.

The user may store the cleaning schedule that is generated and recommended based on the cleaning history data, without change, or the user may store the cleaning schedule after changing a part or entire of the cleaning schedule.

Referring to FIG. 32, the user may edit the cleaning schedule stored in the storage 240 by selecting the "schedule edit" icon 371*c*. When the user selects the "schedule edit" icon 371*c*, the display 212 may display the stored cleaning schedule in the form of the schedule table 372 and wait for the editing or the change input by the user. At this time, the stored cleaning schedule may represent a cleaning schedule finally stored.

A user may allow the robot cleaner 200 to start the cleaning or to finish the cleaning by selecting the "start/end" button among the plurality of buttons. When the robot cleaner 200 performs the cleaning, what the user selects the "start/end" button may be the same as inputting the cleaning end command. When the cleaning end command is input from a user, the robot cleaner 200 may finish the cleaning in response to the command and move to the docking station.

When the robot cleaner 200 does not perform the cleaning, what the user selects the "start/end" button may be the same as inputting the cleaning start command. When the cleaning start command is input from a user, the controller 230 may transmit a control signal, which is configured to start the cleaning according to the stored map and the stored cleaning schedule, to the driver 270. The stored map may represent a map finally stored, and the stored cleaning schedule may represent a cleaning schedule finally stored.

During the robot cleaner 200 performs the cleaning, there may be a case in which the received information does not match with the actual cleaning environment. For example, according to the change in a position of the docking station, a cleaning start position of the robot cleaner 200 may be changed and a distance between the cleaning start position and each of cleaning area may vary. That is, the robot cleaner 200 cannot perform the cleaning based on the received map. In this case, the display 212 may output a screen as illustrated in FIG. 34, in response to the control signal of the controller 230.

FIG. 34 is a view illustrating a screen according to the mismatch of the environment.

Referring to FIG. 34, the display 212 may display a phrase "the environment does not match. Do you want to update the map?" and "yes" icon and "no" icon, which is configured to input a user answer about whether to update the map. That is, when a user inputs "no", the robot cleaner 200 may stop the cleaning that is currently performed, based on the user command, and move to the docking station. When a user inputs "yes", the robot cleaner 200 may perform a coordinate conversion based on the user command and update the map. The robot cleaner 200 may complete the cleaning that is currently performed, based on the updated map.

During the robot cleaner 200 performs the cleaning, an area which cannot be cleaned may occur. For example, as illustrated in FIG. 33B, when an entrance of Z1 area, which is set as a first cleaning area, is closed, the robot cleaner 200 may be not allowed to enter the Z1 area and thus the robot cleaner 200 cannot perform the cleaning. In this case, the display 212 may output a screen of FIG. 35 in response to the control signal of the controller 230.

FIG. 35 is a view illustrating a screen of a display indicating that the cleaning is impossible.

Referring to FIG. 35, the display 212 may display a phrase "There is an area that cannot be cleaned. Do you want to change the area?" and "yes" icon and "no" icon, which is configured to input a user answer about whether to change the area. That is, when a user inputs "no", the robot cleaner 200 may stop the cleaning that is currently performed, based on the user command, and move to the docking station. When a user inputs "yes", the robot cleaner 200 may move to a next cleaning area and then perform the cleaning, based on the received cleaning schedule. In the above example, in a state in which the cleaning of the Z1 area is impossible, when a user inputs "yes", the robot cleaner 200 may move to a next cleaning area, i.e., Z2 area, and then perform the cleaning the Z2 area.

Hereinbefore the user interface unit 210 of the robot cleaner 200, the control of the robot cleaner 200 via the user interface unit 210, the output screen of the display 212 has been described with reference to FIGS. 28 to 35. However, a user may input the user command via the input 211 and control the robot cleaner 200. In this case, the output screen of the display 212 may be the same as the description illustrated in FIGS. 28 to 35. Therefore, a detail description thereof will be omitted.

Hereinbefore the control system 1 of robot cleaner 200 having the robot cleaner 200 and the control apparatus controlling the robot cleaner 200 has been described with the illustrated block diagrams, and hereinafter the control method of the robot cleaner will be described with a given flowchart.

FIG. 36 is a flow chart illustrating a control method of the robot cleaner according to an embodiment. A flowchart 710 of FIG. 36 illustrates a control method of the robot cleaner for the map management.

Referring to FIG. 36, the terminal device 100a may determine whether to receive the "map download" command from a user (711)

When receiving the "map download" command, the terminal device 100a may download a map of a cleaning area from the external server, e.g., a web server or a mobile communication server (712).

When not receiving the "map download" command, the terminal device 100a may determine whether to receive the "map generation" command from a user (713).

When receiving the "map generation" command, the terminal device 100a may transmit the "map generation" command to the robot cleaner 200, and receive a map of a cleaning area that is generated in response to the command (714).

When not receiving the "map generation" command, the procedure may proceed to an operation 716. That is, the terminal device 100a may determine whether to receive the "map edit" command from a user (716).

When receiving the map from the external server or the robot cleaner 200 depending on the operations from 712 to 714, the terminal device 100a may store the received map in the terminal device storage 140a, and display the received map on the terminal device display 112a (715). In this time, the map may be stored or displayed according to the user input, or stored or displayed regardless of the user input.

Next, the terminal device 100a may determine whether to receive the "map edit" command from a user (716).

When receiving the "map edit" command, the terminal device 100a may determine whether the stored map is present in the terminal device storage 140a or not (717).

When the stored map is present in the terminal device storage 140a, the terminal device 100a may edit the stored map and store the edited map (718). In this time, the map to be edited may represent a map finally stored. The terminal device 100a may edit the map, e.g., converting the map format into the format of the robot cleaner 200, dividing the cleaning area, merging the divided cleaning area, and deleting a part of the cleaning area.

When the stored map is not present in the terminal device storage 140a, the procedure may proceed to an end operation. In addition, when receiving the "map edit" command depending on the determination of the operation 716, the procedure may proceed to the end operation.

FIG. 37 is a flow chart illustrating a control method of a robot cleaner according to another embodiment. A flowchart 720 of FIG. 37 illustrates a control method of the robot cleaner for the map management according to another embodiment, and the user command in FIG. 37 may be input via the input device 1100b or directly input to the robot cleaner 200.

Referring to FIG. 37, the robot cleaner 200 may determine whether to receive the "map download" command from a user (721)

When receiving the "map download" command, the robot cleaner 200 may download a map of a cleaning area from the external server, e.g., a web server or a mobile communication server (722).

When not receiving the "map download" command, the robot cleaner 200 may determine whether to receive the "map generation" command from a user (723).

When receiving the "map generation" command, the robot cleaner 200 may generate a map of a cleaning area in response to the user command (724). The robot cleaner 200 may drive the driving wheels 33 and 35. During the driving wheels 33 and 35 drive, the robot cleaner 200 may generate a map of the cleaning area based on the sensor value of the sensor 260.

When not receiving the "map generation" command, the procedure may proceed to an operation 726. That is, the robot cleaner 200 may determine whether to receive the "map edit" command from a user (726).

When downloading the map or generating the map is completed according to the operations from 722 to 724, the robot cleaner 200 may store the downloaded map or the generated or map in the storage 240, and display the downloaded map or the generated map on the display 212 (725). In this time, the map may be stored or displayed according to the user input, or stored or displayed regardless of the user input.

Next, the robot cleaner 200 may determine whether to receive the "map edit" command from a user (726).

When receiving the "map edit" command, the robot cleaner 200 may determine whether the stored map is present in the storage 240 or not (727).

When the stored map is present in the storage 240, the robot cleaner 200 may edit the stored map and store the edited map (728). In this time, the map to be edited may represent a map finally stored. The robot cleaner 200 may edit the map, e.g., converting the map format into the format of the robot cleaner 200, dividing the cleaning area, merging the divided cleaning area, and deleting a part of the cleaning area.

When the stored map is not present in the storage 240, the procedure may proceed to the end operation. In addition, when receiving the "map edit" command depending on the determination of the operation 726, the procedure may proceed to the end operation.

FIG. 38 is a flow chart illustrating a control method of a robot cleaner according to alternate another embodiment. A flowchart 730 of FIG. 38 illustrates a control method of the robot cleaner for the schedule management according to alternate another embodiment. The user command in FIG. 38 may be input via the control apparatus, i.e., the terminal device 100*a* or the input device 1100*b* or directly input to the robot cleaner 200. It may be assumed that a subject of the operation of FIG. 38 is the terminal device 100*a* or the robot cleaner 200. That is, when the user command is input via the terminal device 100*a*, the terminal device 100*a* may become the subject of the operation, and when the user command is input via the input device 1100*b* or directly input to the robot cleaner 200, the robot cleaner 200 may become the subject of the operation.

Referring to FIG. 38, the terminal device 100*a* or the robot cleaner 200 may determine whether to receive the "schedule setting" command from a user (731).

When receiving the "schedule setting" command, the terminal device 100*a* or the robot cleaner 200 may display a setting screen for setting the cleaning schedule (732). The terminal device 100*a* may display the setting screen on the terminal device display 112*a*. The robot cleaner 200 may display the setting screen on the display 212.

When not receiving the "schedule setting" command, the terminal device 100*a* or the robot cleaner 200 may determine whether to receive the "schedule recommendation" command from a user (733).

When receiving the "schedule recommendation" command, the terminal device 100*a* or the robot cleaner 200 may display a recommended cleaning schedule (734).

When receiving the "schedule recommendation" command via the terminal device 100*a*, the terminal device 100*a* may transmit the user command to the robot cleaner 200, and the robot cleaner 200 may send the cleaning history data with the current state value of the robot cleaner 200. The terminal device 100*a* may receive the cleaning history data and generate a cleaning schedule that is appropriate for the state of the robot cleaner 200, based on the received cleaning history data. The terminal device 100*a* may display the generated cleaning schedule as the recommended cleaning schedule, on the terminal device display 112*a*.

When the robot cleaner 200 receives the "schedule recommendation" command via the input device 1100*b* or when the robot cleaner 200 directly receives the "schedule recommendation" command, the robot cleaner 200 may generate a cleaning schedule that is appropriate for the state of the robot cleaner 200, based on the cleaning history data stored in the storage 240 in advance. The robot cleaner 200 may display the generated cleaning schedule as the recommended cleaning schedule, on the display 212.

After displaying the setting screen at the operation 732, after displaying the recommended schedule at the operation 734, or when not receiving the "schedule recommendation" command depending on the determination of the operation 733, the terminal device 100*a* or the robot cleaner 200 may determine whether to receive the "schedule edit" command (735).

When receiving the "schedule edit" command, the terminal device 100*a* or the robot cleaner 200 may edit the cleaning schedule based on the user command and then store the edited cleaning schedule (736).

When the stored cleaning schedule is present in the terminal device storage 140*a*, the terminal device 100*a* may edit the stored cleaning schedule according to the user input. In this time, the cleaning schedule to be edited may represent a cleaning schedule finally stored. Meanwhile, when the stored cleaning schedule is not present in the terminal device storage 140*a*, the terminal device 100*a* may edit a cleaning schedule, which is randomly generated, according to the user input.

When the stored cleaning schedule is present in the storage 240, the robot cleaner 200 may edit the stored cleaning schedule according to the user input. In this time, the cleaning schedule to be edited may represent a cleaning schedule finally stored. Meanwhile, when the stored cleaning schedule is not present in the storage 240, the robot cleaner 200 may edit a cleaning schedule, which is randomly generated, according to the user input.

When it is determined that the "schedule edit" command is not received, depending on the determination of the operation 735, the procedure may proceed to the end operation.

Figure 39:
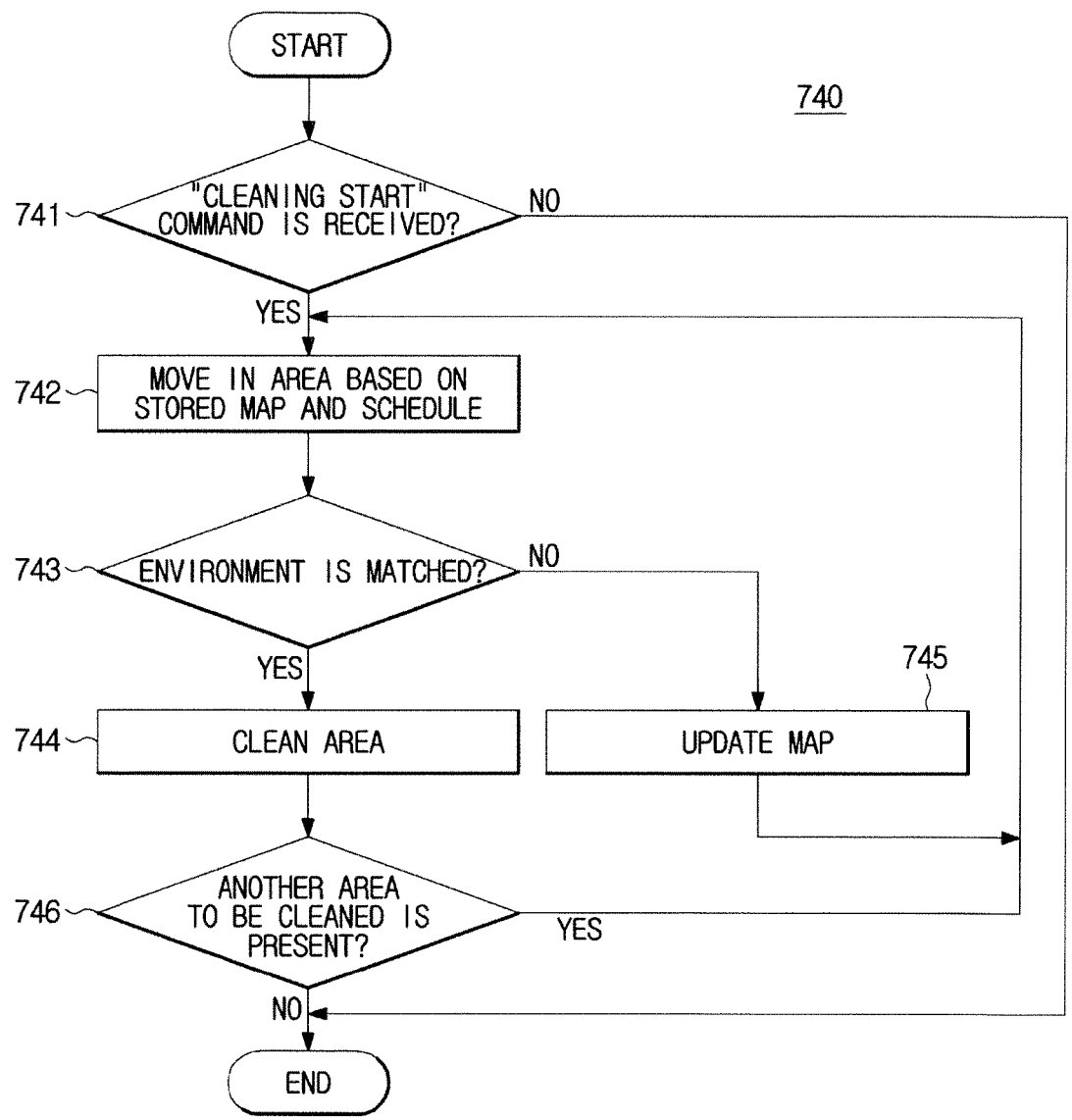
FIG. 39 is a flow chart illustrating a control method of a robot cleaner according to alternate another embodiment.

FIG. 39 is a flow chart illustrating a control method of a robot cleaner according to alternate another embodiment. That is, a flowchart 740 of FIG. 39 is a view illustrating a control method of the robot cleaner to determine whether the environment matches or not.

Referring to FIG. 39, the robot cleaner 200 may determine whether to receive the "cleaning start" command (741).

When not receiving the "cleaning start" command, the procedure may proceed to an end operation. When receiving the "cleaning start" command, the robot cleaner 200 may clean while moving the cleaning area, based on the stored map and the stored cleaning schedule in the storage 240 (742). In this time, the stored map may represent a map finally stored, and the stored cleaning schedule may represent a cleaning schedule finally stored. The robot cleaner 200 may sequentially move in the cleaning area based on the cleaning order included in the cleaning schedule.

While moving the cleaning area, the robot cleaner 200 may determine whether the environment matches or not (743). That is, the robot cleaner 200 may determine whether the stored map matches with the actual cleaning environment.

When the environment does not match, the robot cleaner 200 may perform a coordinate conversion and update the stored map (745). In this case, the updated map may be stored in the storage 240 and the robot cleaner 200 may perform the operation 742 again based on the updated map.

When the environment matches, the robot cleaner 200 may clean a corresponding area (744).

When cleaning the corresponding area is completed, the robot cleaner 200 may determine whether another area to be cleaned is present, based on the cleaning schedule (746). When the another area is not present, the procedure may proceed to the end operation. In contrast, when the another area is present, the procedure may return to the operation 742.

FIG. 39 illustrates that the robot cleaner 200 automatically updates the map, but alternatively, the robot cleaner 200 may update the map based on the "map update" command from the user. FIG. 39 illustrates that the robot cleaner 200 becomes the subject of the operation, but the terminal device 100*a* may become the subject of the operation.

Figure 40:
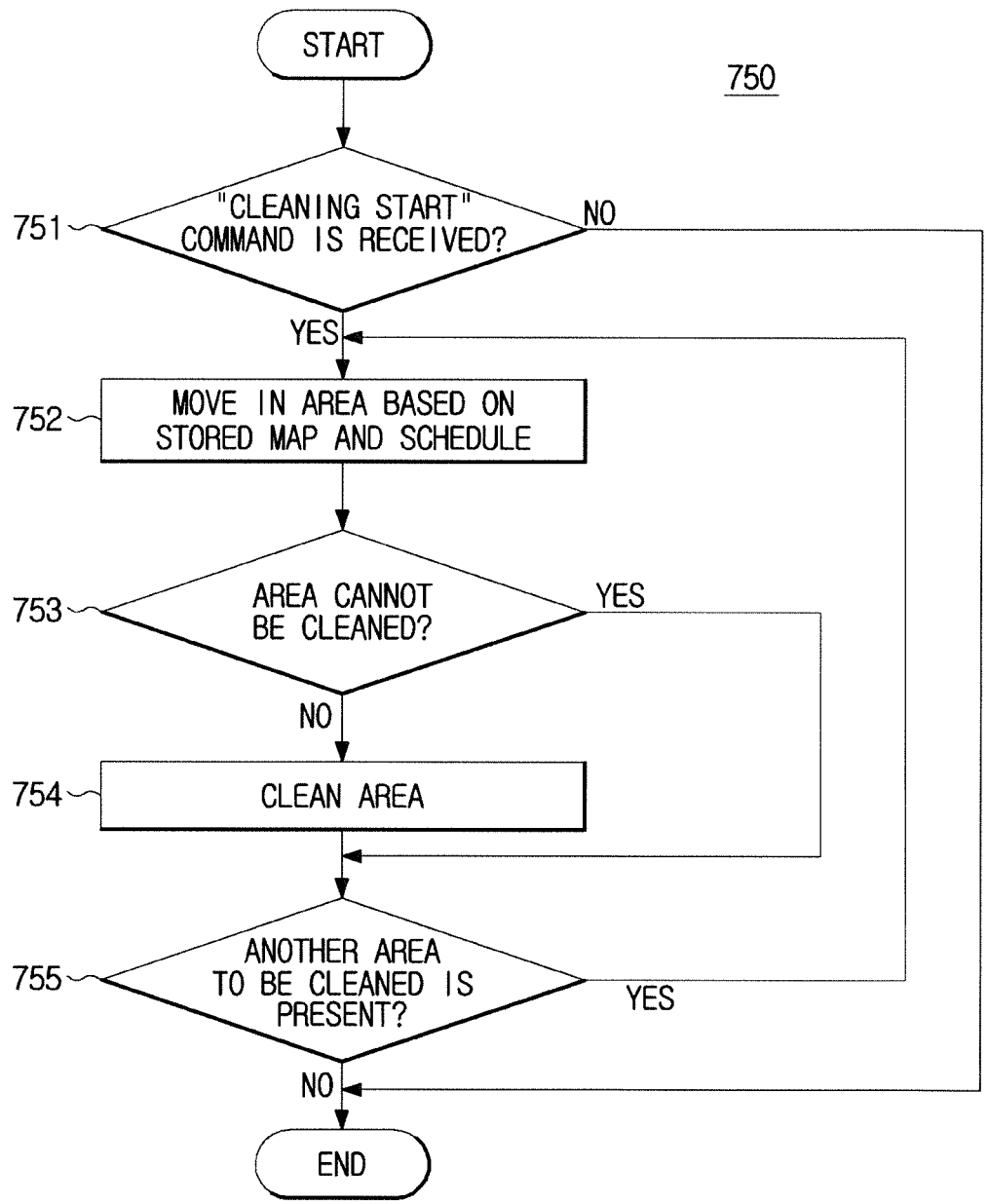
FIG. 40 is a flow chart illustrating a control method of a robot cleaner according to alternate another embodiment.

FIG. 40 is a flow chart illustrating a control method of a robot cleaner according to alternate another embodiment.

That is, a flowchart 750 of FIG. 40 is a view illustrating a control method of the robot cleaner to determine whether the cleaning is possible.

Referring to FIG. 40, the robot cleaner 200 may determine whether to receive the "cleaning start" command (751).

When not receiving the "cleaning start" command, the procedure may proceed to an end operation. When receiving the "cleaning start" command, the robot cleaner 200 may clean while moving the cleaning area based on the stored map and the stored cleaning schedule in the storage 240 (752). In this time, the stored map may represent a map finally stored, and the stored cleaning schedule may represent a cleaning schedule finally stored. The robot cleaner 200 may sequentially move in the cleaning area based on the cleaning order included in the cleaning schedule.

While moving the cleaning area, the robot cleaner 200 may determine whether the corresponding area can be cleaned or not (753).

When the corresponding area can be cleaned, the robot cleaner 200 may clean the corresponding area (754).

When it is determined that the corresponding area cannot be cleaned, depending on the determination of the operation 753, or when cleaning the corresponding area is completed according to the operation 754, the robot cleaner 200 may determine whether another area to be cleaned is present, based on the cleaning schedule (755). When the another area is not present, the procedure may proceed to the end operation. In contrast, when the another area is present, the procedure may return to the operation 752.

FIG. 40 illustrates that the robot cleaner 200 automatically moves in the cleaning area, but alternatively, the robot cleaner 200 may move in the cleaning area based on the "area movement" command from the user. FIG. 40 illustrates that the robot cleaner 200 becomes the subject of the operation, but the terminal device 100a may become the subject of the operation.

Although a few embodiments of the present disclosure have been shown and described, it would be appreciated by those skilled in the art that changes may be made in these embodiments without departing from the principles and spirit of the disclosure, the scope of which is defined in the claims and their equivalents.

The invention claimed is:

1. An apparatus to control a robot cleaner, the apparatus comprising:
   a user interface unit configured to receive a command from a user to cause the apparatus to receive a map of a cleaning area downloaded from an external server and a command from the user to cause a map of the cleaning area to be generated by the robot cleaner and then received by the apparatus from the robot cleaner; and
   a controller configured to,
      in response to the command to cause the apparatus to receive the map of the cleaning area downloaded from the external server being received by the user interface unit, perform control to cause the apparatus to receive the map of the cleaning area downloaded from the external server, and
      in response to the command to cause the map of the cleaning area to be generated by the robot cleaner and then received by the apparatus from the robot cleaner, perform control to cause the map of the cleaning area to be generated by the robot cleaner and then received by the apparatus from the robot cleaner.

2. The apparatus of claim 1, wherein
the user interface unit is configured to receive a map edit command from the user to edit the map of the cleaning area received by the apparatus and which is one of the map of the cleaning area downloaded from the external server and received by the apparatus, and the map of the cleaning area generated by the robot cleaner and then received by the apparatus from the robot cleaner, and
the controller is configured to edit the map of the cleaning area received by the apparatus in accordance with the received map edit command and which is one of the map of the cleaning area downloaded from the external server and received by the apparatus, and the map of the cleaning area generated by the robot cleaner and then received by the apparatus from the robot cleaner.

3. The apparatus of claim 2, wherein
the edit comprises at least one of converting a format of the map of the cleaning area received by the apparatus into a format of the robot cleaner, dividing the cleaning area indicated by the map of the cleaning area received by the apparatus, merging the cleaning area indicated by the map of the cleaning area received by the apparatus, and deleting a part of or an entire cleaning area indicated by the map of the cleaning area received by the apparatus,
to thereby provide an edited map of the cleaning area.

4. The apparatus of claim 1, wherein
the user interface unit is configured to receive a schedule setting command from the user to set a cleaning schedule of the cleaning area, and
the controller is configured to cause a cleaning schedule of the robot cleaner to be set to the cleaning schedule set by the schedule setting command.

5. The apparatus of claim 4, wherein
the cleaning schedule set by the schedule setting command comprises at least one of a cleaning order, a cleaning time, and a cleaning period.

6. The apparatus of claim 1, wherein
the user interface unit is configured to receive a schedule recommendation command from the user to recommend a cleaning schedule of the cleaning area that is appropriate for a state of the robot cleaner, and
the controller is configured to cause a cleaning schedule of the robot cleaner to be set to the cleaning schedule recommended by the schedule recommendation command.

7. The apparatus of claim 6, wherein
the state of the robot cleaner comprises at least one of a charging state of a battery provided in the robot cleaner, a remaining amount of the battery, and a cleaning available time of the robot cleaner.

8. The apparatus of claim 1, wherein
the controller is configured to generate a cleaning schedule of the cleaning area that is appropriate for a state of the robot cleaner, based on a cleaning history data of the robot cleaner.

9. The apparatus of claim 8, wherein
the cleaning history data comprises at least one of an area of the cleaning area, a driving speed for the cleaning area, power consumption about the cleaning area, and a cleaning time required for the cleaning area.

10. The apparatus of claim 1, wherein
when an area that cannot be cleaned is present in the cleaning area, the controller is configured to cause the user interface unit to display that the area that cannot be cleaned is present.

11. A robot cleaner comprising:
a user interface unit configured to receive a command from a user for the robot cleaner to receive a map of a cleaning area downloaded from an external server and a command from the user for the robot cleaner to generate a map of the cleaning area; and
a controller configured to,
  in response to the command for the robot cleaner to receive the map of the cleaning area downloaded from the external server being received by the user interface unit, control the robot cleaner to download the map of the cleaning area from the external server or to receive the map of the cleaning area from a device external to the robot cleaner that downloaded the map of the cleaning area from the external server, and
  in response to the command for the robot cleaner to generate the map of the cleaning area being received by the user interface unit, control the robot cleaner to generate the map of the cleaning area.

12. The robot cleaner of claim 11, wherein
the user interface unit is configured to receive, from the user, a map edit command to edit the map of the cleaning area which is one of:
  the map of the cleaning area downloaded by the robot cleaner from the external server or received by the robot cleaner from the device external to the robot cleaner that downloaded the map of the cleaning area from the external server, and
  the map of the cleaning area generated by the robot cleaner, and
the controller is configured to edit, in accordance with the received map edit command, the map of the cleaning area which is one of:
  the map of the cleaning area downloaded by the robot cleaner from the external server or received by the robot cleaner from the device external to the robot cleaner that downloaded the map of the cleaning area from the external server, and
  the map of the cleaning area generated by the robot cleaner.

13. The robot cleaner of claim 11, wherein
the user interface unit is configured to receive a schedule recommendation command from the user to recommend a cleaning schedule of the cleaning area, which is appropriate for a state of the robot cleaner, and
the controller is configured to cause a cleaning schedule of the robot cleaner to be set to the cleaning schedule recommended by the schedule recommendation command.

14. The robot cleaner of claim 13, wherein
the user interface unit is configured to receive a schedule edit command to edit the recommended cleaning schedule, from the user, and
the controller is configured to edit the recommended cleaning schedule in accordance with the received schedule edit command.

15. The robot cleaner of claim 11, wherein
the controller is configured to generate a cleaning schedule of the cleaning area that is appropriate for a state of the robot cleaner based on a cleaning history data of the robot cleaner.

16. The robot cleaner of claim 11, wherein
when an environment of the cleaning area does not match with the map of the cleaning area which is one of:
  the map of the cleaning area downloaded by the robot cleaner from the external server or received by the robot cleaner from the device external to the robot cleaner that downloaded the map of the cleaning area from the external server, and
  the map of the cleaning area generated by the robot cleaner,
the controller controls the user interface unit to display that the environment does not match.

17. The robot cleaner of claim 16, wherein
the controller is configured to update the map of the cleaning area which is one of:
  the map of the cleaning area downloaded by the robot cleaner from the external server or received by the robot cleaner from the device external to the robot cleaner that downloaded the map of the cleaning area from the external server, and
  the map of the cleaning area generated by the robot cleaner,
when the environment does not match.

18. The robot cleaner of claim 11, wherein
when an area that cannot be cleaned is present in the cleaning area, the controller is configured to control the user interface unit to display that the area that cannot be cleaned is present.

19. The robot cleaner of claim 11, wherein
the robot cleaner includes driving wheels, and
the controller is configured to control the driving wheels so that the driving wheels perform an area movement when the area that cannot be cleaned is present.

20. A method comprising:
providing a user interface unit configured to receive a command from a user for a robot cleaner to receive a map of a cleaning area downloaded from an external server and a command from the user for the robot cleaner to generate a map of the cleaning area;
in response to the command for the robot cleaner to receive the map of the cleaning area downloaded from the external server being received by the user interface unit, perform control to
  cause the robot cleaner to receive the map of the cleaning area downloaded from the external server, and
  display, on a display device, the received map of the cleaning area; and
in response to the command for the robot cleaner to generate the map of the cleaning area being received by the user interface unit, perform control to
  cause the robot cleaner to generate the map of the cleaning area, and
  display, on the display device, the generated map of the cleaning area.

21. A robot cleaner comprising:
at least one memory storing instructions; and
at least one processor that executes the instructions to:
  in response to a command for the robot cleaner to receive a map of a cleaning area downloaded from an external server entered by a user into a user interface unit of the robot cleaner or into a remote user interface unit which is a user interface of a remote terminal or a remote controller, control the robot cleaner to download the map of the cleaning area from the external server or to receive the map of the cleaning area from a device external to the robot cleaner that downloaded the map of the cleaning area from the external server, and
  in response to a command for the robot cleaner to generate a map of the cleaning area entered by the user into the user interface unit of the robot cleaner or into the remote user interface unit, control the robot cleaner to generate the map of the cleaning area.

* * * * *